United States Patent
Harpole

(10) Patent No.: US 11,032,128 B2
(45) Date of Patent: Jun. 8, 2021

(54) USING A LOCAL HUB DEVICE AS A SUBSTITUTE FOR AN UNAVAILABLE BACKEND DEVICE

(71) Applicant: Amazon Technologies, Inc., Seattle, WA (US)

(72) Inventor: Aaron Harpole, Santa Monica, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/364,830

(22) Filed: Mar. 26, 2019

(65) Prior Publication Data

US 2019/0327128 A1    Oct. 24, 2019

Related U.S. Application Data

(60) Provisional application No. 62/662,089, filed on Apr. 24, 2018.

(51) Int. Cl.
*H04L 12/24* (2006.01)
*H04L 12/911* (2013.01)

(52) U.S. Cl.
CPC ...... *H04L 41/0668* (2013.01); *H04L 41/0816* (2013.01); *H04L 47/743* (2013.01); *H04L 47/745* (2013.01)

(58) Field of Classification Search
CPC ............. H04W 12/001; H04W 28/021; H04W 12/0808; H04L 12/1886
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 | 11/2003 |
| CN | 2792061 | 6/2006 |

(Continued)

OTHER PUBLICATIONS

The PCT Search Report and Written Opinion dated Jun. 28, 2019 for PCT Application No. PCT/ US19/24113, 14 pages.

*Primary Examiner* — Iqbal Zaidi
(74) *Attorney, Agent, or Firm* — Lee & Hayes, P.C.

(57) ABSTRACT

This application is directed to a hub device that may operate as a substitute for a backend device. For instance, an audio/video recording and communication device (A/V device) may communicate with the backend device using a first communication link. The first communication link may include a network-connected device, such as a router. Based on the A/V device determining that the first communication link is disrupted, the A/V device may configure settings in order to communicate with the hub device using a second communication link. The hub device may then receive data from the A/V device using the second communication link. If the hub device is able to still communicate with the backend device, the hub device may send the data to the backend device. However, if the hub device is unable to communicate with the backend device, then the hub device may store the data and/or transmit the data to a client device.

20 Claims, 32 Drawing Sheets

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,761,119 B1 | 9/2017 | Trundle |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0039987 A1* | 2/2010 | Hegde .................. H04W 40/02 370/328 |
| 2010/0225455 A1 | 9/2010 | Claiborne et al. |
| 2011/0299387 A1* | 12/2011 | Eydelman ............ H04L 41/069 370/225 |
| 2013/0057695 A1 | 3/2013 | Huisking |
| 2014/0267716 A1 | 9/2014 | Child et al. |
| 2015/0035987 A1 | 2/2015 | Fernandez |
| 2015/0161880 A1* | 6/2015 | Hwang ............. H04M 3/42042 340/508 |
| 2015/0163463 A1 | 6/2015 | Hwang et al. |
| 2017/0294090 A1 | 10/2017 | Sentosa et al. |
| 2018/0176512 A1 | 6/2018 | Siminoff |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

USING A LOCAL HUB DEVICE AS A SUBSTITUTE FOR AN UNAVAILABLE BACKEND DEVICE

RELATED APPLICATION

This application claims priority to U.S. Provisional Patent Application Ser. No. 62/662,089, filed on Apr. 24, 2018, titled "USING A LOCAL HUB DEVICE AS A SUBSTITUTE FOR AN UNAVAILABLE BACKEND DEVICE," the entire contents of which are incorporated herein by reference.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars. In some examples, users of A/V recording and communication devices may receive user alerts at their personal, client devices that notify them when their A/V recording and communication devices detect motion at their homes, businesses, and other locations. In this way, users may use their client devices to have video and audio communications with their visitors, and also to have video and audio communications to deter would-be burglars via their A/V recording and communication devices.

BRIEF DESCRIPTION OF THE DRAWINGS

The various embodiments of the present using a local hub device as a substitute for an unavailable backend device now will be discussed in detail with an emphasis on highlighting the advantageous features. These embodiments depict the novel and non-obvious using a local hub device as a substitute for an unavailable backend device shown in the accompanying drawings, which are for illustrative purposes only. These drawings include the following figures, in which like numerals indicate like parts.

DETAILED DESCRIPTION

Figure 1:
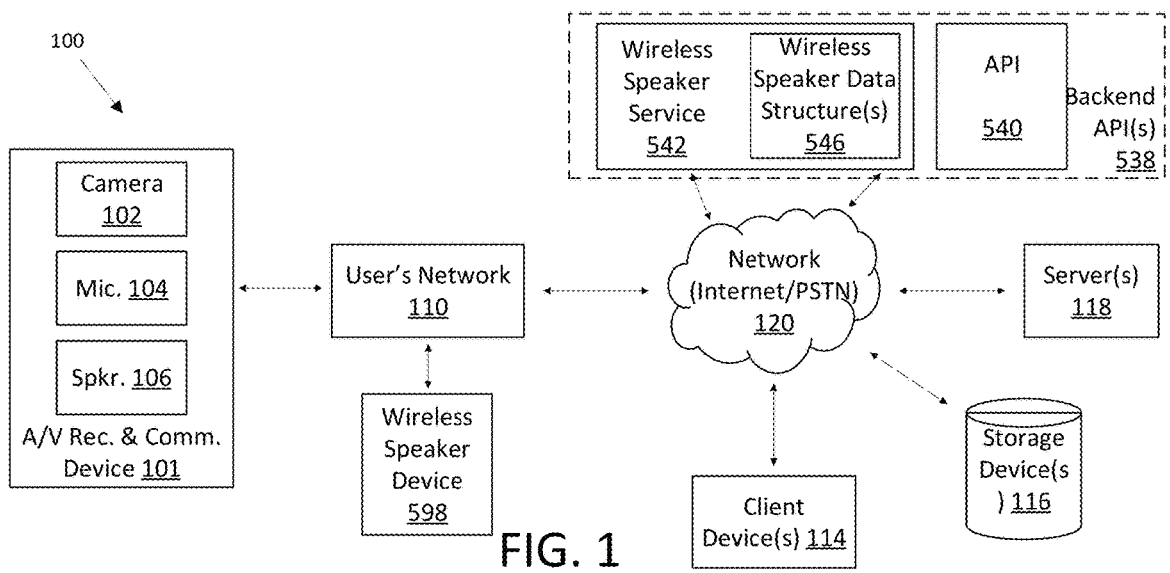
FIG. 1 is a functional block diagram illustrating one embodiment of a system including an audio/video (A/V) recording and communication device, according to various aspects of the present disclosure.

The present embodiments of using a local hub device as a substitute for an unavailable backend device, as described herein, include several features, no single of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that A/V recording and communication devices (also referred to herein as "A/V device(s)") may use sensors to detect motion in order to, among other functions, notify users that motion was detected by the A/V device, activate a camera of the A/V device, and/or activate one or more microphones and/or speakers of the A/V device. By transmitting user alerts to client devices (e.g., smartphones, handheld devices etc.) of users to indicate that motion was detected by A/V devices, users are in real-time, or near-real-time, apprised of movement near their A/V device, and thus their residence and/or other location that is being monitored. Additionally, users are also able to use their client devices to view a person represented in image data generated by the camera of the A/V device, and/or communicate with the person using audio data generated by the microphone(s) and audio data output by speaker(s) of the A/V device. Thus, an A/V device may transmit motion-based user alerts to client devices of users, provide image data to the client devices to enable the user to view what is occurring near their A/V device, and enable two-way audio communication with a person near their A/V device.

During a normal operation mode, when an A/V device detects the presence of a visitor near the A/V device, it may capture video images and/or audio and send a connection request, via a user's network (e.g., a local area network (LAN)) and a network (e.g., a wide area network (WAN)), to one or more backend devices (e.g., servers, storage, APIs, etc.) in the network. The connection request is transmitted through a network-connected device (e.g., a router) of the user's network and the network before reaching the backend device(s). The backend device(s) may identity one or more client devices associated with the A/V device, and send the connection request to the client device(s) through the network and the user's network, for example, to enable two-way audio communication between the A/V device and the client device(s).

Instead of, or in addition to, transmitting the connection request to the client device(s), the A/V device may also include the capability of communicating over wired or wireless connections with one or more signaling devices (e.g., wireless speaker devices) located in or near the structure where the A/V device is installed. For example, when a visitor presses a button on the A/V device (e.g., an A/V doorbell), the A/V device may transmit a signal (e.g., a visitor detection signal) via the network-connected device (e.g., a router) of the user's network and the network before reaching one or more of the backend devices. The backend device(s) may identify one or more wireless speaker devices, and send a tone signal to the wireless speaker device(s) within the user's network to cause the wireless speaker device(s) to emit a sound (e.g., a doorbell tone, a user-customized sound, a ringtone, a seasonal ringtone, etc.) to notify the user inside the structure that the visitor is at the front door.

The reliability and availability of network devices (e.g., router and backend devices) and network (e.g., LAN and/or WAN) connections facilitate providing user notification(s)/alert(s) and enable communication between the A/V device and the user's client device(s). For example, when there is an outage on any of the network devices or network connections (e.g., due to failures of the network devices or network connections), the user alerts and tone signals from the A/V device cannot reach the client devices or the wireless speaker devices, and vice versa. As a result, the user cannot receive alerts/notifications on his/her client device(s) and/or through the wireless speaker device(s). A failure to receive alerts/notifications from the A/V device may prevent the A/V device from working as intended. For example, when a residence has unwanted visitors (e.g., burglars), but an A/V device at the residence cannot notify the owner or law enforcement of such occurrence due to network device failures or network connection failures, then the A/V device is deprived of its utility. In another example, when one or more guests arrive at a host's front door and press a button on an A/V device, due to network device failures or network connection failures, the host inside the residence may be unable to receive an audible notification from the wireless speaker device of his/her guests' arrival.

The present embodiments solve at least the aforementioned problems by, for example, leveraging the functionality of a smart-home hub device (also referred to herein as "a hub device") to connect an A/V device with one or more backend device(s) when there is a communication disruption due to an outage on any of the intermediate network devices or network connections between the A/V device and the backend device(s). In some embodiments, in response to detecting the disruption, the hub device may reconfigure its settings to form a communication link (e.g., a wireless cellular communication link, a low-power wide-area network (LPWAN) communication link, or another type of communication link) that bypasses the failed intermediate network devices and/or network connections to connect the A/V device with the backend device(s).

In addition, the present embodiments solve at least the aforementioned problems by, for example, leveraging the functionality of the hub device to perform functions that otherwise would be performed by the backend device(s), when there is an outage at the backend device(s). In some embodiments, in response to detecting an outage at the backend device(s), the hub device may reconfigure its settings to perform functions that otherwise would be performed by the backend device(s), for example, to store data from the A/V device, to identify one or more devices (e.g., client devices, wireless speaker devices, and other home automation devices) associated with the A/V device, to facilitate communication between the A/V device and the one or more aforementioned devices by bypassing the unavailable backend device(s), and/or to serve as one or more APIs.

In some examples, in response to detecting a visitor's presence, an A/V device may begin to capture video images and/or audio, and send a user alert/visitor notification signal to one or more backend devices through a user's network (e.g., a LAN) and a network (e.g., a WAN). When there is a communication disruption due to an outage on any of the intermediate network devices (e.g., the router) or network connections between the A/V device and the backend device(s), the A/V device may reconfigure its settings to communicate with a hub device, which forms a communication link (e.g., a wireless cellular communication link, an LPWAN communication link, or another type of communication link) that bypasses the failed network devices (e.g., the router) and/or network connections between the A/V device and the backend device(s). In some examples, in response to the disruption due to the outage on any of the intermediate network devices (e.g., the router) or network connections between the A/V device and the backend device(s), the hub device may reconfigure its settings to connect the A/V device with the backend device(s) using the communication link (e.g., a wireless cellular communication link, an LPWAN communication link, or another type of communication link) that bypasses the failed network device(s) (e.g., the router) and/or network connection(s) between the A/V device and the backend device(s). As a result, the user alert/visitor notification signal is able to reach one or more devices (e.g., client devices, wireless speaker devices, and/or other home automation devices) associated with the A/V device despite the outages on the intermediate network device(s) and/or network connection(s).

In some examples, in response to detecting a visitor's presence, an A/V device may begin to capture video images and/or audio, and send a user alert/visitor notification signal to one or more backend devices through a user's network (e.g., a LAN) and a network (e.g., a WAN). When there is a communication disruption due to an outage of the backend device(s), the A/V device may reconfigure its settings to communicate with a hub device to form a communication link (e.g., a wireless cellular communication link, an LPWAN communication link, or another type of communication link) that bypasses the failed backend device(s) to reach one or more devices (e.g., client devices, wireless speaker devices, and/or other home automation devices) associated with the A/V device. In some examples, in response to the disruption due to the outage of the backend device(s), the hub device may reconfigure its settings to perform functions that otherwise would be performed by the backend device(s), for example, to store data from the A/V device, to identify one or more devices (e.g., client devices, wireless speaker devices, and/or other home automation devices) associated with the A/V device, and/or to serve as one or more APIs. As a result, the user alert/visitor notification signal is able to reach one or more devices (e.g., client devices, wireless speaker devices, and/or other home automation devices) associated with the A/V device despite the outage of the backend device(s).

Among other advantages, users may receive alerts and notifications from an A/V device even when there is an outage on any of the intermediate network devices and/or network connections between the A/V device and the backend device(s), thereby improving reliability and user experience of the A/V devices, and strengthening the ability of such devices to reduce crime and enhance public and home safety.

The following detailed description describes the present embodiments with reference to the drawings. In the drawings, reference numbers label elements of the present embodiments. These reference numbers are reproduced below in connection with the discussion of the corresponding drawing features.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

FIG. 1 is a functional block diagram illustrating a system 100 for communicating in a network according to various aspects of the present disclosure. Home automation, or smart home, is building automation for the home. Home automation enables users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices, sensors, automation devices, A/V recording and communication devices, etc.), when remotely monitored and controlled via a network (Internet/ a public switched telephone network (PSTN)) 120, may be considered to be components of the "Internet of Things." Smart home systems may include switches and/or sensors connected to a central hub (e.g., such as a smart-home hub device, which may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on client devices (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device) and causing the smart home devices (e.g., sensors, automation devices, etc.) to perform an operation in response to the user input.

With reference to FIG. 1, the system 100 include an A/V recording and communication device 101 (also referred to herein as "A/V device 101"). While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. In another example, the present embodiments may include one or more A/V recording and communication floodlight controllers instead of, or in addition to, one or more A/V recording and communication doorbells.

The A/V device 101 may be located near the entrance to a structure (not shown), such as a dwelling, a business, a storage facility, etc. The A/V device 101 includes a camera 102, a microphone 104, and a speaker 108. The camera 102 may comprise, for example, a high definition (HD) video camera, such as one capable of capturing video images at an image display resolution of 720p, or 1080p, 4K, or any other image display resolution. While not shown, the A/V device 101 may also include other hardware and/or components, such as a housing, a communication module (which may facilitate wired and/or wireless communication with other devices), one or more motion sensors (and/or other types of sensors), a button, etc. The A/V device 101 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V device 101 communicates with a user's network 110, which may comprise a LAN that may be a wired and/or wireless network. If the user's network 110 is wireless, or includes a wireless component, the network 110 may be a wireless fidelity (Wi-Fi) network compatible with the IEEE 802.11 standard and/or other wireless communication standard(s). The user's network 110 is connected to another network 120, which may comprise a WAN, such as the Internet and/or a public switched telephone network (PSTN). As described below, the A/V device 101 may communicate with the user's client device(s) 114 via the user's network 110, the network 120 (Internet/PSTN), and a network of backend devices (e.g., remote storage devices 116, servers 118, and/or APIs 538). The user's client device(s) 114 may comprise, for example, a mobile telephone (may also be referred to as a cellular telephone), such as a smartphone, a personal digital assistant (PDA), and/or other communication devices. In an example, a user's client device 114 may comprise a display (not shown) and related components capable of displaying streaming and/or recorded video images. The user's client device 114 may also comprise a speaker and related components capable of broadcasting streaming and/or recorded audio, and may also comprise a microphone.

The A/V device 101 may also communicate, via the user's network 110 and the network 120 (Internet/PSTN), with the network of servers and/or backend devices, such as (but not limited to) one or more remote storage devices 116 (may be referred to interchangeably as "cloud storage device(s)"), one or more servers 118, and one or more APIs 538. While FIG. 1 illustrates the remote storage device(s) 116, the server(s) 118, and the API(s) 538 as components separate from the network 120, it is to be understood that the remote storage device(s) 116, the server(s) 118, and the API(s) 538 may be considered to be components of the network 120.

The user's wireless network 110 may comprise a LAN, such as a Wi-Fi network compatible with the IEEE 802.11 standard and/or other wireless communication standard(s). The network 120 may comprise a WAN, such as the Internet and/or a PSTN. The network 120 may be any wireless network or any wired network, or a combination thereof, configured to operatively couple the above-mentioned modules, devices, and systems as shown in FIG. 1. For example, the network 120 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, Global Navigation Satellite System (GNSS) (e.g., the Global Positioning System (GPS)), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With reference to FIG. 1, the present embodiments include a wireless speaker device 598. The wireless speaker device 598 may be located inside the structure (not shown) near which the A/V device 101 is located. The wireless speaker device 598 may be communicatively coupled to the A/V device 101 through the user's network 110, the network 120, and the network of servers and/or backend devices (e.g., remote storage devices 116, servers 118, and APIs 538). The wireless speaker device 598 may communicate with the user's wireless network 110 either wirelessly or via a wired connection. In embodiments configured for receiving an Ethernet cable, the wireless speaker device 598 may be powered via Power over Ethernet (PoE), in which electrical power may be passed, along with data, via the connected Ethernet cable.

According to one or more aspects of the present embodiments, when the A/V device 101 detects a visitor's presence, it begins capturing video images within a field of view of the camera 102. The A/V device 101 may also capture audio through the microphone 104. The A/V device 101 may detect the visitor's presence by detecting motion using the camera 102 and/or a motion sensor, and/or by detecting that the visitor has pressed a front button of the A/V device 101 (if the A/V device 101 is a doorbell).

In response to the detection of the visitor, the A/V device 101 sends a user alert to the user's client device(s) 114 via the user's network 110, the network 120, and the network of servers and/or backend devices (e.g., remote storage devices 116, servers 118, and/or APIs 538). The A/V device 101 may also send streaming video and streaming audio to the user's client device(s) 114. If the user answers the alert, two-way audio communication may then occur between the visitor and the user through the A/V device 101 and the user's client device(s) 114. The user may view the visitor throughout the duration of the call, but the visitor cannot see the user (unless the A/V device 101 includes a display, which it may in some embodiments).

The video images captured by the camera 102 of the A/V device 101 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With reference to FIG. 1, the present embodiments include a API (application programming interface) 538 having an API 540 and a wireless speaker service 542. While FIG. 1 illustrates the API 538, the API 540, and the wireless speaker service 542 as components separate from the network 120, it is to be understood that the API 538, the API 540, and/or the wireless speaker service 542 may be considered to be components of the network 120.

The API 538, may include one or more components. For example, the API 538 may comprise a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. The API 538 may, for example, comprise many such applications, each of which communicate with one another using their public APIs. In some embodiments, the API backend may hold the bulk of the user data and offer the user management capabilities, leaving the clients to have very limited state.

The API 538 illustrated FIG. 1 may include one or more APIs, such as the API 540. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The API 538 illustrated in FIG. 1 may further include one or more services (also referred to as network services), such as the wireless speaker service 542. A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

The API 538 illustrated in FIG. 1 includes a wireless speaker service, such as the wireless speaker service 542. The wireless speaker service 542 may comprise one or more wireless speaker data structures 546 storing information about a plurality of wireless speaker devices, such as the wireless speaker device 598. For example, the information may include information about each wireless speaker device and at least one associated wireless A/V recording and communication device, such as the wireless A/V device 101. The wireless speaker service 542 may access the information in the wireless speaker data structure(s) 546 when needed to determine which wireless speaker device(s) is/are associated with a wireless A/V recording and communication device that sends a visitor detection signal 550 to the API 538, as further described below. The wireless speaker service 542 may also maintain the information in the wireless speaker data structure(s) 546 and update the information in the wireless speaker data structure(s) 546 when new wireless speaker devices are activated, when existing wireless speaker devices are deactivated, and/or when associations between existing wireless speaker devices and wireless A/V recording and communication devices are changed. In some embodiments, the wireless speaker service 542 may have a persistent connection with the wireless speaker device 598. A persistent connection advantageously reduces latency between the wireless speaker service 542 and the wireless speaker device 598, as further described below.

To use the present wireless speaker device 598 in connection with the A/V device 101, the user plugs the wireless speaker device 598 into a standard wall outlet, and then connects the wireless speaker device 598 to the user's wireless network 110. The user may then be guided through a setup process in which the wireless speaker device 598 is associated with the A/V device 101, and the association is stored in a data structure so that when a visitor presses the button of the A/V device 10, the system 100 knows which wireless speaker device 598 to activate. For example, the setup process may include an application executing on the user's client device 114. After the wireless speaker device 598 is successfully connected to the wireless network 110, a prompt may be displayed on the user's client device 114. The prompt may request the user to select a wireless A/V recording and communication device, such as a doorbell or a security camera, to associate to the wireless speaker device 598. When the user makes a selection, the user's client device 114 may send a signal, via the wireless network 110 and the network 120, to the API 538, and the wireless speaker service 542 may update the information in the wireless speaker data structure(s) 546 so that the wireless speaker device 598 is associated with the user-selected wireless A/V recording and communication device. Later, when motion events and/or button-press events are initiated by the user-selected wireless A/V recording and communication device, the wireless speaker service 542 sends a signal to the associated wireless speaker device 598 and the wireless speaker device 598 emits a tone, as further described below.

According to one or more aspects of the present embodiments, when the A/V device 101 detects a visitor's presence, it sends a visitor detection to the API 540 via the user's network 110 (e.g., a LAN), the network 120 (e.g., a WAN), and the network of servers and/or backend devices (e.g., remote storage devices 116, servers 118, and/or APIs 538). The API 540 receives the visitor detection signal from the A/V device 101. The visitor detection signal may include information about the visitor-detection event, such as whether the visitor was detected via sensed motion or via a button press. The API 540 then sends a signal (e.g., a wireless speaker activation signal) to the wireless speaker service 542, which sends a signal to the wireless speaker device 598, via the network 120 and the user's network 110. The wireless speaker device 598 then emits a tone to alert any person(s) within earshot of the wireless speaker device 598 that a visitor has been detected at the A/V device 101. As described above, in some embodiments, the wireless speaker service 542 may have a persistent connection with the wireless speaker device 598. A persistent connection advantageously reduces latency between the wireless speaker service 542 and the wireless speaker device 598, so that when the wireless speaker service 542 sends the tone signal to the wireless speaker device 598 there is little if any delay between the tone signal 554 being sent and the wireless speaker device 598 emitting a tone from its speaker. For example, because of the persistent connection, there is no need for the wireless speaker device 598 to re-establish itself on the wireless speaker service 542 before the tone signal can be received by the wireless speaker device 598.

Figure 2:
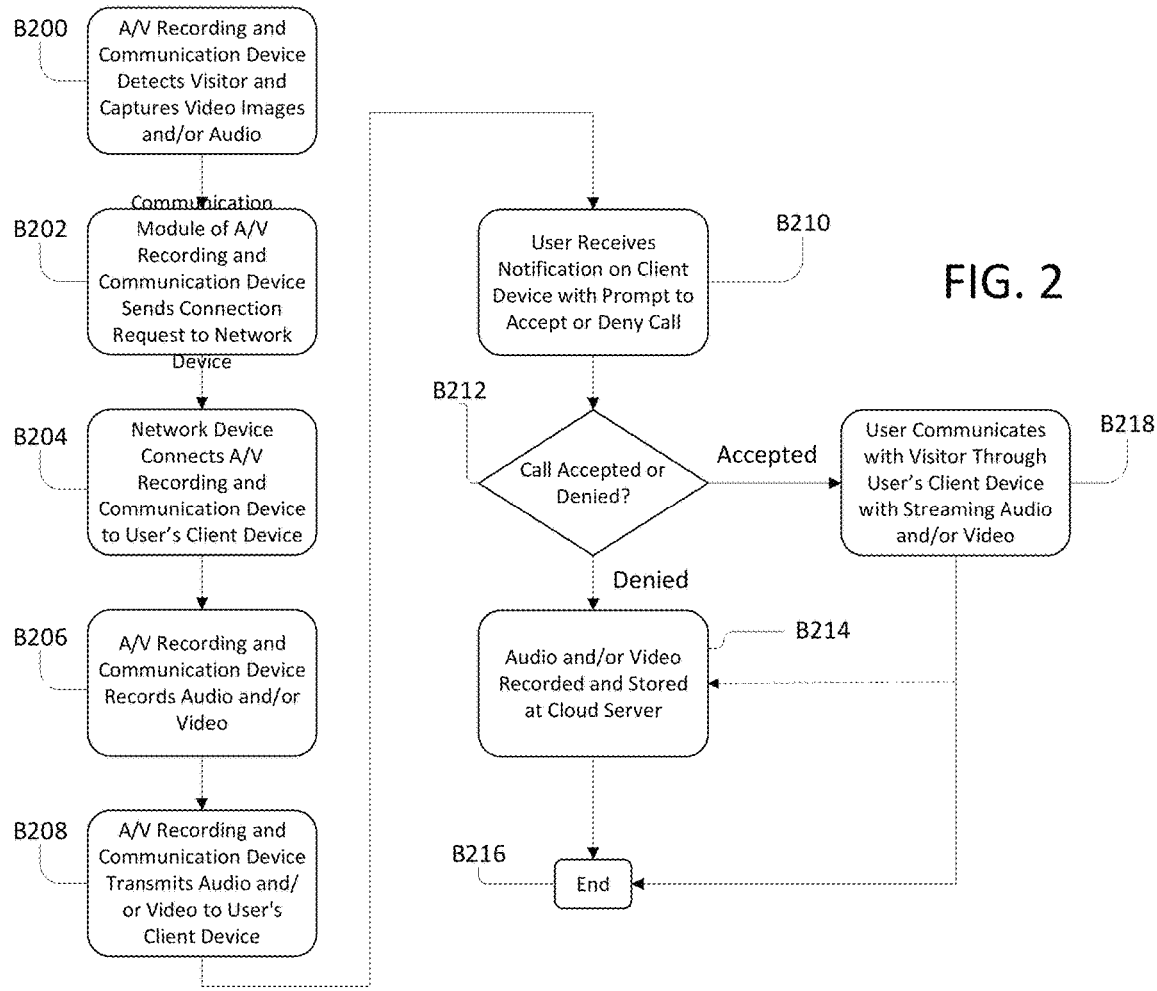
FIG. 2 is a flowchart illustrating one embodiment of a process for streaming and storing A/V content from an A/V recording and communication device, according to various aspects of the present disclosure.

FIG. 2 is a flowchart illustrating a process for streaming and storing A/V content from the A/V device 101 according to various aspects of the present disclosure. At block B200, the A/V device 101 detects the visitor's presence and captures video images within a field of view of the camera 102. The A/V device 101 may also capture audio through the microphone 104. As described above, the A/V device 101 may detect the visitor's presence by detecting motion using the camera 102 and/or a motion sensor, and/or by detecting that the visitor has pressed a front button of the A/V device 101 (if the A/V device 101 is a doorbell). Also as described above, the video recording/capture may begin when the visitor is detected, or may begin earlier, as described below.

At block B202, a communication module of the A/V device 101 sends a connection request, via the user's network 110 and the network 120, to a device in the network 120. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the API 538, which is described above.

In response to the request, at block B204 the network device may connect the A/V device 101 to the user's client device 114 through the user's network 110 and the network 120. At block B206, the A/V device 101 may record available audio and/or video data using the camera 102, the microphone 104, and/or any other device/sensor available. At block B208, the audio and/or video data is transmitted (streamed) from the A/V device 101 to the user's client device 114 via the user's network 110 and the network 120. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V device 101 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V device 101 and the session ends at block B216. In some embodiments, the audio and/or video data may be recorded and stored at a cloud server (block B214) even if the user accepts the notification and communicates with the visitor through the user's client device 114.

Figure 3:
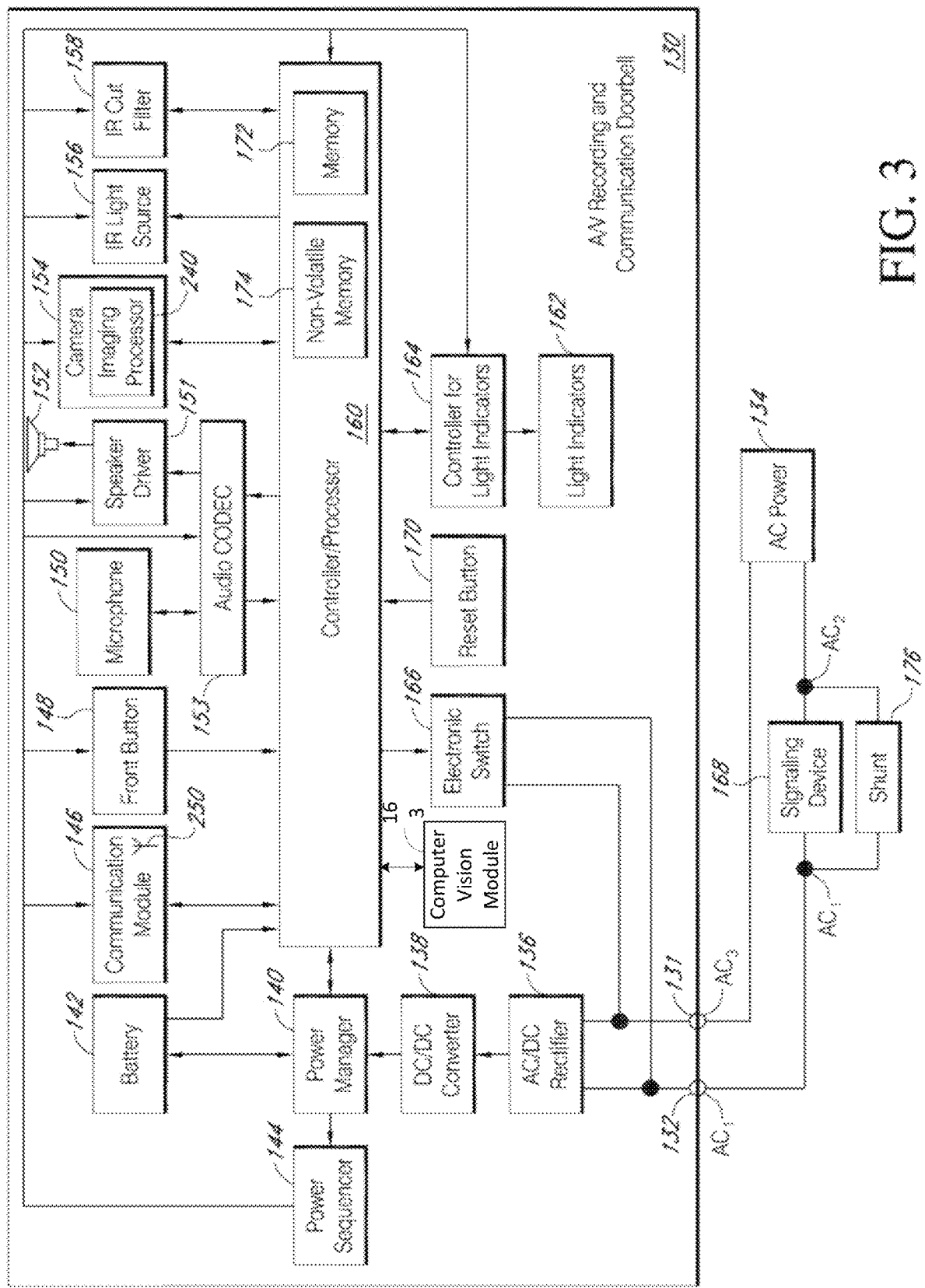
FIG. 3 is a functional block diagram illustrating an embodiment of an A/V recording and communication doorbell, according to various aspects of the present disclosure.
Figure 4:
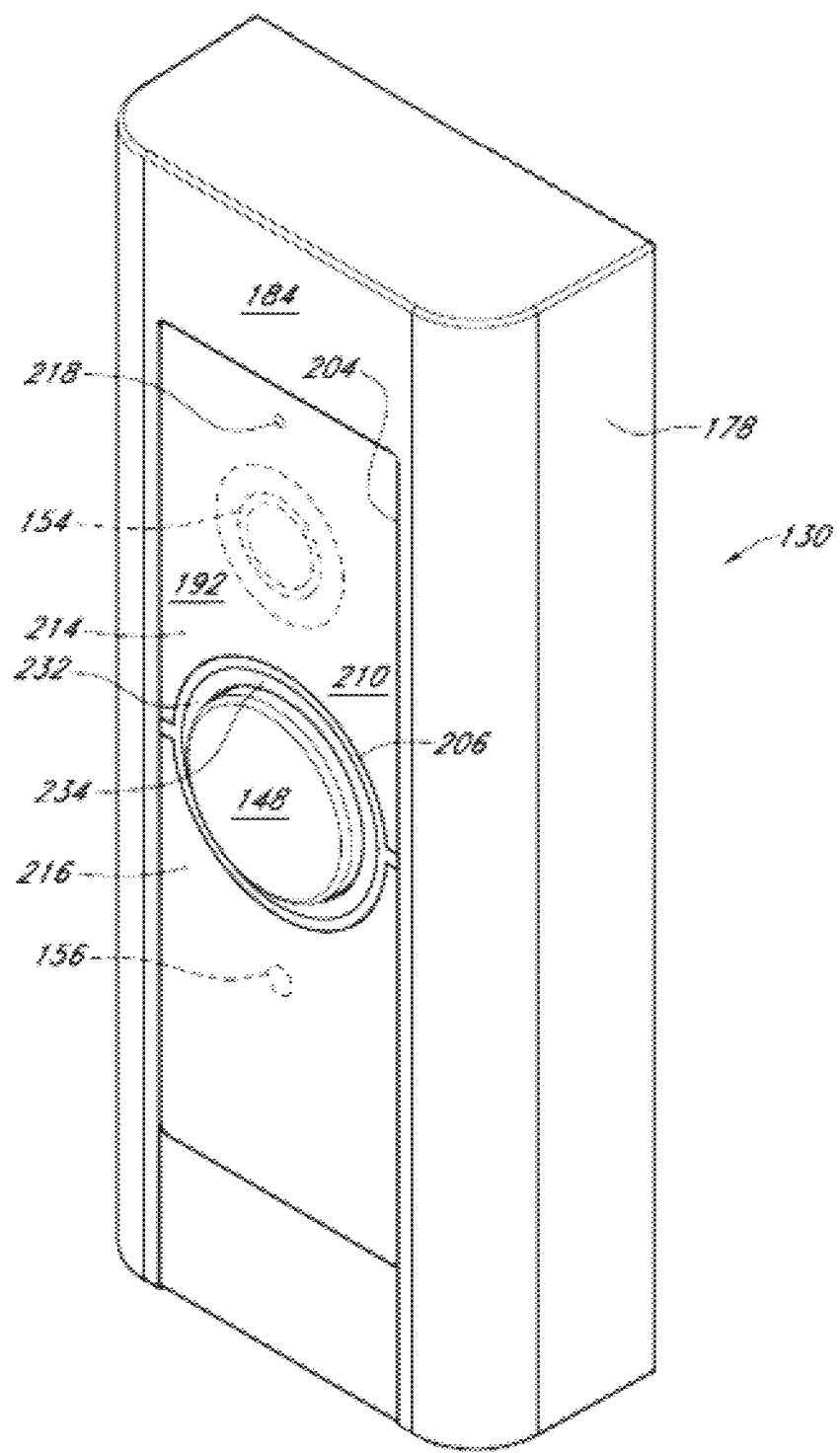
FIG. 4 is a front perspective view of an embodiment of an A/V recording and communication doorbell, according to various aspects of the present disclosure.
Figure 5:
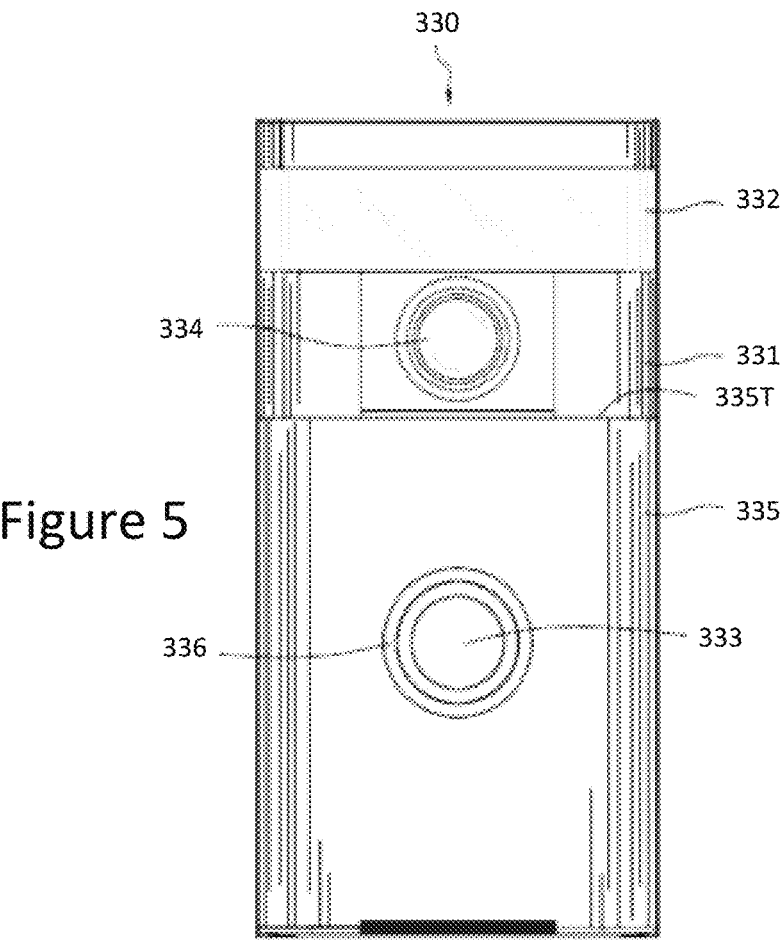
FIG. 5 is a front view of another embodiment of an A/V recording and communication doorbell, according to various aspects of the present disclosure.

FIGS. 3-5 illustrate an A/V communication doorbell 130 according to an aspect of present embodiments. FIG. 3 is a front view, FIG. 4 is a rear view, and FIG. 5 is a functional block diagram of the components within or in communication with the doorbell 130. With reference to FIG. 3, the doorbell 130 includes a faceplate 135 mounted to a back plate 139 (FIG. 4). The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With further reference to FIG. 3, the doorbell 130 further includes an enclosure 131 that engages the faceplate 135. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a functional block diagram of the components within or in communication with the doorbell 130, according to an aspect of the present embodiments. A bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. The bracket PCB 149 may be located outside the housing of the doorbell 130 so as to reduce interference from heat, pressure, moisture, and/or other stimuli generated by the internal components of the doorbell 130.

With further reference to FIG. 5, the bracket PCB 149 may further comprise terminal screw inserts 154, which may be configured to receive terminal screws (not shown) for transmitting power to electrical contacts on a mounting bracket (not shown). The bracket PCB 149 may be electrically and/or mechanically coupled to the power PCB 148 through the terminal screws, the terminal screw inserts 154, the spring contacts 140, and the electrical contacts. The terminal screws may receive electrical wires located at the surface to which the doorbell 130 is mounted, such as the wall of a building, so that the doorbell can receive electrical power from the building's electrical system. Upon the terminal screws being secured within the terminal screw inserts 154, power may be transferred to the bracket PCB 149, and to all of the components associated therewith, including the electrical contacts. The electrical contacts may transfer electrical power to the power PCB 148 by mating with the spring contacts 140.

With further reference to FIG. 5, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 120, routed by the one or more servers 118, and delivered to the user's client device 114. When the user speaks, after being transferred through the network 120, digital audio data is decompressed by audio CODEC 161 and emitted to the visitor via the speakers 157.

With further reference to FIG. 5, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 5, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 5, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 5, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p, 1080p, 4K, etc.) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133 and its associated components. An example A/V recording and communication security camera may further omit other components, such as, for example, the bracket PCB 149 and its associated components.

Figure 6:
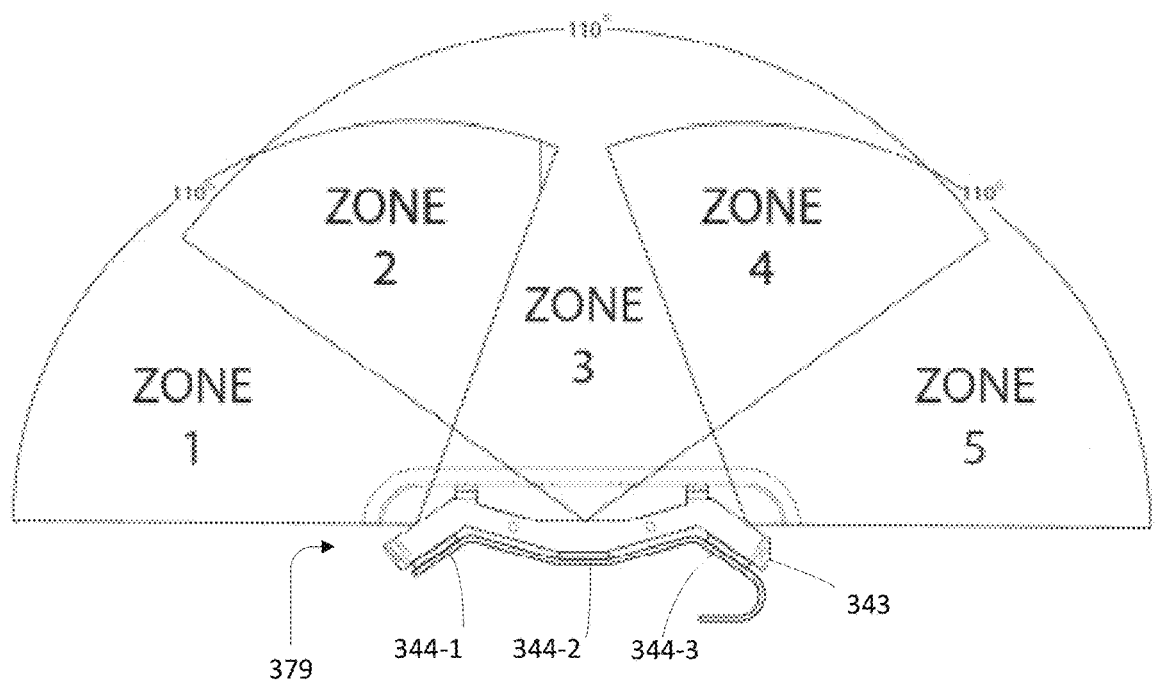
FIG. 6 is a top view of a passive infrared sensor assembly of the A/V recording and communication doorbell of FIG. 5, illustrating fields of view of passive infrared sensors of the passive infrared sensor assembly, according to various aspects of the present disclosure.
Figure 7:
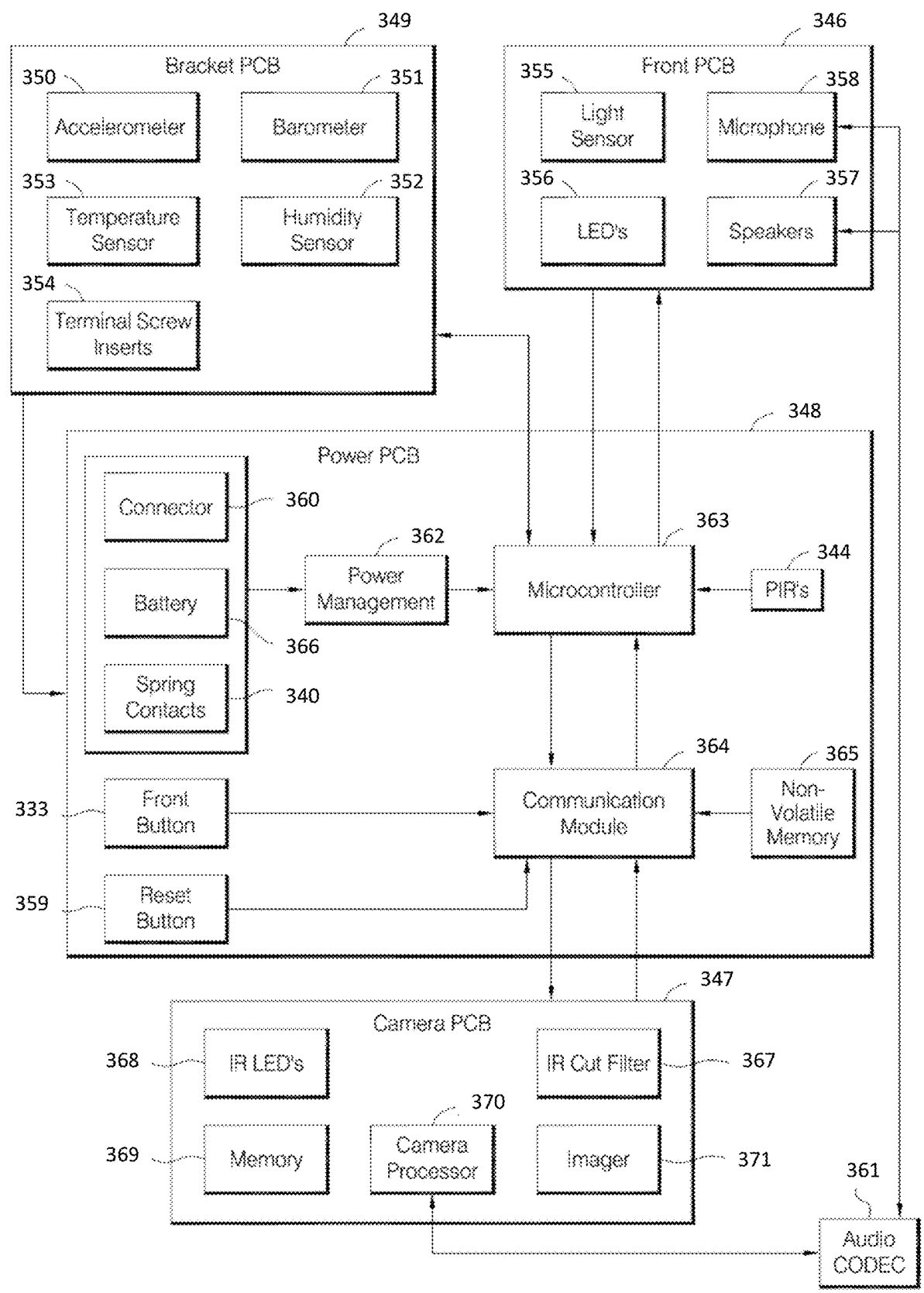
FIG. 7 is a functional block diagram of the components of the A/V recording and communication doorbell of FIG. 5.

FIGS. 6 and 7 illustrate an example A/V recording and communication security camera according to various aspects of the present embodiments. With reference to FIG. 6, the security camera 330, similar to the video doorbell 130, includes a faceplate 135 that is mounted to a back plate 139 and an enclosure 131 that engages the faceplate 135. Collectively, the faceplate 135, the back plate 139, and the enclosure 131 form a housing that contains and protects the inner components of the security camera 330. However, unlike the video doorbell 130, the security camera 330 does not include any front button 133 for activating the doorbell. The faceplate 135 may comprise any suitable material, including, without limitation, metals, such as brushed aluminum or stainless steel, metal alloys, or plastics. The faceplate 135 protects the internal contents of the security camera 330 and serves as an exterior front surface of the security camera 330.

With continued reference to FIG. 6, the enclosure 131 engages the faceplate 135 and abuts an upper edge 135T of the faceplate 135. As discussed above with reference to FIG. 3, in alternative embodiments, one or more gaps between the enclosure 131 and the faceplate 135 may facilitate the passage of sound and/or light through the security camera 330. The enclosure 131 may comprise any suitable material, but in some embodiments the material of the enclosure 131 preferably permits infrared light to pass through from inside the security camera 330 to the environment and vice versa. The security camera 330 further includes a lens 132. Again, similar to the video doorbell 130, in some embodiments, the lens may comprise a Fresnel lens, which may be patterned to deflect incoming light into one or more infrared sensors located within the security camera 330. The security camera 330 further includes a camera 134, which captures video data when activated, as described above and below.

With further reference to FIG. 6, the enclosure 131 may extend from the front of the security camera 330 around to the back thereof and may fit snugly around a lip (not shown) of the back plate 139. The back plate 139 may comprise any suitable material, including, without limitation, metals, such as brushed aluminum or stainless steel, metal alloys, or plastics. The back plate 139 protects the internal contents of the security camera 330 and serves as an exterior rear surface of the security camera 330. The faceplate 135 may extend from the front of the security camera 330 and at least partially wrap around the back plate 139, thereby allowing a coupled connection between the faceplate 135 and the back plate 139. The back plate 139 may have indentations (not shown) in its structure to facilitate the coupling.

With continued reference to FIG. 6, the security camera 330 further comprises a mounting apparatus 137. The mounting apparatus 137 facilitates mounting the security camera 330 to a surface, such as an interior or exterior wall of a building, such as a home or office. The faceplate 135 may extend from the bottom of the security camera 330 up to just below the camera 134, and connect to the back plate 139 as described above. The lens 132 may extend and curl partially around the side of the security camera 330. The enclosure 131 may extend and curl around the side and top of the security camera 330, and may be coupled to the back plate 139 as described above. The camera 134 may protrude from the enclosure 131, thereby giving it a wider field of view. The mounting apparatus 137 may couple with the back plate 139, thereby creating an assembly including the security camera 330 and the mounting apparatus 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components within or in communication with the doorbell 330, according to an aspect of the present embodiments. The bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. The bracket PCB 349 may be located outside the housing of the doorbell 330 so as to reduce interference from heat, pressure, moisture, and/or other stimuli generated by the internal components of the doorbell 330.

With further reference to FIG. 7, the bracket PCB 349 may further comprise terminal screw inserts 354, which may be configured to receive the terminal screws and transmit power to the electrical contacts on the mounting bracket. The bracket PCB 349 may be electrically and/or mechanically coupled to the power PCB 348 through the terminal screws, the terminal screw inserts 354, the spring contacts 340, and the electrical contacts. The terminal screws may receive electrical wires located at the surface to which the doorbell 330 is mounted, such as the wall of a building, so that the doorbell can receive electrical power from the building's electrical system. Upon the terminal screws being secured within the terminal screw inserts 354, power may be transferred to the bracket PCB 349, and to all of the components associated therewith, including the electrical contacts. The electrical contacts may transfer electrical power to the power PCB 348 by mating with the spring contacts 340.

With further reference to FIG. 7, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 5). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 120, routed by one or more servers 118, and delivered to the user's client device 114 (FIG. 1). When the user speaks, after being transferred through the network 120, digital audio data is decompressed by audio CODEC 361 and emitted to the visitor via the speakers 357.

With further reference to FIG. 7, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 7, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 7, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 7, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

Figure 8:
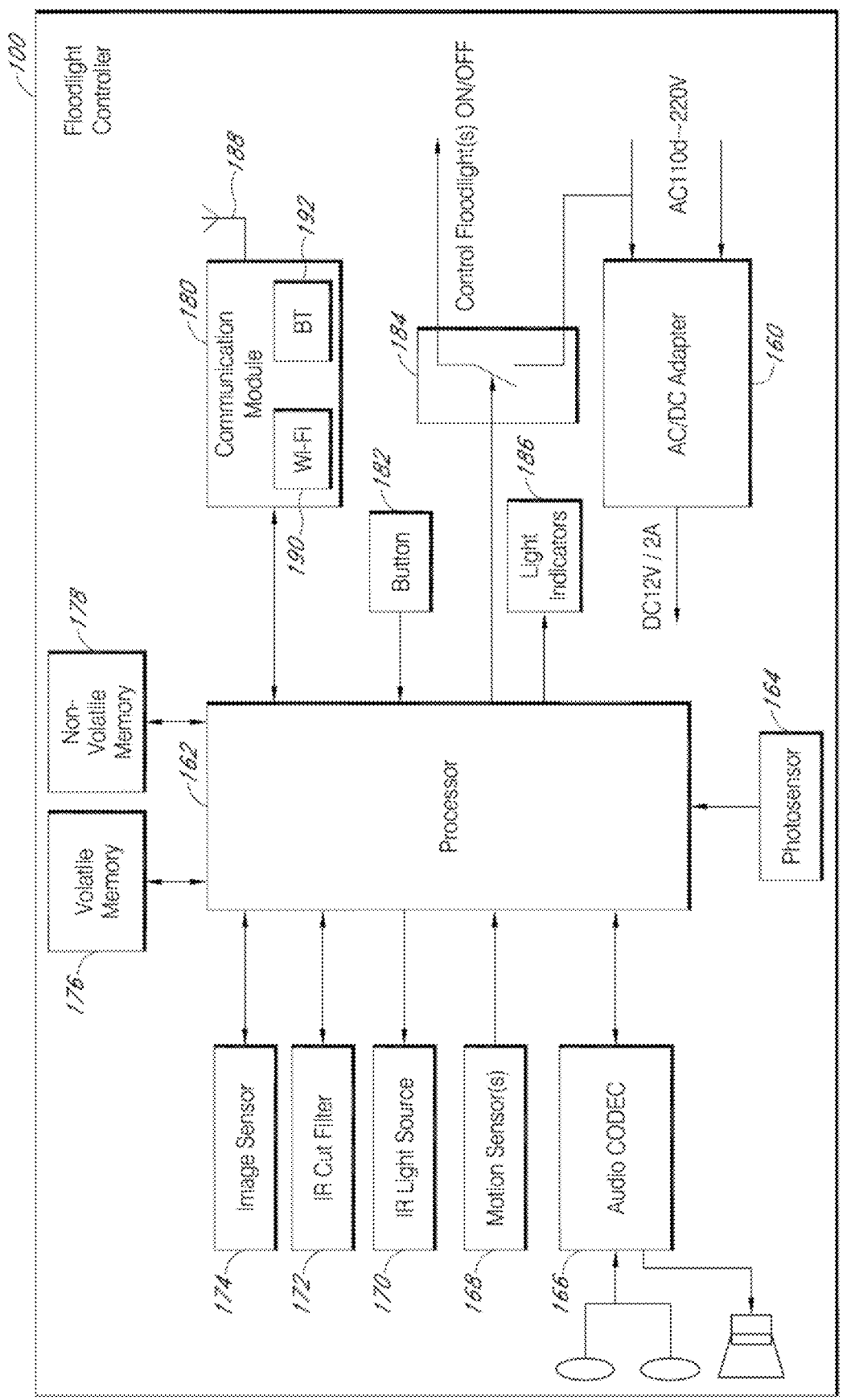
FIG. 8 is a functional block diagram of the components of a floodlight controller with A/V recording and communication features, according to various aspects of the present disclosure.
Figure 9:
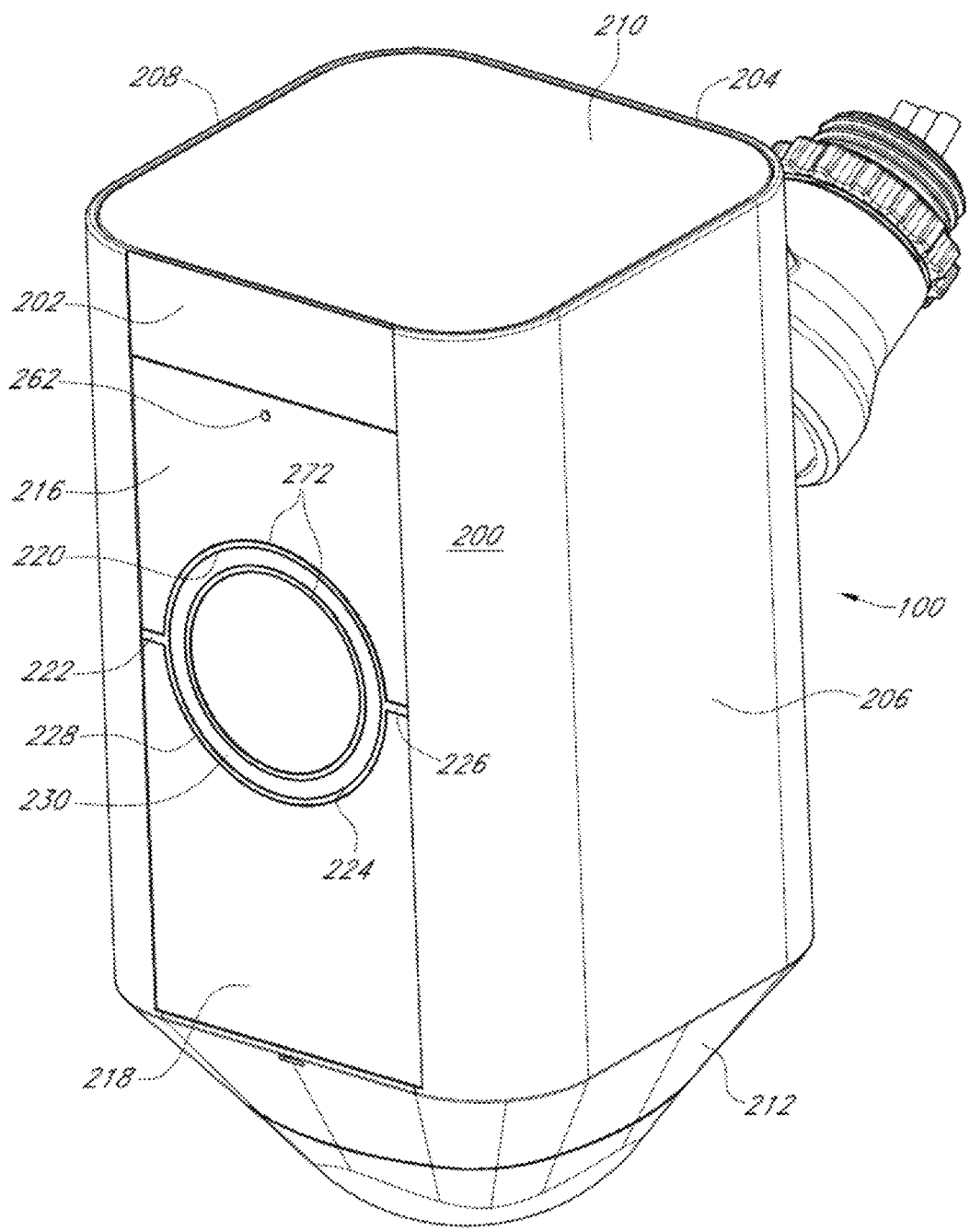
FIG. 9 is an upper front perspective view of a floodlight controller with A/V recording and communication features, according to various aspects of the present disclosure.
Figure 10:
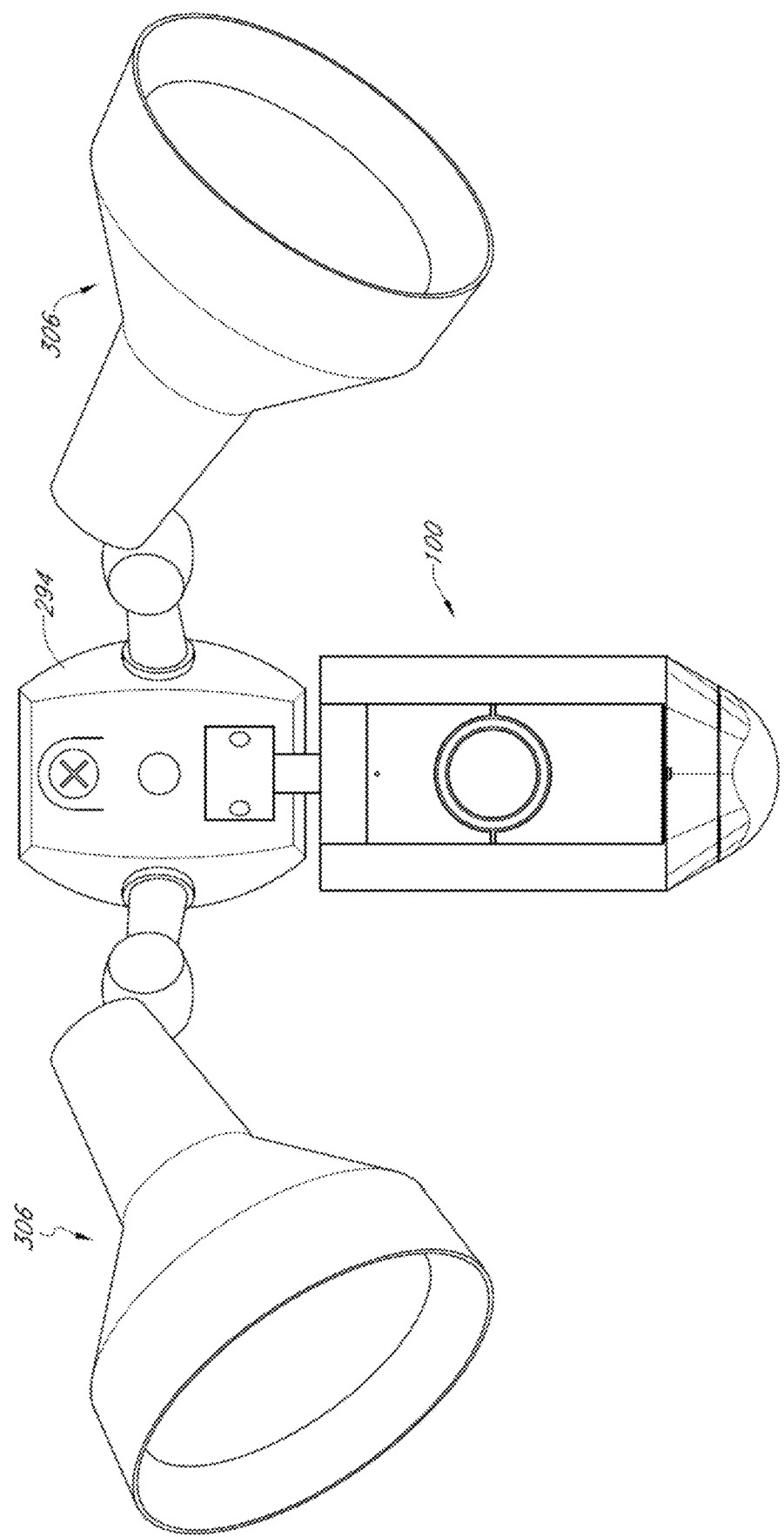
FIG. 10 is a front elevation view of the floodlight controller with A/V recording and communication features of FIG. 9 in combination with a floodlight device, according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 8-10 illustrate an example A/V recording and communication floodlight controller according to various aspects of the present embodiments. FIG. 8 is a functional block diagram illustrating various components of the floodlight controller 100 and their relationships to one another. For example, the floodlight controller 100 comprises an AC/DC adapter 160. The floodlight controller 100 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 160, which may convert the incoming AC power to DC (direct-current) and may step down the voltage from 110-220 VAC to a lower output voltage of about 12 VDC and an output current of about 2 A, for example. In various embodiments, the output of the AC/DC adapter 160 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 100 further comprises other components, including a processor 162 (may also be referred to as a controller), a photosensor 164, an audio CODEC (coder-decoder) 166, the at least one speaker 108, the at least one microphone 106, at least one motion sensor 168, an infrared (IR) light source 170, an IR cut filter 172, an image sensor 174 (may be a component of the camera 102, and may be referred to interchangeably as the camera 102), volatile memory 176, non-volatile memory 178, a communication module 180, a button 182, a switch 184 for controlling one or more floodlights, and a plurality of light indicators 186. Each of these components is described in detail below.

With further reference to FIG. 8, the processor 162 may perform data processing and various other functions, as described below. The processor 162 may comprise an integrated circuit including a processor core, the volatile memory 176, the non-volatile memory 178, and/or programmable input/output peripherals (not shown). The volatile memory 176 may comprise, for example, DDR3 SDRAM (double data rate type three synchronous dynamic random-access memory). The non-volatile memory 178 may comprise, for example, NAND flash memory. In the embodiment illustrated in FIG. 8, the volatile memory 176 and the non-volatile memory 178 are illustrated outside the box representing the processor 162. The embodiment illustrated in FIG. 8 is, however, merely an example, and in some embodiments the volatile memory 176 and/or the non-volatile memory 178 may be physically incorporated with the processor 162, such as on the same chip. The volatile memory 176 and/or the non-volatile memory 178, regardless of their physical location, may be shared by one or more other components (in addition to the processor 162) of the present floodlight controller 100.

With further reference to FIG. 8, the image sensor 174 (camera 102), the IR light source 170, the IR cut filter 172, and the photosensor 164 are all operatively coupled to the processor 162. As described in detail below, the IR light source 170 and the IR cut filter 172 facilitate "night vision" functionality of the camera 102. For example, the photosensor 164 is configured to detect the level of ambient light about the floodlight controller 100. The processor 162 uses the input from the photosensor 164 to control the states of the IR light source 170 and the IR cut filter 172 to activate and deactivate night vision, as described below. In some embodiments, the image sensor 174 may comprise a video recording sensor or a camera chip. In some embodiments, the IR light source 170 may comprise one or more IR light-emitting diodes (LEDs).

With further reference to FIG. 8, the at least one speaker 108 and the at least one microphone 106 are operatively coupled to the audio CODEC 166, which is operatively coupled to the processor 162. The transfer of digital audio between the user and a visitor (or intruder) may be compressed and decompressed using the audio CODEC 166, as described below. The motion sensor(s) 168 is also operatively coupled to the processor 162. The motion sensor(s) 168 may comprise, for example, passive infrared (PIR) sensors, or any other type of sensor capable of detecting and communicating to the processor 162 the presence and/or motion of an object within its field of view. When the processor 162 is triggered by the motion sensor(s) 168, the processor 162 may perform one or more functions, as described below.

With further reference to FIG. 8, the communication module 180 is operatively coupled to the processor 162. The communication module 180, which includes at least one antenna 188, is configured to handle communication links between the floodlight controller 100 and other, external devices or receivers, and to route incoming/outgoing data appropriately. For example, inbound data from the antenna(s) 188 may be routed through the communication module 180 before being directed to the processor 162, and outbound data from the processor 162 may be routed through the communication module 180 before being directed to the antenna(s) 188. The communication module 180 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 180 includes a Wi-Fi chip 190 and a Bluetooth chip 192, but these components are merely examples and are not limiting. Further, while the Wi-Fi chip 190 and the Bluetooth chip 192 are illustrated within the box representing the communication module 180, the embodiment illustrated in FIG. 8 is merely an example, and in some embodiments the Wi-Fi chip 190 and/or the Bluetooth chip 192 are not necessarily physically incorporated with the communication module 180.

In some embodiments, the communication module 180 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 180, and may thus connect to the user's network 110 through the floodlight controller 100. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 100 speaks, audio from the visitor (or intruder) is received by the microphone(s) 106 and compressed by the audio CODEC 166. Digital audio data is then sent through the communication module 180 to the network 120 (FIG. 1) via the user's network 110, routed by the server 118 and/or the API 538, and delivered to the user's client device 114. When the user speaks, after being transferred through the network 120, the user's network 110, and the communication module 180, the digital audio data from the user is decompressed by the audio CODEC 166 and emitted to the visitor through the speaker 108, which may be driven by a speaker 108 driver (not shown).

With further reference to FIG. 8, the button 182 is operatively coupled to the processor 162. The button 182 may have one or more functions, such as changing an operating mode of the floodlight controller 100 and/or triggering a reset of the floodlight controller 100. For example, when the button 182 is pressed and released, it may cause the communication module 180 of the floodlight controller 100 to enter access point (AP) mode, which may facilitate connecting the floodlight controller 100 to the user's network 110. Alternatively, or in addition, when the button 182 is pressed and held down for at least a threshold amount of time, it may trigger the erasing of any data stored at the volatile memory 176 and/or at the non-volatile memory 178, and/or may trigger a reboot of the processor 162.

With reference to FIG. 9, the floodlight controller 100 comprises a housing 200 for containing and protecting the interior components of the floodlight controller 100. The housing 200 includes a front wall 202, a rear wall 204, opposing side walls 206, 208, an upper wall 210, and a tapered lower portion 212. The front wall 202 includes a central opening 214 that receives an upper shield 216 and a lower grill 218. In the illustrated embodiment, front surfaces of the upper shield 216 and the lower grill 218 are substantially flush with a front surface of the front wall 202, but in alternative embodiments these surfaces may not be flush with one another. The upper shield 216 is substantially rectangular, and includes a semicircular indentation 220 along its lower edge 222. The lower grill 218 is substantially rectangular, and includes a semicircular indentation 224 along its upper edge 226. Together, the semicircular indentations 220, 224 in the upper shield 216 and the lower grill 218 form a circular opening 228 that accommodates a light pipe 230. A cover 232 extends across and closes an outer open end of the light pipe 230. The upper shield 216, the lower grill 218, the light pipe 230, and the cover 232 are all described in further detail below. The camera (not shown) is located in the circular opening 228 formed by the upper shield 216 and the lower grill 218, behind the cover 232, and is surrounded by the light pipe 230.

With reference to FIG. 8, the floodlight controller 100 further comprises the microphones 106. In the illustrated embodiment, a first one 258 of the microphones 106 is located along the front of the floodlight controller 100 behind the upper shield 216 (FIG. 9) and a second one 260 of the microphones 106 is located along the left side of the floodlight controller 100 behind the left-side wall 208 (FIG. 9) of the housing 200. Including two microphones 258, 260 that are spaced from one another and located on different sides of the floodlight controller 100 provides the illustrated embodiment of the floodlight controller 100 with advantageous noise cancelling and/or echo cancelling for clearer audio. The illustrated embodiment is, however, just one example and is not limiting. Alternative embodiments may only include one microphone 106, or include two microphones 106 in different locations than as illustrated in FIG. 6.

With reference to FIG. 9, the upper shield 216 may include a first microphone opening 262 located in front of the first microphone 258 to facilitate the passage of sound through the upper shield 216 so that sounds from the area about the floodlight controller 100 can reach the first microphone 258. The left-side wall 208 of the housing 200 may include a second microphone opening (not shown) located in front of the second microphone 260 that facilitates the passage of sound through the left-side wall 208 of the housing 200 so that sounds from the area about the floodlight controller 100 can reach the second microphone 260.

With further reference to FIG. 9, the floodlight controller 100 may further comprise a light barrier 272 surrounding inner and outer surfaces of the light pipe 230. The light barrier 272 may comprise a substantially opaque material that prevents the light generated by the light indicators 186 from bleeding into the interior spaces of the floodlight controller 100 around the light pipe 230. The light barrier 272 may comprise a resilient material, such as a plastic, which may also advantageously provide moisture sealing at the junctures between the light pipe 230 and the upper shield 216 and the lower grill 218. Portions of the light barrier 272 may also extend between the junctures between the upper shield 216 and the lower grill 218.

With further reference to FIG. 9, the floodlight controller 100 further comprises connecting hardware 292 configured for connecting the floodlight controller 100 to a floodlight device 294 (FIG. 10) and a power source (not shown). The floodlight controller 100 further comprises a plurality of wires 304 for connecting the floodlight controller 100 to the power supply and to the floodlight(s) 306 (FIG. 10) of the floodlight device 294 (for enabling the floodlight controller 100 to turn the floodlight(s) 306 on and off). In the illustrated embodiment, three wires 304 are shown, but the illustrated embodiment is merely one example and is not limiting. In alternative embodiments, any number of wires 304 may be provided.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIGS. 3-5, embodiments of the present A/V recording and communication doorbell 130 may include a computer vision module 163. In addition, with reference to FIGS. 6-7, embodiments of the present security camera 330 may include a computer vision module 163. The computer vision module 163 may include any of the components (e.g., hardware) and/or functionality described herein with respect to computer vision, including, without limitation, one or more cameras, sensors, and/or processors. In some of the present embodiments, with reference to FIGS. 3-5, the microphone 158, the camera 134, and/or the imager 171 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIGS. 6-7, the computer vision module 163, and/or the camera 134 and/or the processor 163 may receive information about the person using any one, or any combination of more than one, of the foregoing biometrics.

Figure 11A:
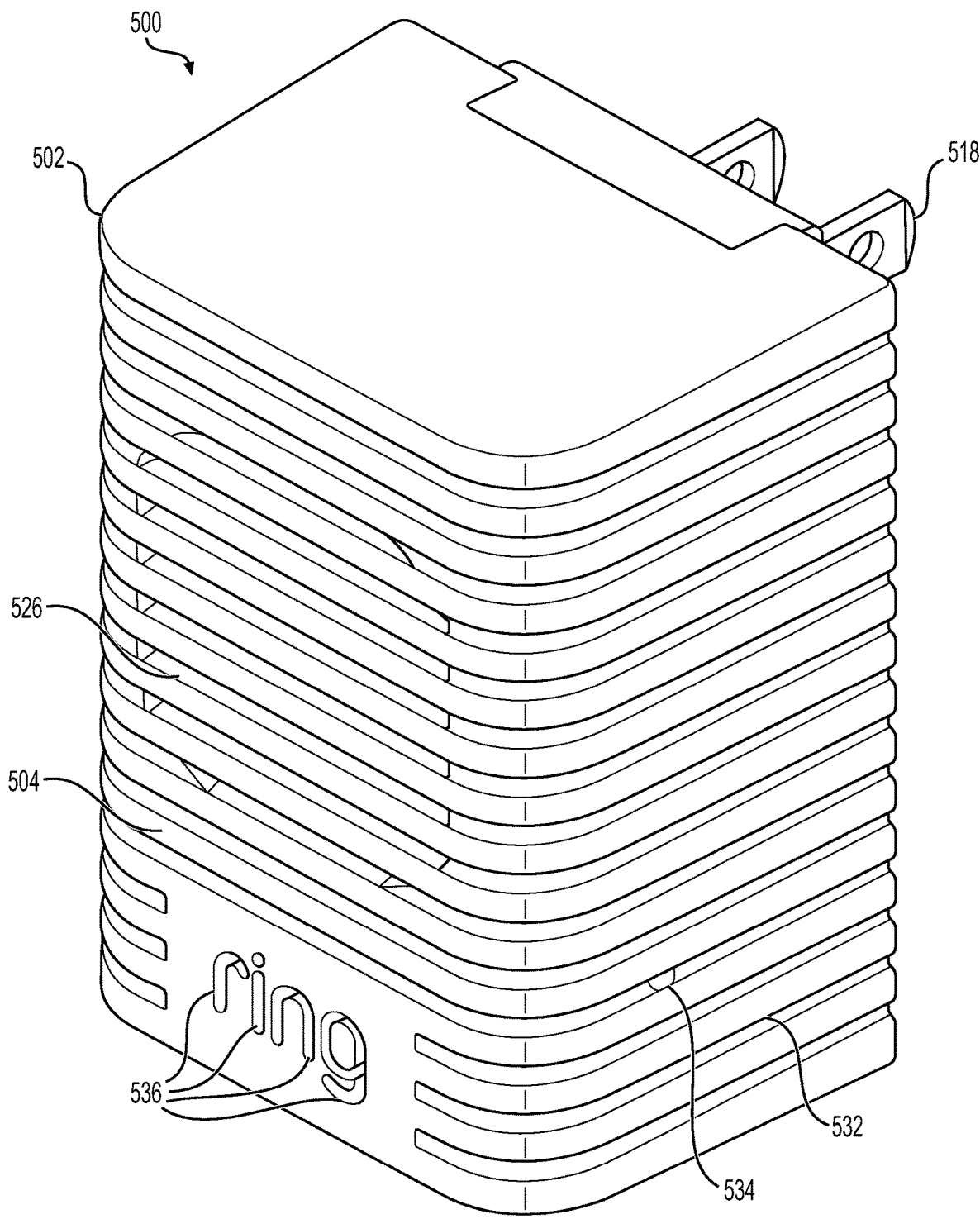
FIG. 11A is a front perspective view of a wireless speaker device for wireless A/V recording and communication devices, according to various aspects of the present disclosure.
Figure 11B:
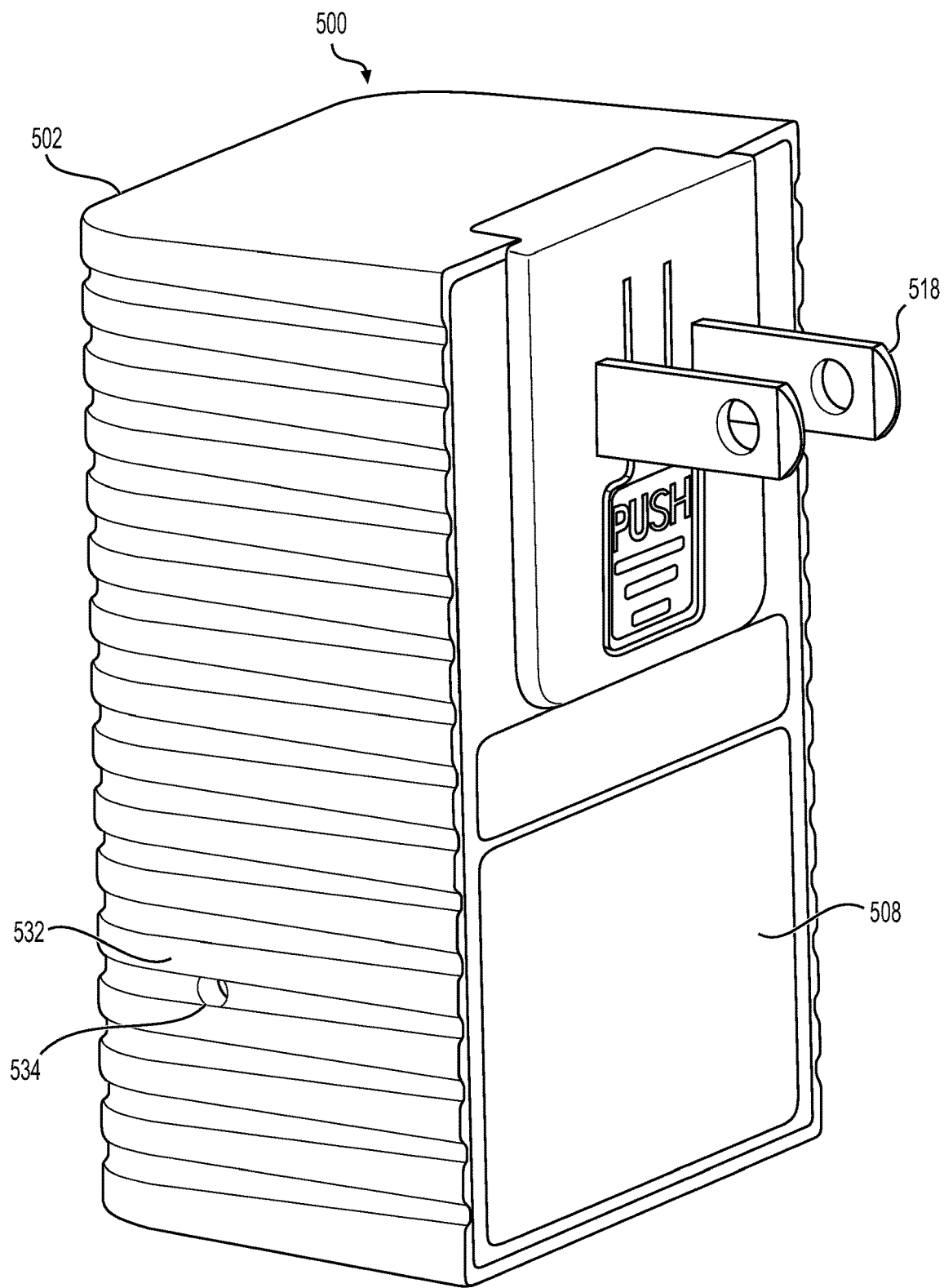
FIG. 11B is a rear perspective view of the wireless speaker device of FIG. 11A.
Figure 12:
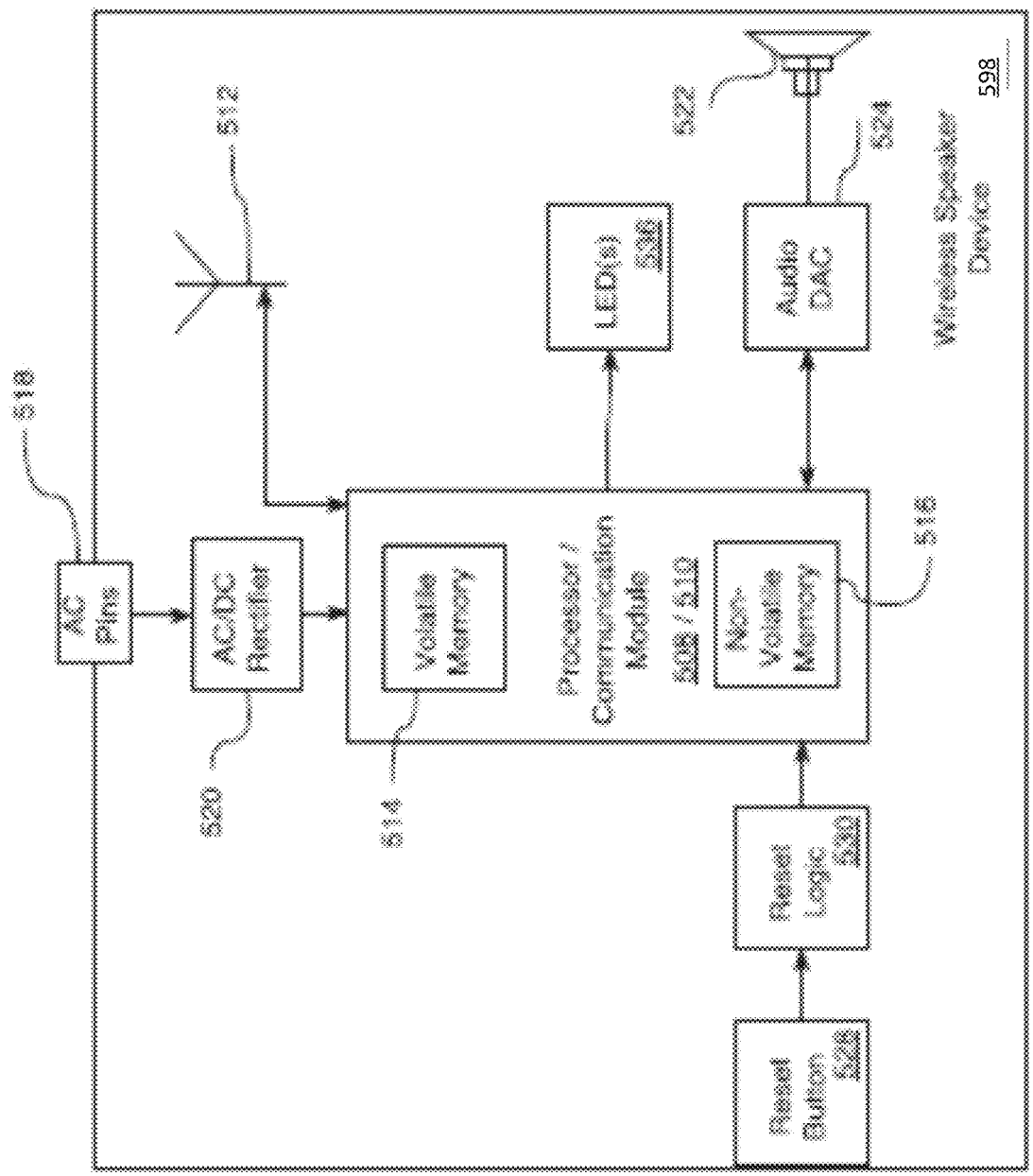
FIG. 12 is a functional block diagram of the wireless speaker device of FIGS. 11A and 11B.

FIGS. 11A and 11B are front and rear perspective views, respectively, of an example embodiment of the wireless speaker device 598 in FIG. 1. FIG. 12 is a functional block diagram of an example embodiment of the wireless speaker device 598 in FIG. 1. With reference to FIGS. 11A and 11B, the wireless speaker device 598 comprises a housing 502 having a front side 504 (FIG. 11A) and a rear side 506 (FIG. 11B). In the illustrated embodiment, the housing 502 is shaped substantially as a rectangular parallelepiped, but this shape is just one example and is not limiting. The housing 502 is closed on all sides and surrounds an interior space in which various components of the wireless speaker device 598 are located, as described below with reference to FIG. 12. The housing 502 may be constructed of any suitable material that is preferably durable and non-conductive (electrically), such as various types of plastics (e.g. polycarbonate, acrylonitrile butadiene styrene (ABS), polyethylene, etc.).

With reference to FIG. 12, the wireless speaker device 598 comprises a processor 508 and a communication module 510. The processor 508 and the communication module 510 are illustrated as a single component in FIG. 12, but in alternative embodiments the processor 508 and the communication module 510 may comprise separate components. The communication module 510 includes an antenna 512 and may include one or more transceivers (not shown) for sending and receiving wireless signals over the user's wireless network 110. The communication module 510 may also be configured to transmit data wirelessly to and/or receive data wirelessly from one or more devices independently of the user's wireless network 110, such as via a direct connection to another wireless device. In one example, the wireless speaker device 598 may communicate with the user's client device 114 via a Bluetooth (or other short-range wireless protocol) connection.

In alternative embodiments, the wireless speaker device 598 may be configured for a wired connection to the user's wireless network 110 and/or the network 120. For example, the wireless speaker device 598 may include one or more ports (not shown) for receiving a connector of a cable, such as an Ethernet cable. In such embodiments, the wireless speaker device 598 may connect to the router of the user's wireless network 110, or to any other network device, via the cable. In embodiments configured for receiving an Ethernet cable, the wireless speaker device 598 may be powered via Power over Ethernet (PoE), in which electrical power may be passed, along with data, via the connected Ethernet cable. In such embodiments, the AC pins 518 may be omitted. Alternatively, the wireless speaker device 598 may be powered via both the AC pins 518 and a PoE connection.

The processor 508 may perform data processing and various other functions, as described below. The processor 508 may comprise an integrated circuit including a processor core (not shown), volatile memory 514, non-volatile memory 516, and/or programmable input/output peripherals (not shown). The volatile memory 514 may comprise, for example, DDR3 (double data rate type three synchronous dynamic random-access memory). The non-volatile memory 516 may comprise, for example, NAND flash memory. In the embodiment illustrated in FIG. 12, the volatile memory 514 and the non-volatile memory 516 are illustrated within the box representing the processor 508. It is to be understood, however, that the embodiment illustrated in FIG. 12 is merely an example, and in some embodiments the volatile memory 514 and/or the non-volatile memory 516 are not necessarily physically incorporated with the processor 508. The volatile memory 514 and/or the non-volatile memory 516, regardless of their physical location, may be shared by one or more other components (in addition to the processor 508) of the present wireless speaker device 598.

With continued reference to FIG. 12, the wireless speaker device 598 further comprises a pair of AC (alternating current) pins 518, enabling the wireless speaker device 598 to be plugged into a standard wall outlet. With reference to FIG. 11B, the AC pins 518 extend outward from the rear side 506 of the housing 502. With reference to FIG. 12, the wireless speaker device 598 further comprises an AC/DC rectifier 520, which converts AC mains power to DC (direct current), which is then delivered to the processor 508 for powering the wireless speaker device 598. Some embodiments may also include a DC-to-DC converter (not shown) between the rectifier 520 and the processor 508. The DC-to-DC converter may receive as an input a first voltage from the rectifier 520 and produce as an output a second voltage that is received as an input by the processor 508.

With continued reference to FIG. 12, the wireless speaker device 598 further comprises a speaker 522 operatively connected to the processor 508 through a digital-to-analog audio converter 524. With reference to FIG. 11A, the front side 504 of the housing 502 includes at least one opening 526 that facilitates the passage of sound from the speaker 522 located within the housing 502 to the surrounding environment. With reference to FIG. 12, the wireless speaker device 598 further comprises a reset button 528 and reset logic 530, which enable the user to reset the processor 508 and/or the communication module 510 in the event of a malfunction. With reference to FIGS. 11A and 11B, a side 532 of the housing 502 includes a small opening 534 that provides access to the reset button 528. By inserting a slender object, such as a paper clip, through the small opening 534, the user can depress the reset button 528 to initiate the reset process.

With reference to FIG. 12, the wireless speaker device 598 further comprises LEDs 536 (or another type of illumination device) operatively connected to the processor 508. With reference to FIG. 11A, the LEDs 536 may be located on the front side 504 of the housing 502. The LEDs 536 provide a visual indicator to the user of the current operative state of wireless speaker device 598. For example, when the wireless speaker device 598 is plugged in to a wall outlet, the LEDs 536 may be illuminated, and when the wireless speaker device 598 sounds to alert the user to a visitor at the front door, the LEDs 536 may blink on and off according to a set pattern. Blinking or flashing of the LEDs 536 may be particularly advantageous for users who are hard of hearing, for example, and who may not hear sounds from the wireless speaker device 598 when a visitor is at the front door.

Figure 13:
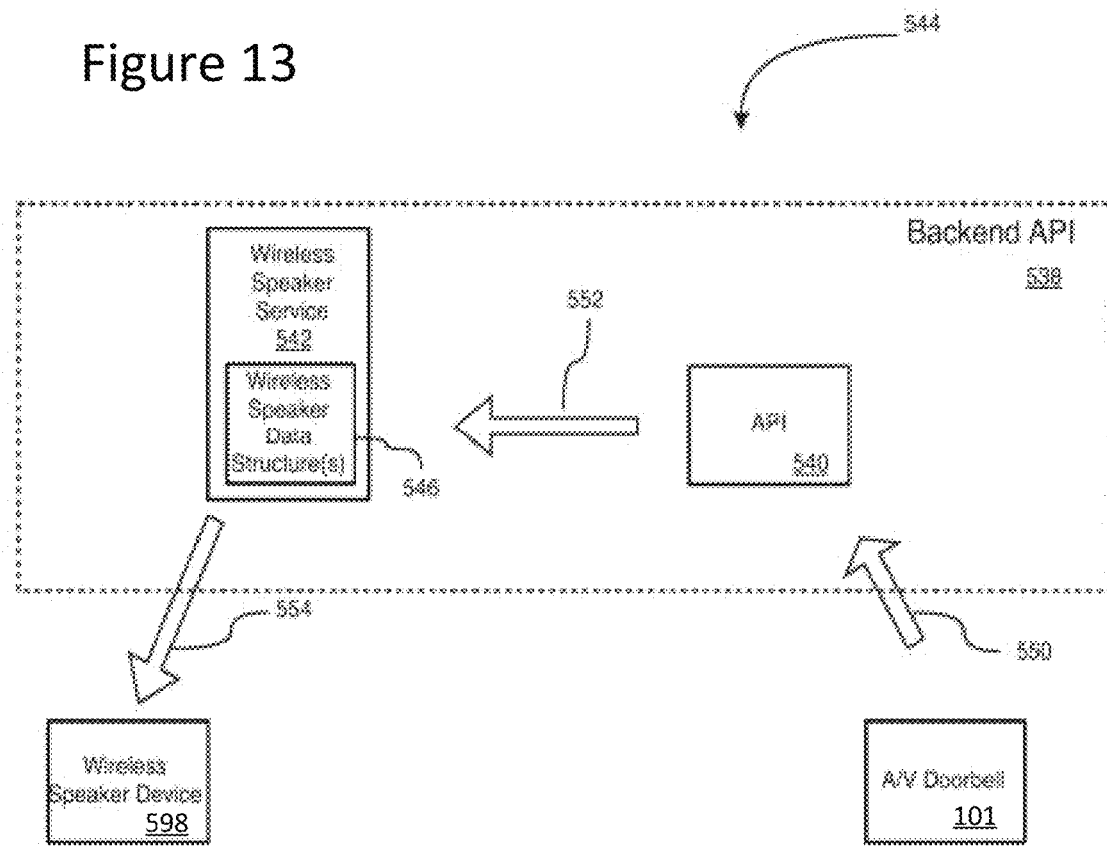
FIG. 13 is a functional block diagram illustrating a system for communicating among a wireless A/V recording and communication device, a local area network, a wide area network, and a wireless speaker device, according to various aspects of the present disclosure.

FIG. 13 is a functional block diagram illustrating a system 544 for communicating among a wireless A/V recording and communication device, such as the wireless A/V recording and communication doorbell 101/130, a local area network, such as the user's wireless network 110, a wide area network, such as the network 120, and a wireless speaker device, such as the wireless speaker device 598, according to the present embodiments.

In FIG. 13, in one example embodiment, the A/V doorbell 101, the wireless speaker device 598 and the API 538 may substantially corresponded to the A/V device 101, the wireless speaker device 598, and the API 538, respectively, in FIG. 1 discussion above.

The system 544 in FIG. 13 may comprise a API, such as the API 538, including one or more components. A API may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A API may, for example, comprise many such applications, each of which communicate with one another using their public APIs. In some embodiments, the API backend may hold the bulk of the user data and offer the user management capabilities, leaving the clients to have very limited state.

The API 538 illustrated FIG. 13 may include one or more APIs, such as the API 540. The API 538 illustrated in FIG. 13 may further include one or more services (also referred to as network services), such as the wireless speaker service 542. The wireless speaker service 542 may comprise one or more wireless speaker data structures 546 storing information about a plurality of wireless speaker devices, such as the wireless speaker device 598. For example, the information may include information about each wireless speaker device and at least one associated wireless A/V recording and communication device, such as the wireless A/V device 101. The wireless speaker service 542 may access the information in the wireless speaker data structure(s) 546 when needed to determine which wireless speaker device(s) is/are associated with a wireless A/V recording and communication device that sends a visitor detection signal 550 to the API 538, as further described below. The wireless speaker service 542 may also maintain the information in the wireless speaker data structure(s) 546 and update the information in the wireless speaker data structure(s) 546 when new wireless speaker devices are activated, when existing wireless speaker devices are deactivated, and/or when associations between existing wireless speaker devices and wireless A/V recording and communication devices are changed. In some embodiments, the wireless speaker service 542 may have a persistent connection with the wireless speaker device 598. A persistent connection advantageously reduces latency between the wireless speaker service 542 and the wireless speaker device 598, as further described below.

To use the present wireless speaker device 598 in connection with a wireless A/V recording and communication doorbell, the user plugs the AC pins 518 of the wireless speaker device 598 into a standard wall outlet, and then connects the wireless speaker device 598 to his or her wireless network 110 (FIG. 1). The user may then be guided through a setup process in which the wireless speaker device 598 is associated with the user's doorbell 101, and the association is stored in a data structure so that when a visitor presses the doorbell button 133 the system knows which wireless speaker device 598 to activate. For example, the setup process may include an application executing on the user's client device 114. After the wireless speaker device 598 is successfully connected to the wireless network 110, a prompt may be displayed on the user's client device 114. The prompt may request the user to select a wireless A/V recording and communication device, such as a doorbell or a security camera, to associate to the wireless speaker device 598. When the user makes a selection, the user's client device 114 may send a signal, via the wireless network 110 and the network 120, to the API 538, and the wireless speaker service 542 may update the information in the wireless speaker data structure(s) 546 so that the wireless speaker device 598 is associated with the user-selected wireless A/V recording and communication device. Later, when motion events and/or button-press events are initiated by the user-selected wireless A/V recording and communication device, the wireless speaker service 542 sends a signal to the associated wireless speaker device 598 and the wireless speaker device 598 emits a tone, as further described below.

Figure 14:
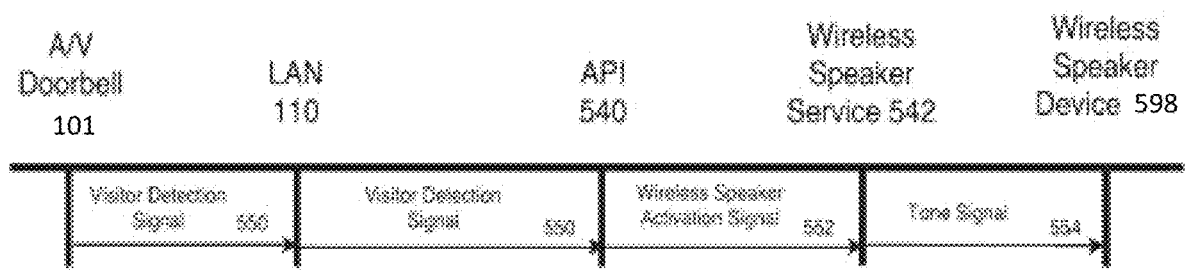
FIG. 14 is a sequence diagram illustrating one embodiment of a process for generating a visitor detection tone in a system including a wireless A/V recording and communication device, a local area network, a wide area network, and a wireless speaker device.

In the system of FIG. 13, and with reference to FIG. 14, the wireless A/V recording and communication doorbell 101 may detect a visitor within the field of view of the doorbell 101. For example, the wireless A/V recording and communication doorbell 101 may detect the visitor's presence by detecting motion using the camera 102, 134 and/or the motion sensor(s) 144, and/or by detecting that the visitor has depressed the button 133 on the A/V recording and communication doorbell 101/130. In response to detecting the visitor, the wireless A/V recording and communication doorbell 101 may send a visitor detection signal 550 (FIG. 14) to the API 540 through the user's network 110 (e.g., a LAN) and the network 120 (e.g., a WAN) (shown in FIG. 1), and the API 540 may receive the visitor detection signal 550 from the wireless A/V recording and communication doorbell 101. The visitor detection signal 550 may include information about the visitor-detection event, such as whether the visitor was detected via sensed motion or via a button press. The wireless A/V recording and communication doorbell 101 sends the visitor detection signal 550 to the API 540 via the user's wireless network 110 (e.g., a LAN) and the network 120 (e.g., a WAN) (shown in FIG. 1).

With reference to FIGS. 13 and 14, the API 540 may transmit to the wireless speaker service 542 a wireless speaker activation signal 552 in response to receiving the visitor detection signal 550 from the wireless A/V recording and communication doorbell 101, and the wireless speaker service 542 may receive the wireless speaker activation signal 552 from the API 540. In response to receiving the wireless speaker activation signal 552 from the API 540, the wireless speaker service 542 may access the wireless speaker data structure(s) 546 and determine, based on identifying information in the wireless speaker activation signal 552, at least one wireless speaker device 598, such as the wireless speaker device 598, with which the wireless A/V recording and communication doorbell 101 that sent the visitor detection signal 550 is associated. The wireless speaker service 542 may then send a tone signal 554 to the at least one wireless speaker device 598 that was determined from the wireless speaker data structure(s) 546, and the at least one wireless speaker device 598 may receive the tone signal 554 from the wireless speaker service 542. The tone signal 554 includes a command to the at least one wireless speaker device 598 to emit a tone from the speaker 522 of the at least one wireless speaker device 598. Thus, in response to receiving the tone signal 554 from the wireless speaker service 542, the at least one wireless speaker device 598 may emit a tone from its speaker 522 to notify any person(s) within earshot of the speaker 522 that a visitor has been detected at the wireless A/V recording and communication doorbell 101.

As described above, in some embodiments the wireless speaker service 542 may have a persistent connection with the wireless speaker device 598. A persistent connection advantageously reduces latency between the wireless speaker service 542 and the wireless speaker device 598, so that when the wireless speaker service 542 sends the tone signal 554 to the wireless speaker device 598 there is little if any delay between the tone signal 554 being sent and the wireless speaker device 598 emitting a tone from its speaker 522. For example, because of the persistent connection, there is no need for the wireless speaker device 598 to re-establish itself on the wireless speaker service 542 before the tone signal 554 can be received by the wireless speaker device 598.

As described above, the present embodiments advantageously provide a wireless speaker device configured for use with a wireless A/V recording and communication device, such as a doorbell. The wireless speaker device, which includes a speaker, may plug into a standard wall outlet and connect to the user's network (e.g., a LAN), such as a Wi-Fi network. The LAN is connected to a WAN, such as the Internet and/or a public switched telephone network (PSTN). When the wireless A/V recording and communication device detects a visitor, it sends a signal, via the LAN, to at least one device in the WAN, such as a server and/or a service. In response, the at least one device in the WAN sends a signal, via the LAN, to the wireless speaker device. The signal to the wireless speaker device includes a command for the wireless speaker device to emit a tone through its speaker. The wireless speaker device then emits a tone through its speaker to alert the user that a visitor is at the wireless A/V recording and communication device.

In some embodiments, the wireless speaker activation signal 552 and/or the tone signal 554 may include information about a type of tone to be emitted by the speaker 522 of the wireless speaker device 598. For example, the type of tone may depend on the type of visitor detection that initiated the process. If the visitor was detected via motion, a first type of tone may be emitted by the speaker 522, and the wireless speaker activation signal 552 and/or the tone signal 554 may include a command to the wireless speaker device 598 to emit the first type of tone. If the visitor was detected via a button press, a second type of tone may be emitted by the speaker 522, and the wireless speaker activation signal 552 and/or the tone signal 554 may include a command to the wireless speaker device 598 to emit the second type of tone. Tones of various types may be stored at the non-volatile memory 516 of the wireless speaker device 598. Any number of different tones may be stored at the wireless speaker device 598. The first and second types described above are merely non-limiting examples.

In some embodiments, the tone emitted by the speaker 522 of the wireless speaker device 598 may be configurable by the user. For example, an application executing on the user's client device 114 may display a menu from which the user may select from a plurality of different tones. The tones may be stored on the wireless speaker device 598 at the point of manufacture. Alternatively, or in addition, tones may be downloaded to and stored on the wireless speaker device 598, such as at the non-volatile memory 516. For example, the user may access tones stored at one or more servers in the network 120, such as at the API 538, using the client device 114. The user may select one or more tones from the network 120 and download them to the wireless speaker device 598 via the wireless network 110 and the processor/communication module 508/510. Alternatively, or in addition, the user may transfer tones from the client device 114 to the wireless speaker device 598 via the wireless network 110 and the processor/communication module 508/510.

In some embodiments, the tone emitted by the speaker 522 of the wireless speaker device 598 may vary depending on which one of a plurality of different wireless A/V recording and communication devices generated the visitor detection signal 550. For example, the wireless speaker device 598 may be associated with more than one wireless A/V recording and communication device. Then, the wireless speaker device 598 may emit a first type of tone when the visitor detection signal 550 is generated by a first wireless A/V recording and communication device associated with the wireless speaker device 598, and the wireless speaker device 598 may emit a second type of tone when the visitor detection signal 550 is generated by a second wireless A/V recording and communication device associated with the wireless speaker device 598. The wireless speaker device 598 may be associated with any number of wireless A/V recording and communication devices. The first and second associated wireless A/V recording and communication devices described above are merely non-limiting examples.

In alternative embodiments, the wireless speaker device 598 may include a motion sensor (not shown). When the motion sensor of the wireless speaker device 598 detects motion, the wireless speaker device 598 may send a signal to the API 538. The signal may be similar to the visitor detection signal 550 described above. In response to receiving the signal from the wireless speaker device 598, the API 538 may send a signal to one or more connected devices to alert a user that motion was detected by the wireless speaker device 598. For example, the API 538 may send a signal to the user's client device 114.

In alternative embodiments, the wireless speaker device 598 may include a microphone (not shown). In such embodiments, the user may communicate with the visitor through the wireless speaker device 598 and the wireless A/V recording and communication device, using the microphone and the speaker 522 of the wireless speaker device 598.

In some embodiments, the wireless speaker device 598 may be capable of playing streaming audio from another wireless device. For example, the wireless speaker device 598 may receive a wireless audio signal from the user's client device 114 via a Bluetooth connection, and the wireless speaker device 598 may play the audio via the speaker 522.

Figure 15A:
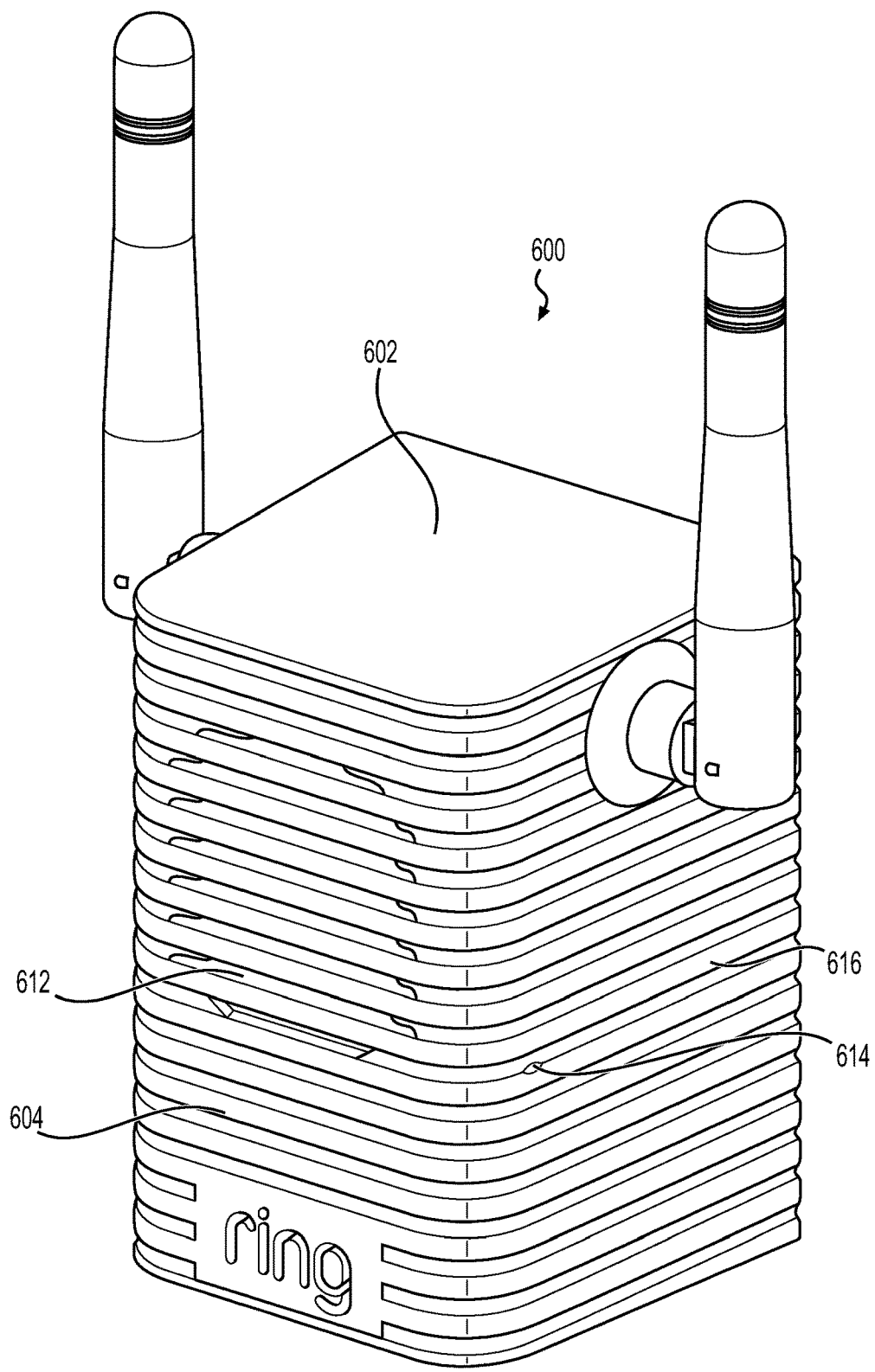
FIG. 15A is a front perspective view of another embodiment of a wireless speaker device for wireless A/V recording and communication devices, according to various aspects of the present disclosure.
Figure 15B:
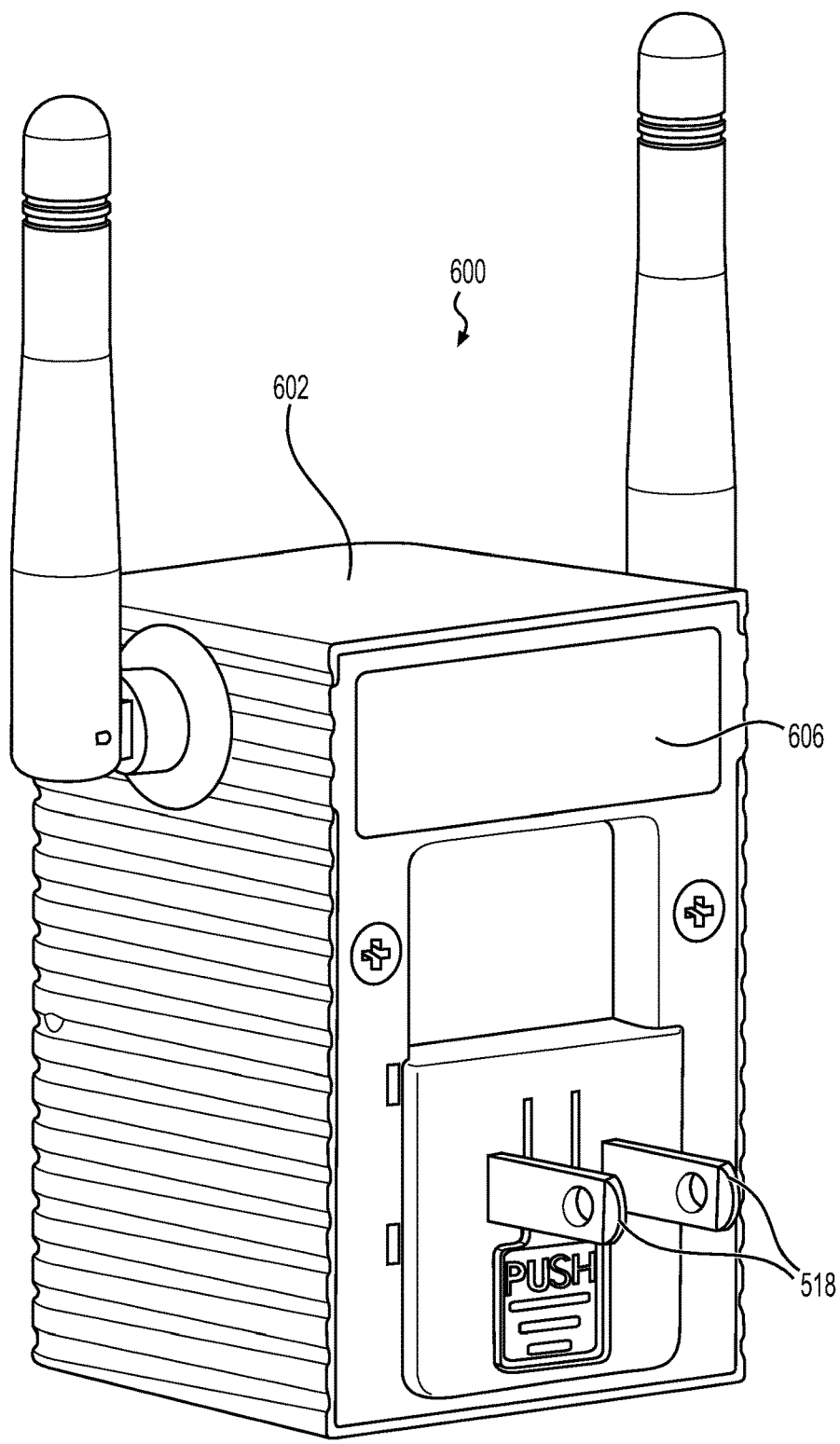
FIG. 15B is a rear perspective view of the wireless speaker device of FIG. 15A.
Figure 16:
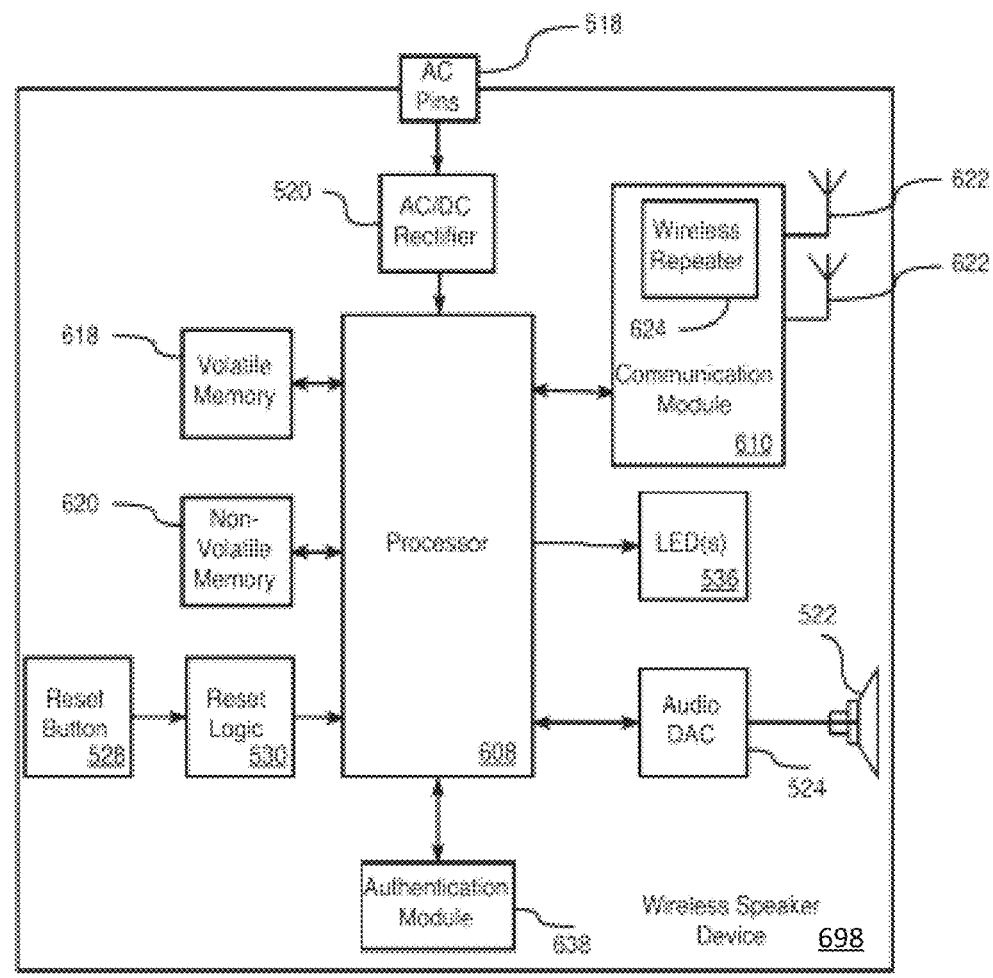
FIG. 16 is a functional block diagram of the wireless speaker device of FIGS. 15A and 15B.

FIGS. 15A and 15B are front and rear perspective views, respectively, of another example embodiment of a wireless speaker device 698, and FIG. 16 is a functional block diagram of the wireless speaker device 698 of FIGS. 15A and 15B. The wireless speaker device 698 of FIGS. 15A, 15B, and 16 includes several components that are similar in structure and/or function to the corresponding components of FIGS. 11A, 11B, and 12 including, with reference to FIGS. 15A, 15B, and 16, a housing 602 having a front side 604 (FIG. 15A) and a rear side 606 (FIG. 15B), a processor 608 (FIG. 16), a communication module 610, a pair of AC (alternating current) pins 518, an AC/DC rectifier 520, a speaker 522, a digital-to-analog audio converter 524, at least one opening 612 in the front side 604 of the housing 602 that facilitates the passage of sound from the speaker 522 located within the housing 602 to the surrounding environment, a reset button 528, reset logic 530, a small opening 614 in a side 616 of the housing 602 that provides access to the reset button 528, and LEDs 536. Again, many of these components are similar in structure and/or function to the components of FIGS. 11A, 11B, and 12. Accordingly, the description below focuses on the aspects of these components that are different from the components of FIGS. 11A, 11B, and 12.

In contrast to the embodiment shown in FIG. 12, in the embodiment shown in FIG. 16 the processor 608 and the communication module 610 are illustrated as separate components, and the volatile memory 618 and the non-volatile memory 620 are illustrated separately from both the processor 608 and the communication module 610. The communication module 610 includes first and second antennas 622 (also shown in FIGS. 15A and 15B), and may include one or more transceivers (not shown), for sending and receiving wireless signals over the user's wireless network 110. The communication module 610 may also be configured to transmit data wirelessly to and/or receive data wirelessly from one or more devices independently of the user's wireless network 110, such as via a direct connection to another wireless device. In one example, the wireless speaker device 698 may communicate with another wireless device, such as the user's client device 114, via a Bluetooth (or other short-range wireless protocol) connection, depending upon the proximity of the wireless speaker device 698 to the other wireless device. The communication module 610 may thus include component(s), such as one or more chips (integrated circuits), enabling the wireless speaker device 698 to communicate wirelessly through various data transmission protocols, such as Wi-Fi (IEEE 802.11), Bluetooth, ZigBee (IEEE 802.15.4), or any other protocol.

In alternative embodiments, the wireless speaker device 698 may be configured for a wired connection to the user's wireless network 110 and/or the network 120. For example, the wireless speaker device 698 may include one or more ports (not shown) for receiving a connector of a cable, such as an Ethernet cable. In such embodiments, the wireless speaker device 698 may connect to the router of the user's wireless network 110, or to any other network device, via the cable. In embodiments configured for receiving an Ethernet cable, the wireless speaker device 698 may be powered via Power over Ethernet (PoE), in which electrical power may be passed, along with data, via the connected Ethernet cable. In such embodiments, the AC pins 518 may be omitted. Alternatively, the wireless speaker device 698 may be powered via both the AC pins 518 and a PoE connection.

With further reference to FIG. 16, the processor 608 may perform data processing and various other functions, as described below. The processor 608 may comprise an integrated circuit including a processor core (not shown) and/or programmable input/output peripherals (not shown). The processor 608 may access volatile memory 618 and/or non-volatile memory 620. The volatile memory 618 may comprise, for example, DDR3 (double data rate type three synchronous dynamic random-access memory). The non-volatile memory 620 may comprise, for example, NAND flash memory. In the embodiment illustrated in FIG. 16, the volatile memory 618 and the non-volatile memory 620 are illustrated as components separate from the processor 608. It is to be understood, however, that the embodiment illustrated in FIG. 16 is merely an example, and in some embodiments the volatile memory 618 and/or the non-volatile memory 620 are not necessarily physically separated from the processor 608. The volatile memory 618 and/or the non-volatile memory 620, regardless of their physical location, may be shared by one or more other components (in addition to the processor 608) of the present wireless speaker device 698.

With continued reference to FIG. 16, the communication module 610 of the wireless speaker device 698 may further comprise a wireless repeater 624 (may also be referred to as a wireless range extender). The wireless repeater 624 is configured to receive a wireless signal from a wireless router (or another network device) in the user's wireless network 110 and rebroadcast the signal. Wireless devices that are not within the broadcast range of the wireless router, or that only weakly receive the wireless signal from the wireless router, may receive the rebroadcast signal from the wireless speaker device 698, and may thus connect to the user's wireless network 110 through the wireless speaker device 698. In some embodiments, the wireless repeater 624 may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

As described above, the communication module 610 includes first and second antennas 622 (FIGS. 15A, 15B, and 16), and may include one or more transceivers (not shown), for sending and receiving wireless signals. The first and second antennas 622 enable the wireless speaker device 698 to communicate wirelessly via multiple-input and multiple-output (MIMO). MIMO is a technique for multiplying the capacity of a radio link using multiple transmit and receive antennas to exploit multipath propagation. As shown in FIGS. 15B and 16, the first and second antennas 622 may extend from opposite sides of the housing 602 of the wireless speaker device 698. The illustrated configuration is, however, just one example and is not limiting. The first and second antennas 622 may be fixed or movable with respect to the housing 602. For example, the first and second antennas 622 may be pivotable about an axis that extends through the housing 602 perpendicularly to both antennas 622.

The communication module 610 may also be configured to transmit data wirelessly to and/or receive data wirelessly from one or more devices independently of the user's wireless network 110, such as via a direct wireless connection to another wireless device. In one example, the wireless speaker device 698 may communicate with another wireless device, such as the user's client device 114, via a Bluetooth (or other short-range wireless protocol) connection, depending upon the proximity of the wireless speaker device 698 to the other wireless device. The communication module 610 may thus include one or more module(s) or component(s), such as one or more chips (integrated circuits), enabling the wireless speaker device 698 to communicate wirelessly through various data transmission protocols, such as Wi-Fi (IEEE 802.11), Bluetooth, ZigBee (IEEE 802.15.4), or any other protocol.

In various embodiments, the wireless speaker device 698 may be used to wirelessly control one or more other wireless devices. A non-exhaustive and non-limiting list of example wirelessly controllable devices includes: electronic locks, alarms, alarm monitoring systems, security systems, garage door openers, electric gates, automated security gates, televisions, cameras, video streaming devices, video recording and video receiving devices, digital video recorders, digital video streaming devices, wireless enabled electric plug outlets, lighting systems, lights, light sensors and switches, light switches, lighting control panels, light bulbs, fixtures for light bulbs, or any other type of wirelessly controllable device or component.

Figure 17:
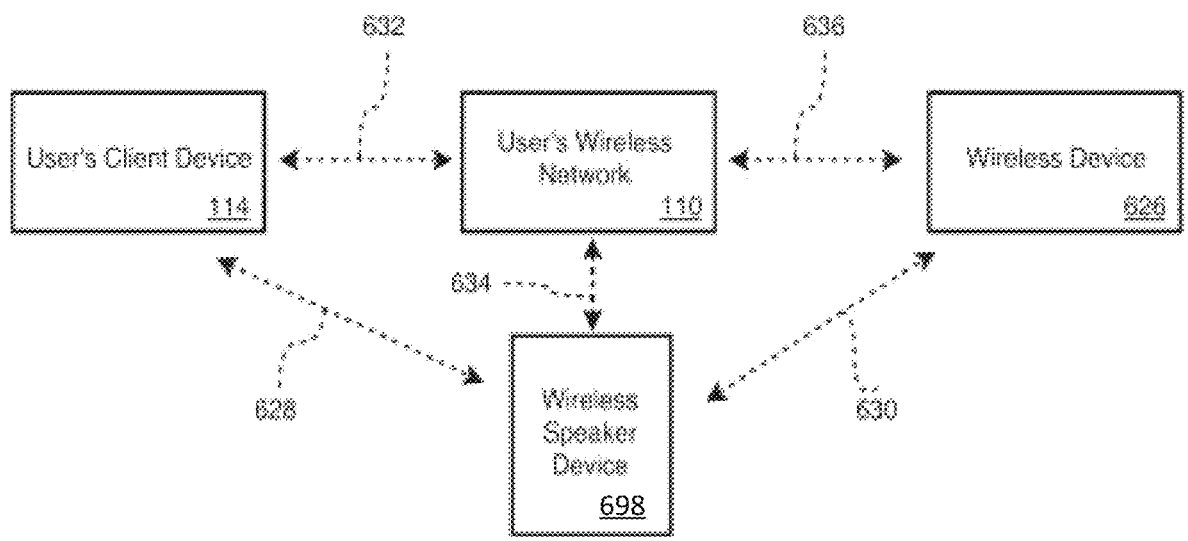
FIG. 17 is a functional block diagram illustrating a system including a wireless speaker device for wireless A/V recording and communication devices, according to various aspects of the present disclosure.

In various embodiments, other devices may be wirelessly controlled through the wireless speaker device 698 with signals sent over the user's wireless network 110, or with signals sent directly between the wireless speaker device 698 and one or more other wireless devices, or with any combination of such signals. For example, with reference to FIG. 17, an application executing on the user's client device 114 may enable the user to control another wireless device 626 with signals sent between the user's client device 114 and the other wireless device 626 via the wireless speaker device 698. In one example, the user's client device 114 and the wireless speaker device 698 may send signals 628 directly to one another, such as through a Bluetooth connection (or another wireless technology standard for exchanging data over short distances between devices in close proximity to one another), and the wireless speaker device 698 and the other wireless device 626 may send signals 630 directly to one another, such as through a Bluetooth connection (or another wireless technology standard for exchanging data over short distances between devices in close proximity to one another). In another example, the user's client device 114 and the wireless speaker device 698 may send signals 632, 634 to one another via the user's wireless network 110, such as a Wi-Fi network (or another wireless technology standard), and the wireless speaker device 698 and the other wireless device 626 may send signals 636, 634 to one another via the user's wireless network 110. In yet another example, the user's client device 114, the wireless speaker device 698, and the other wireless device 626 may send signals to one another via a mix of these signals 628, 630, 632, 634, 636. For example, the user's client device 114 and the wireless speaker device 698 may communicate directly with one another via signals 628 while the wireless speaker device 698 and the other wireless device 626 may communicate with one another via signals 634, 636 sent over the user's wireless network 110. Alternatively, the user's client device 114 and the wireless speaker device 698 may communicate with one another via signals 632, 634 sent over the user's wireless network 110 while the wireless speaker device 698 and the other wireless device 626 may communicate directly with one another via signals 630.

With reference to FIG. 16, the wireless speaker device 698 may further comprise one or more authentication modules 638. The authentication module 638 may comprise an integrated circuit configured to authenticate functionality between the wireless speaker device 698 and one or more other electronic devices. In one non-limiting example, the authentication module 638 may comprise an MFi ("Made for iPhone/iPod/iPad") chip configured to authenticate functionality between the wireless speaker device 698 and one or more other electronic devices made by Apple Inc.

As described above, the present embodiments leverage the functionality of a hub device to connect an A/V device with a backend device when there is a communication disruption due to an outage on any of the intermediate network devices or network connections between the A/V device and the backend device. In some embodiments, in response to detecting the disruption, the hub device may reconfigure its settings to form a communication link (e.g., a wireless cellular communication link, a low-power wide-area network (LPWAN) link, or another type of communication link) that bypasses the failed intermediate network devices and/or network connections to connect the A/V device with the backend device.

In addition, the present embodiments leverage the functionality of the hub device to perform functions that otherwise would be performed by the backend device, when there is an outage on the backend device. In some embodiments, in response to detecting an outage on the backend device, the hub device may reconfigure its settings to perform functions that otherwise would be performed by the backend device, for example, to store data from the A/V device, to identify one or more devices (e.g., client devices, wireless speaker devices, and other home automation devices) associated with the A/V device, and/or to serve as one or more APIs.

In some examples, in response to detecting a visitor's presence, an A/V device may begin to capture video images and/or audio, and send a user alert/visitor notification signal to a backend device through a user's network (e.g., a LAN) and a network (e.g., a WAN). When there is a communication disruption due to an outage on any of the intermediate network devices (e.g., the router) or network connections between the A/V device and the backend device, the A/V device may reconfigure its settings to communicate with a hub device, which forms a communication link (e.g., a wireless cellular communication link, an LPWAN communication link, or another type of communication link) that bypasses the failed network device(s) (e.g., the router) and/or network connection(s) between the A/V device and the backend device. In some examples, in response to the disruption due to the outage on any of the intermediate network devices (e.g., the router) or network connections between the A/V device and the backend device, the hub device may reconfigure its settings to connect the A/V device with the backend device using the communication link (e.g., a wireless cellular communication link, an LPWAN communication link, or another type of communication link) that bypasses the failed network device(s) (e.g., the router) and/or network connection(s) between the A/V device and the backend device. As a result, the user alert/visitor notification signal is able to reach one or more devices (e.g., client devices, wireless speaker devices, and/or other home automation devices) associated with the A/V device despite the outages on the intermediate network device(s) and/or network connection(s).

In some examples, in response to detecting a visitor's presence, an A/V device may begin to capture video images and/or audio, and send a user alert/visitor notification signal to a backend device through a user's network (e.g., a LAN) and a network (e.g., a WAN). When there is a communication disruption due to an outage of the backend device, the A/V device may reconfigure its settings to communicate with a hub device to form a communication link (e.g., a wireless cellular communication link, an LPWAN communication link, or another type of communication link) that bypasses the failed backend device to reach one or more devices (e.g., client devices, wireless speaker devices, and/or other home automation devices) associated with the A/V device. In some examples, in response to the disruption due to the outage of the backend device, the hub device may reconfigure its settings to perform functions that otherwise would be performed by the backend device, for example, to store data from the A/V device, to identify one or more devices (e.g., client devices, wireless speaker devices, and/or other home automation devices) associated with the A/V device, and/or to serve as one or more APIs. As a result, the user alert/visitor notification signal is able to reach one or more devices (e.g., client devices, wireless speaker devices, and/or other home automation devices) associated with the A/V device despite the outage of the backend device.

Among other advantages, users may receive alerts and notifications from an A/V device even when there is an outage on any of the intermediate network devices and/or network connections between the A/V device and the backend device, thereby improving reliability and user experience of the A/V devices, and strengthening the ability of such devices to reduce crime and enhance public and home safety.

Figure 18:
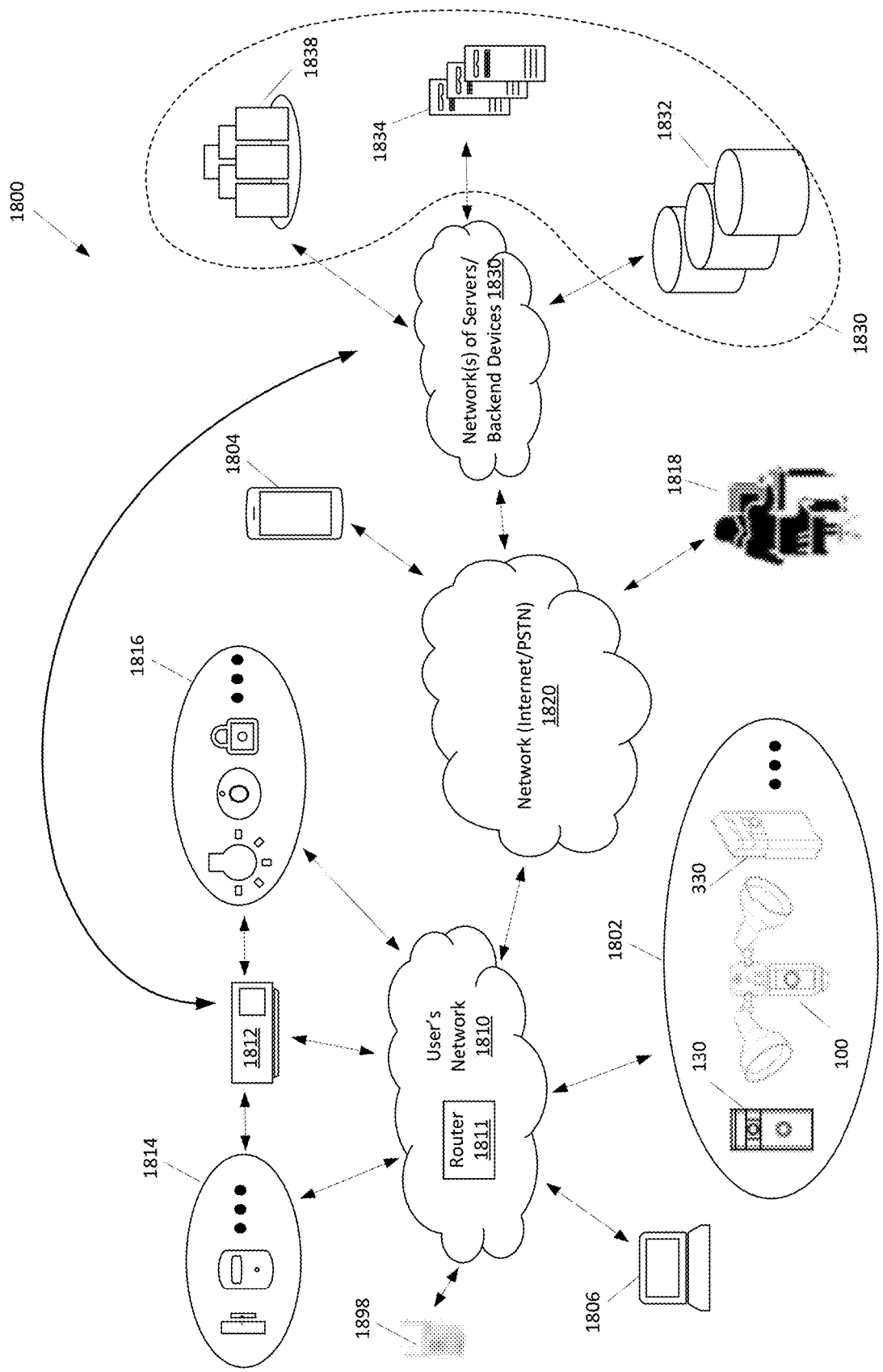
FIG. 18 is a block diagram illustrating a system for communicating in a network, according to various aspects of the present disclosure.

FIG. 18 illustrates a system 1800 for communicating in a network according to various aspects of the present disclosure. The system 1800 may include one or more A/V recording and communication devices 1802 configured to access a user's network 1810 to connect to a network (Internet/PSTN) 1820 (in some embodiments, the A/V devices 1802 may be configured to connect directly to the network (Internet/PSTN) 1820, such as over a cellular connection and/or using a low-power wide-area network (LPWAN) technology, such as a chirp spread spectrum (CSS) modulation technology (e.g., LoRaWAN), an Ultra Narrow Band modulation technology (e.g., Sigfox, Telensa, NB-IoT, etc.), RingNet, and/or the like). The one or more A/V recording and communication devices 1802 may include any or all of the components and/or functionality of the A/V device 101 (FIGS. 1 and 2), the A/V recording and communication doorbell 130 (FIGS. 3-5), the security camera 330 (FIGS. 6-7), and/or the floodlight controller 100 (FIGS. 8-10). Although the embodiments described below primarily relate to a doorbell, in some of the present embodiments, the A/V recording and communication device 1802 may not be a doorbell, but may be the security camera 330, for example, having computer vision processing and/or image processing capabilities for analyzing an object of interest to determine if one or more predefined conditions associated the object of interest has occurred.

The user's network 1810 may include any or all of the components and/or functionality of the user's network 110 (FIG. 1) described herein. The system 1800 may also include one or more client devices 1804, 1806, which in various embodiments may be configured to be in network communication and/or associated with the A/V recording and communication device 1802. The client devices 1804, 1806 may comprise, for example, a mobile phone such as a smartphone, or a computing device such as a tablet computer, a laptop computer, a desktop computer, etc. The client devices 1804, 1806 may include any or all of the components and/or functionality of the client device 114 (FIG. 1) described herein. In some embodiments, one or more of the client devices 1804, 1806 may not be associated with the A/V recording and communication device 1802.

The system 1800 may further include a smart-home hub device 1812 (which may alternatively be referred to herein as the hub device 1812) connected to the user's network 1810. The smart-home hub device 1812 (may also be referred to as a home automation hub, a premises security hub, a gateway device, etc.) may comprise any device that facilitates communication with and control of the sensors 1814, automation devices 1816, and/or the one or more A/V recording and communication devices 1802. For example, the smart-home hub device 1812 may be a component of a home automation system installed at a property. In some embodiments, the A/V recording and communication devices 1802, the sensors 1814, and/or the automation devices 1816 may communicate with the smart-home hub device 1812 directly and/or indirectly via the user's network 1810 and/or the network (Internet/PSTN) 1820. In some of the present embodiments, the A/V recording and communication devices 1802, the sensors 1814, and/or the automation devices 1816 may, in addition to or in lieu of communicating with the smart-home hub device 1812, communicate with the client devices 1804, 1806 and/or one or more of the components of the network of servers/backend devices 1834 directly and/or indirectly via the user's network 1810 and/or the network (Internet/PSTN) 1820. The hub device 1812 may have wireless cellular capabilities to communicate with the backend devices 1830 and/or the client devices 1804, 1806 with wireless cellular communication links. Alternatively, or in addition, the hub device 1812 may have low-power wide-area network (LPWAN) capabilities, such as a chirp spread spectrum (CSS) modulation technology (e.g., LoRaWAN), an Ultra Narrow Band modulation technology (e.g., Sigfox, Telensa, NB-IoT, etc.), RingNet, and/or the like, to communicate with the backend devices 1830 and/or the client devices 1804, 1806. For example, the hub device 1812 may be connected to the network 1820 through a wireless cellular communication link, an LPWAN communication link, and/or another type of communication link, bypassing the router 1811 of the user's network 1810 (e.g., a LAN). As discussed in detail below, the hub device 1812 may perform functions that otherwise would be performed by the backend during service disruptions to connect the A/V device 1802 to one or more of the client devices 1804, 1806, the wireless speaker device 1898, and other home automation devices. In various aspects of the present application, the service disruptions may be due to outages (e.g., failures) of one of more of the router 1811, the connection between the router 1811 and the backend devices 1830, and the backend devices 1830.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 1812, the sensors 1814, the automation devices 1816, the A/V recording and communication devices 1802, etc.), when remotely monitored and controlled via the network (Internet/PSTN) 1820, may be considered to be components of the Internet of Things. Smart home systems may include switches and/or sensors (e.g., the sensors 1814) connected to a central hub such as the smart-home hub device 1812, sometimes called a gateway, from which the system may be controlled with a user interface. The user interface may include any or all of a wall-mounted terminal (e.g., a keypad, a touchscreen, etc.), software installed on the client devices 1804, 1806 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 1814 may include, for example, at least one of a door sensor, a window sensor, a contact sensor, a tilt sensor, a temperature sensor, a carbon monoxide sensor, a smoke detector, a light sensor, a glass break sensor, a motion sensor, and/or other sensors that may provide the user/owner of the security system a notification of a security event at his or her property.

The one or more automation devices 1816 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, and/or other automation devices.

With further reference to FIG. 18, the system 1800 may also include various backend devices such as (but not limited to) storage devices 1832, servers 1834, and APIs 1838 that may be in network communication (e.g., over the user's network 1810 and/or the network (Internet/PSTN) 1820) with the A/V recording and communication devices 1802, the hub device 1812, the client devices 1804, 1806, the sensors 1814, and/or the automation devices 1816. In some embodiments, the storage devices 1832 may be a separate device from the servers 1834 (as illustrated) or may be an integral component of the servers 1834. The storage devices 1832 may be similar in structure and/or function to the remote storage device 116 (FIG. 1). In addition, in some embodiments, the servers 1834 and APIs 1838 may be similar in structure and/or function to the server 118 and the API 538 (FIG. 1), respectively.

The system 1800 may include one or more wireless speaker devices 1898 configured to communicate with one or more A/V recording and communication devices 1802 via the user's network 1810 (e.g., a LAN), the network 1820 (e.g., a WAN), and the network of servers and/or backend devices 1830 (e.g., remote storage devices 1832, servers 1834, and/or APIs 1838). The one or more wireless speaker devices 1898 may include any or all of the components and/or functionality of the wireless speaker device 598 (FIGS. 1, 11A, 11B, and 12-14), and/or the wireless speaker device 698 (FIGS. 15A, 15B, 16, and 17).

As described herein, in some of the present embodiments, some or all of the user's network 1810, the client devices 1804, 1806, the A/V recording and communication device 1802, the smart-home hub device 1812, the sensors 1814, the automation devices 1816, and the wireless speaker device 1898 may be referred to as a security system, which may be installed at a property or premises.

With further reference to FIG. 18, the system 1800 may also include a security monitoring service 1818. The security monitoring service 1818 may be operated by the same company that manufactures, sells, and/or distributes the A/V recording and communication devices 1802, the hub device 1812, the sensors 1814, and/or the automation devices 1816. In other embodiments, the security monitoring service 1818 may be operated by a third-party company (e.g., a different company than the one that manufactured, sold, and/or distributed the A/V recording and communication devices 1802, the hub device 1812, the sensors 1814, and/or the automation devices 1816). In any of the present embodiments, the security monitoring service 1818 may have control of at least some of the features and components of the security system 1822 (e.g., the security monitoring service 1818 may be able to arm and/or disarm the security system 1822, lock and/or unlock doors, activate and/or deactivate one or more of the sensors 1814 and/or the automation devices 1816, etc.). For example, the security monitoring service 1818 may operate and control their own client devices and/or network of servers/backend devices for monitoring and/or controlling security systems. In such an example, the A/V recording and communication devices 1802, the hub device 1812, the sensors 1814, and/or the automation devices 1816 may communicate with the client devices and/or one or more components of the network of servers/backend devices of the security monitoring service 1818 over the network (Internet/PSTN) 1820 (in some embodiments, via one or more of the components of the network of servers/backend devices 1830).

Figure 19:
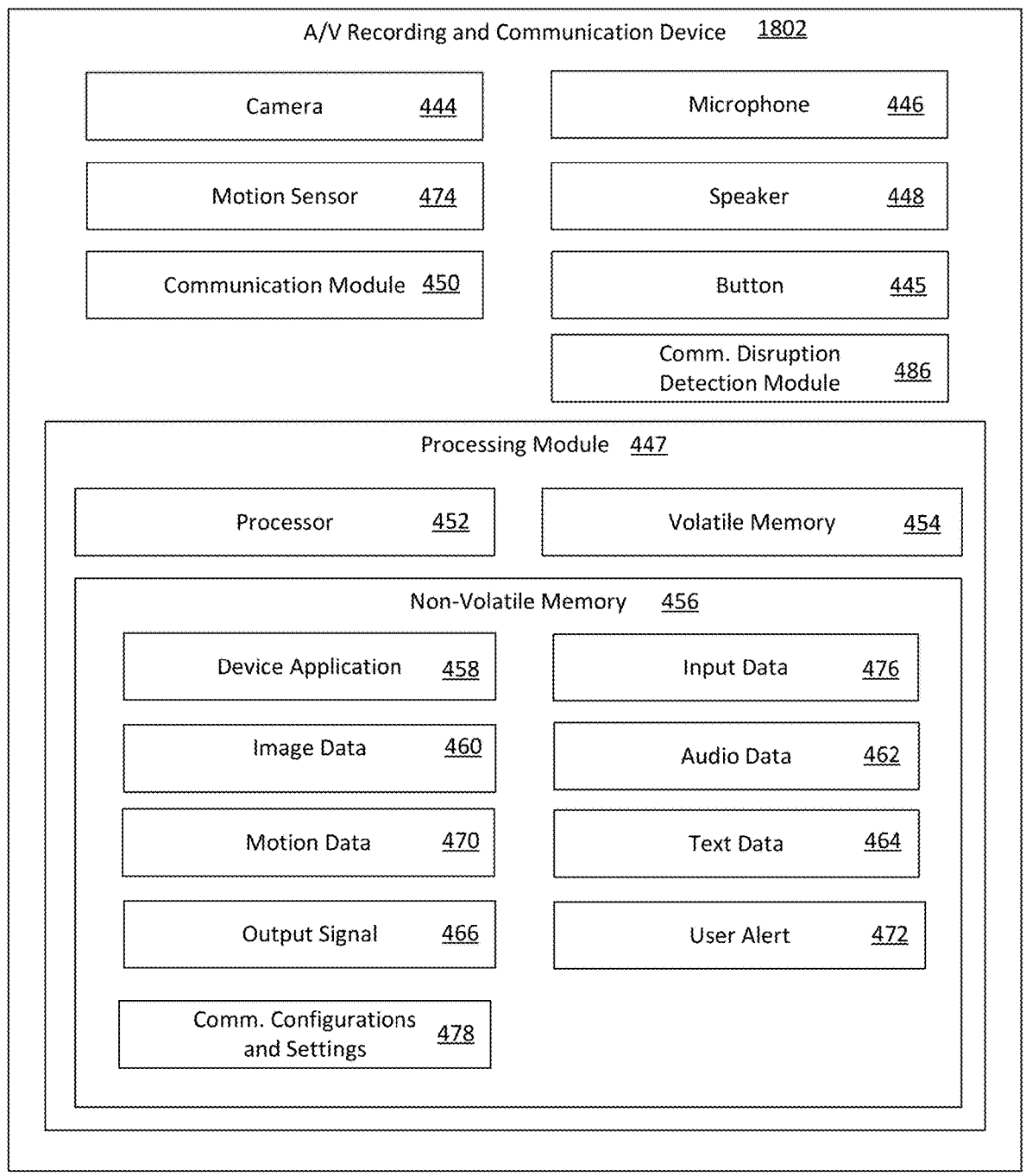
FIG. 19 is a functional block diagram illustrating one embodiment of an A/V recording and communication device, according to various aspects of the present disclosure.

FIG. 19 illustrates an embodiment of the A/V device 1802 according to various aspects of the present disclosure. The A/V device 1802 may comprise a processing module 447 that is operatively connected to a camera 444, a microphone 446, a speaker 448, a motion sensor 474, a button 445 (in embodiments where the A/V device 1802 is a doorbell), a communication module 450, and a communication disruption detection module 486.

The processing module 447 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, input data 476 using the button 445 (and/or the camera 444 and/or the motion sensor 474, depending on the embodiment), and/or motion data 470 using the camera 444 and/or the motion sensor 474. In some embodiments, the device application 458 may also configure the processor 452 to generate text data 464 describing the image data 460, the audio data 462, and/or the input data 476, such as in the form of metadata, for example.

The communication disruption detection module 486 may detect communication disruptions due to outages on any of the intermediate network devices (e.g., the router 1811) and/or network connections (e.g., the connection between the router 1811 and the network 1820), between the A/V device 1802 and the backend devices 1830, and/or on the backend devices 1830 themselves. Based on the detection of communication disruptions, the device application 458 may configure the processor 452 to transmit the image data 460, the audio data 462, the motion data 470, the input data 476, the text data 464, and/or the user alert 472 to the router 1811, the hub device 1812, and/or the backend devices 1830 using the communication module 450 according to different communication configurations and settings 478. For example, the communication configurations and settings 478 may include configurations and settings for Wi-Fi communication via the router 1811, and when the communication disruption detection module 486 detects a disruption in the Wi-Fi communication link or path with the router 1811, the device application 458 may configure the processor 452 to transmit data from the A/V device 1802 to the backend devices 1830, to one or more of the client devices 1804, 1806, and/or to the wireless speaker device 1898 (in some embodiments, via the backend devices 1830), using the hub device 1812.

In various embodiments, the device application 458 may also configure the processor 452 to generate and transmit an output signal 466 that may include the image data 460, the audio data 462, the text data 464, the input data 476, and/or the motion data 470. In some of the present embodiments, the output signal 466 may be transmitted to the backend devices 1830, using the communication module 450, through the router 1811 and/or the hub device 1812. The backend devices 1830, and/or the hub device 1812 may transmit (or forward) the output signal 466 to the client devices 1804, 1806 and/or the wireless speaker device 1898. In other embodiments, the output signal 466 may be transmitted directly to the client devices 1804, 1806 and/or the hub device 1812.

In further reference to FIG. 19, the image data 460 may comprise image sensor data such as (but not limited to) exposure values and data regarding pixel values for a particular sized grid. The image data 460 may include still images, live video, and/or pre-recorded images and/or video. The image data 460 may be recorded by the camera 444 in a field of view of the camera 444.

As a result of the processes described herein, by generating and analyzing whether or not the person actually presses (or otherwise provides an input to) the button 445 (e.g., as determined from the input data 476), the A/V device 1802, the hub device 1812, and/or the backend devices 1830 (e.g., whatever device(s) perform the processing) may execute the sets of instructions within the device application 458 for responses to inputs to the button 445. In some embodiments, the responses to inputs to the button 445 may include generating the user alert 472 and transmitting the user alert 472 to the client devices 1804, 1806 for notifying the user/owner of the A/V device 1802 that the input to the button 445 was received.

In further reference to FIG. 19, the motion data 470 may comprise motion sensor data generated in response to motion events. For example, in embodiments using a motion sensor 474, such as those where the A/V device 1802 is similar to that of the A/V recording and communication doorbell 130 of FIGS. 3-5, the motion data 470 may include an amount or level of a data type generated by the motion sensor 474. In some of the present embodiments, such as those where the A/V device 1802 does not include the motion sensor 474, the motion data 470 may be generated by the camera 444. In some of the present embodiments, the motion data 470 may be analyzed to determine the input data 476 of person(s) within the field of view of the motion sensor(s) 474 and/or the camera 444. In some embodiments, the motion data 470 may be generated as part of the input data 476, such as where at least a portion of the button 445 includes one or more of the motion sensors 474. The input data 476 may include that data generated in response to an input to the button 445. The button 445 (which may include similar design and functionality to that of the front button 133 (FIG. 3)) may receive an input (e.g., a press, a touch, a series of touches and/or presses, etc.) and may generate the input data 476 in response that is indicative of the type of input.

Figure 20:
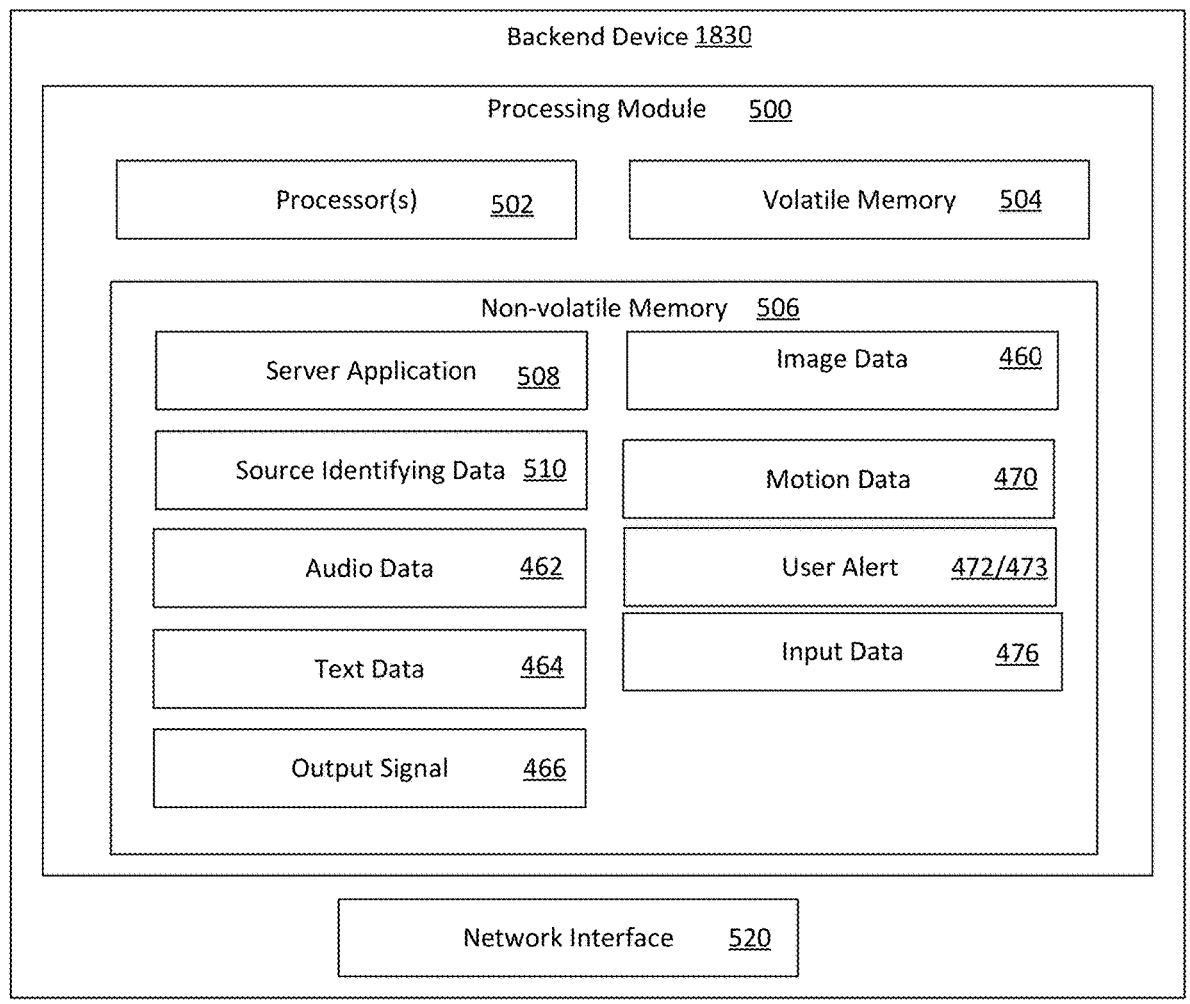
FIG. 20 is a functional block diagram illustrating one embodiment of a backend device, according to various aspects of the present disclosure.

FIG. 20 illustrates one embodiment of the backend devices 1830 according to various aspects of the present disclosure. For ease of reference, the backend devices 1830 shown in FIG. 18 will be referred to in the singular as "backend device 1830" when describing FIG. 20. The backend device 1830 shown in FIG. 20 may comprise one or more of the backend devices 1830 shown in FIG. 18, including the remote storage devices 1832, the servers 1834, and/or the APIs 1838.

With reference to FIG. 20, the backend device 1830 may comprise a processing module 500 including a processor 502, volatile memory 504, a network interface 520, and non-volatile memory 506. The network interface 520 may allow the backend device 1830 to access and communicate with devices connected to the network (Internet/PSTN) 1820 (e.g., the A/V device 1802, the hub device 1812, the client devices 1804, 1806, and/or a device controlled by the security monitoring service 418). The non-volatile memory 506 may include a server application 508 that configures the processor 502 to receive and/or retrieve the audio data 462, the text data 464, the input data 476, the user alerts 472, 473, the image data 460, and/or the motion data 470 from the A/V device 1802 (e.g., in the output signal 466), and/or the hub device 1812.

In further reference to FIG. 20, the non-volatile memory 506 may also include source identifying data 510 that may be used to identify the A/V device 1802, the hub device 1812, and/or the client devices 1804, 1806. In addition, the source identifying data 410 may be used by the processor 502 of the backend devices 1830 to determine the client devices 1804, 1806 associated with the A/V device 1802 and/or the hub device 1812.

In some embodiments, the server application 508 may further configure the processor 502 to generate and transmit a report signal (not shown) to a third-party client device (not shown), which may be associated with a law enforcement agency or the security monitoring service 418, for example. The report signal, which may be the user alert 472, 473 in some example, may include the image data 460, the audio data 462, and/or the text data 464. In such embodiments, an operator of the third-party client device may be able to view the image data 460, and/or the text data 464 to help in making a determination of whether a person in the field of view of the A/V device 1802 is suspicious and/or performing suspicious activities. As described herein, at least some of the processes of the A/V device 1802 and/or the hub device 1812 may be executed by the backend devices 1830.

Figure 21:
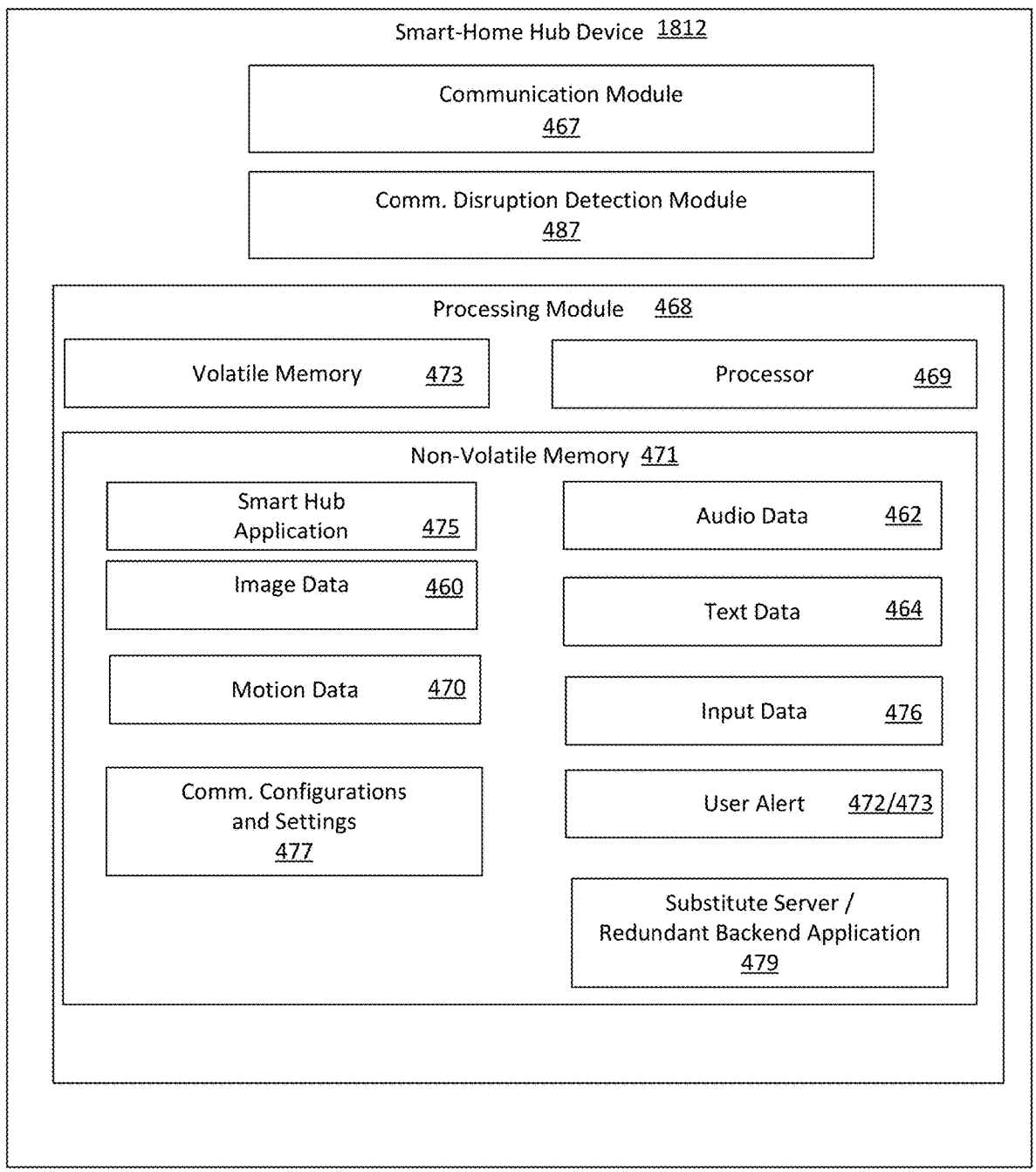
FIG. 21 is a functional block diagram illustrating one embodiment of a smart-home hub device, according to various aspects of the present disclosure.

FIG. 21 illustrates an embodiment of the smart-home hub device 1812 (alternatively referred to herein as the hub device 1812) according to various aspects of the present disclosure. The hub device 1812 may be, for example, one or more of a Wi-Fi hub, a smart-home hub, a hub of a home security/alarm system (a premises security hub), a gateway device, a hub for a legacy security/alarm system (e.g., a hub for connecting a pre-existing security/alarm system to the network (Internet/PSTN) 1820 for enabling remote control of the hub device 1812), and/or another similar device. The hub device 1812 may comprise a processing module 468 that is operatively connected to a communication module 467. In some embodiments, the hub device 1812 may comprise one or more of a camera (not shown), a microphone (not shown), and a speaker (not shown). The processing module 468 may comprise a processor 469, volatile memory 473, and non-volatile memory 471 that includes a smart-home hub application 475. The hub device 1812 may comprise a communication disruption detection module 487 that comprises Wi-Fi communication capabilities, wireless cellular communication capabilities, LPWAN communication capabilities, etc.

In various embodiments, the smart-home hub application 475 may configure the processor 469 to receive sensor data from the sensors 414 and/or the automation devices 416. For example, the sensor data may include a current state (e.g., opened/closed for door and window sensors, motion detected for motion sensors, living room lights on/off for a lighting automation system, etc.) of each of the sensors 414 and/or the automation devices 416. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 414 and/or the automation devices 416 as well as any updates to the current state based on sensor triggers.

With further reference to FIG. 21, the smart-home hub application 475 may configure the processor 469 to receive the audio data 462, the text data 464, the image data 460, the motion data 470, the input data 476, and/or the user alert 472 from the A/V device 1802 (in some embodiments, via the backend devices 1830) using the communication module 467. For example, the hub device 1812 may receive and/or retrieve (e.g., after receiving a signal from the A/V device 1802 that the A/V device 1802 has been activated) the image data 460, the input data 476, and/or the motion data 470 from the A/V device 1802 and/or the backend devices 1830 in response to motion being detected by the A/V device 1802. In addition, the hub device 1812 may analyze the image data 460, the input data 476, and/or the motion data 470.

The communication disruption detection module 487 may detect communication disruptions due to outages on any of the intermediate network devices (e.g., the router 1811) and/or network connections (e.g., the connection between router 1811 to the network 1820) between the A/V device 1802 and the backend devices 1830, and on the backend devices 1830 themselves. Based on the detection of a communication disruption, the smart-home hub application 475 may configure the processor 469 to transmit the audio data 462, the text data 464, the image data 460, the motion data 470, the input data 476, and/or the user alert 472 from the A/V device 1802 to the backend devices 1830, to one or more of the client devices 1804, 1806, and/or to the wireless speaker device 1898 (in some embodiments, via the backend devices 1830), using the communication module 467 according to different communication configurations and settings 477. For example, the communication configurations and settings 477 may include configurations and settings for Wi-Fi communications, wireless cellular communications, LPWAN communications, etc., and when the communication disruption detection module 487 detects a disruption in the Wi-Fi communication link or path, the smart-home hub application 475 may configure the processor 469 to transmit data from the A/V device 1802 to the backend devices 1830, to one or more of the client devices 1804, 1806, and/or to the wireless speaker device 1898 (in some embodiments, via the backend devices 1830), using either or both of the wireless cellular communication link or path and the LPWAN communication link or path.

The non-volatile memory 471 of the hub device 1812 also comprise a substitute server/redundant backend application 479. The substitute server/redundant backend application 479 may configure the processor 469 to perform functions of the backend devices 1830. For example, without limitation, the processor 469 of the hub device 1812 may execute the substitute server/redundant backend application 479 to store data from the A/V device 1802, to identify one or more devices (e.g., client devices, wireless speaker devices, and/or other home automation devices) associated with the A/V device 1802, and/or to serve as one or more APIs (e.g., the APIs 1838).

In the illustrated embodiment of FIGS. 19-21 the various components including (but not limited to) the processing modules 446, 468, 500, the communication modules 450, 467 and the network interface 520 are represented by separate boxes. The graphical representations depicted in each of FIGS. 12-14 are, however, merely examples, and are not intended to indicate that any of the various components of the A/V device 1802, the hub device 1812, and/or the server(s) 430 are necessarily physically separate from one another, although in some embodiments they might be. In other embodiments, however, the structure and/or functionality of any or all of the components of each of the A/V device 1802, the hub device 1812, and/or the backend devices 1830 may be combined. As an example, the structure and/or functionality of any or all of the components of the A/V device 1802 may be combined. In addition, in some embodiments the communication module 450 may include its own processor, volatile memory, and/or non-volatile memory. As another example, the structure and/or functionality of any or all of the components of the hub device 1812 may be combined. In addition, in some embodiments the communication module 467 may include its own processor, volatile memory, and/or non-volatile memory.

Figure 22:
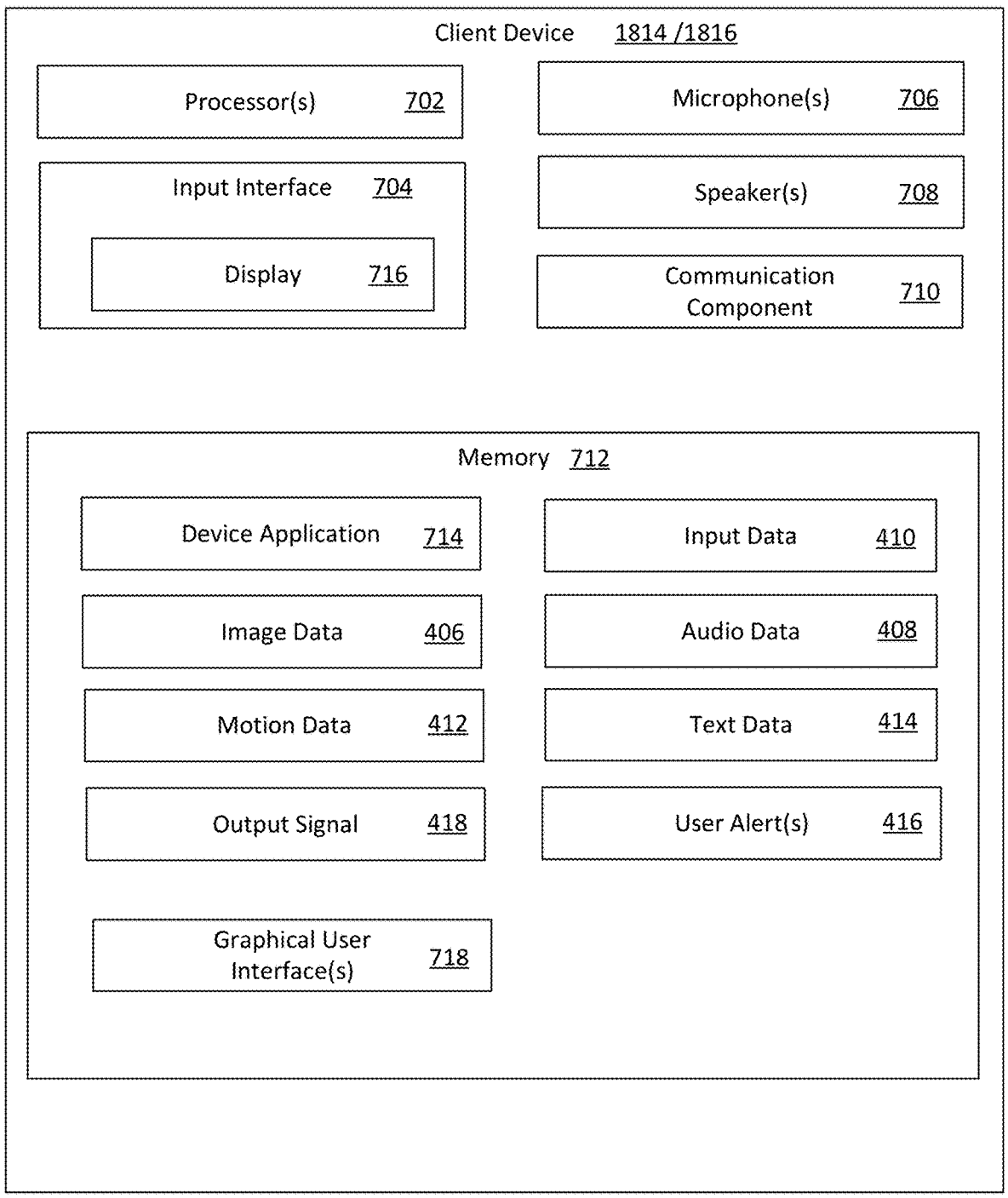
FIG. 22 is a functional block diagram illustrating one embodiment of a client device, according to various aspects of the present disclosure.

Now referring to FIG. 22, FIG. 22 is a functional block diagram illustrating one embodiment of the client device 1814/1816, according to various aspects of the present disclosure. The client device 1814/1816 may comprise one or more processor(s) 702 (which may be similar to, and/or include similar functionality as, the processor(s) 310) that is/are operatively connected to an input interface 704, microphone(s) 706, speaker(s) 708, a communication component 710 (which may be similar to, and/or include similar functionality as, the communication component 312), and memory 712 (which may be similar to, and/or include similar functionality as, the memory 402). The client device 1814/1816 may further comprise a camera (not shown) operatively connected to the processor(s) 702. The client device 1814/1816 may include some or all of the components and/or functionality of the client device(s) 114 of FIG. 1 and/or the client device 800 of FIG. 29.

The memory 712 may store a device application 714. In various embodiments, the device application 714 may configure the processor(s) 702 to receive input(s) to the input interface 704 (e.g., requests to view image data 406, request(s) to initiate or install a new A/V device 1802, etc.). In addition, the device application 714 may configure the processor(s) 702 to receive, using the communication component 710, the input data 410, the image data 406, the audio data 408, the output signal 418, and/or the user alerts 416 from one or more of the A/V device 1802, the hub device 1812, or the backend devices 1830. Furthermore, the device application 714 may configure the processor(s) 702 to receive, using the communication component 710, the image data 432 from one or more of the A/V device 1802, the hub device 1812, the backend devices 1830, or another electronic device (e.g., a second A/V device 1802).

With further reference to FIG. 22, the input interface 704 may include a display 716. The display 716 may include a touchscreen, such that the user of the client device 1814/1816 may provide inputs directly to the display 716 (e.g., requests to set-up an A/V device 1802, request(s) to view image data 406, etc.). In some embodiments, the client device 1814/1816 may not include a touchscreen. In such embodiments, and in embodiments where the client device 1814/1816 includes the touchscreen, the user may provide an input using any input device, such as, without limitation, a mouse, a trackball, a touchpad, a joystick, a pointing stick, a stylus, etc.

In some of the present embodiments, in response to receiving a user alert 416, the device application 714 may configure the processor(s) 702 to cause the display 716 to display the user alert 416 via a graphical user interface 718. The user alert 416 may indicate that the A/V device 1802 detected motion. While displaying the user alert 416, the input interface 704 may receive input from the user to answer the user alert 416. In response, the device application 714 may configure the processor(s) 702 to display the received image data 406 on the display 716 (e.g., display video footage represented by the image data 406 and/or video footage represented by the image data 406 on the display 716).

In some examples, the device application 714 may configure the processor(s) 702 to refrain from displaying the user alert 416 on the display 716. For example, the device application 714 may receive, using the communication component 710, the user alert 416 that indicates that motion was detected by the A/V device 1802.

Figure 23:
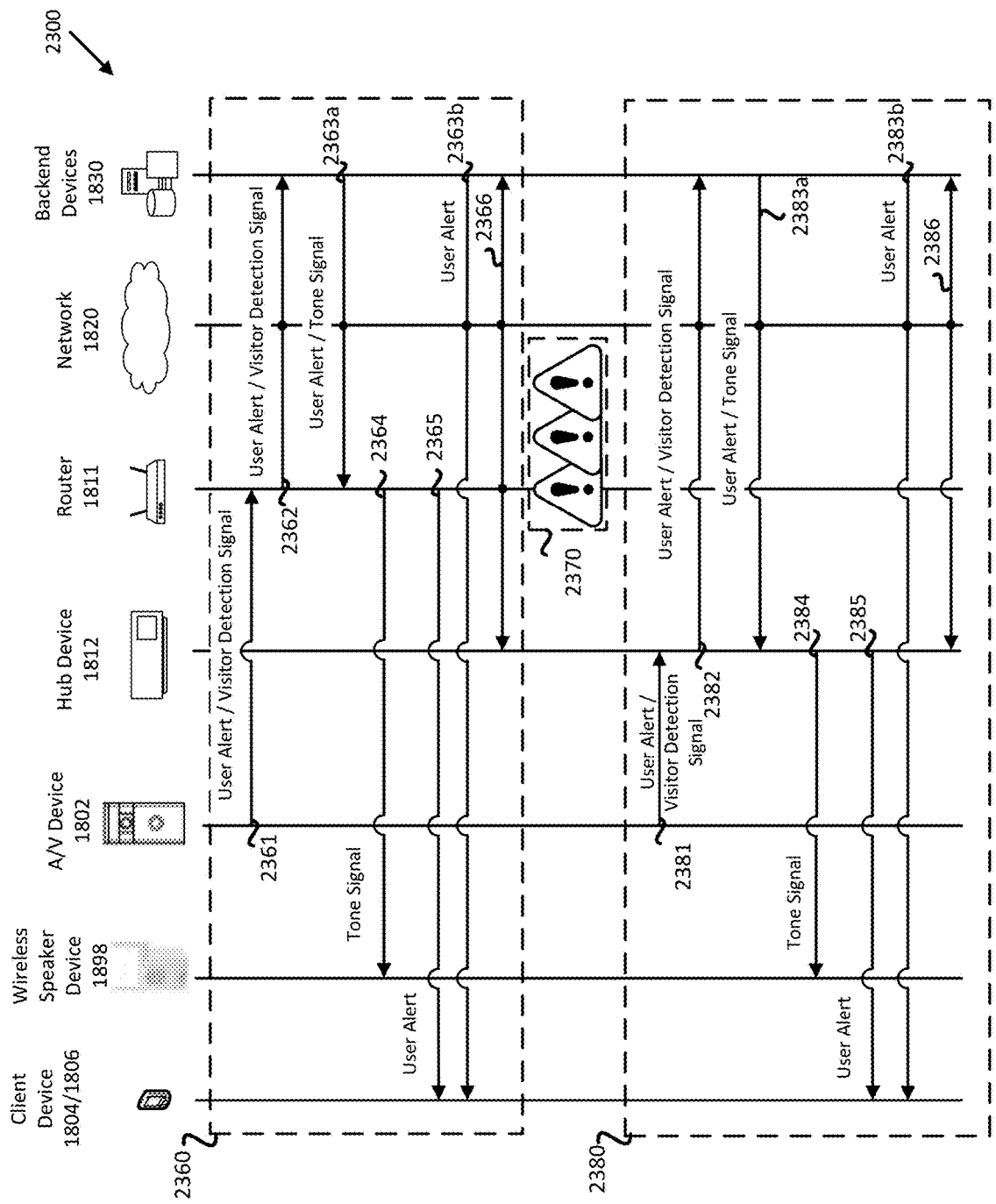
FIG. 23 is a functional block diagram illustrating a system for communicating in a network using different operation modes, according to various aspects of the present disclosure.

FIG. 23 illustrates a system 2300 for communicating in a network under different operational modes according to various aspects of the present disclosure. With reference to FIGS. 18 and 23, under a normal operation mode 2360, the A/V device 1802 may detect the presence of a visitor by detecting motion using the camera 434 and/or the motion sensor 435, and/or by detecting that the visitor has pressed a front button of the A/V device 1802 (if the A/V device 1802 is a doorbell). In response to the detection of the visitor, the A/V device 1802 may begin to capture video images and/or audio, and send a user alert to the client device 1804/1806 via the router 1811 in the user's network 1810, the network 1820, and the backend devices 1830. The A/V device 1802 may also send streaming video and streaming audio to the client device 1804/1806 via the router 1811 in the user's network 1810, the network 1820, and the backend devices 1830.

In FIG. 23, the user alert may be transmitted from the A/V device 1802 to the router 1811 of the user's network 1810 using a network connection 2361. The user's network 1810 may comprise a LAN, such a Wi-Fi network compatible with the IEEE 802.11 standard and/or other wireless communication standard(s). The user alert may be then transmitted from the router 1811 of the user's network 1810 to the backend devices 1830 (e.g., the remote storage devices 1832, the servers 1834, and/or the APIs 1838) via the network 1820 using a network connection 2362. The network 1820 may comprise a WAN, such as the Internet and/or a PSTN. The network 1820 may be any wireless network or any wired network, or a combination thereof, configured to operatively couple the above-mentioned modules, devices, and systems as shown in FIG. 18. In the present example embodiments, the network connections 2361 and 2362 form a first communication link between the A/V device 1802 and the backend devices 1830, where the network connection 2361 bypasses the hub device 1812.

In response to receiving the user alert from the A/V device 1802, the backend devices 1830 (e.g., the servers 1834) may identify the client devices 1804 and/or 1806 associated with the A/V device 1802, and connect the A/V device 1802 to the client devices 1804 and/or 1806 through the network 1820 and the user's network 1810. For example, the backend devices 1830 may identify the client device 1804/1806 associated with the A/V device 1802, and, when the client device 1804/1806 is connected to the user's network 1810 (e.g., when the user is home), the backend devices 1830 may send the user alert from the A/V device 1802 to the router 1811 of the user's network 1810 through the network 1820 using a network connection 2363*a*. The router 1811 of the user's network 1810 may send the user alert to the client device 1804/1806 via the user's network 1810 using a network connection 2365. If the user answers the alert, two-way audio communication may then occur between the visitor and the user through the A/V device 1802 and the client device 1804, 1806. The user may view the visitor throughout the duration of the call, but the visitor cannot see the user (unless the A/V device 1802 includes a display, which it may in some embodiments). Alternatively, when the client device 1804/1806 is not connected to the user's network 1810 (e.g., when the user is away from home), the backend devices 1830 may send the user alert from the A/V device 1802 to the client device 1804/1806 through the network 1820 using a network connection 2363*b*.

Also, in normal operation mode 2360, the video images captured by the camera 314 of the A/V device 1802 (and the audio captured by the microphone 328) may be uploaded to the cloud and recorded on the backend devices 1830 (e.g., remote storage devices 1832) through the network connection 2362. In some embodiments, the video and/or audio may be recorded on the backend devices 1830 even if the user chooses to ignore the alert sent to his or her client device 1804/1806.

With further reference to FIGS. 18 and 23, in response to the detection of the visitor, the A/V device 1802 may also send, via the network connection 2361, a visitor detection signal to the API 540 (FIG. 1) via the router 1811 in the user's network 1810, the network 1820, and one or more of the backend devices 1830. The visitor detection signal may include information about the visitor-detection event, such as whether the visitor was detected via sensed motion or via a button press.

Similar to the user alert described above, the visitor detection signal may be sent from the A/V device 1802 to the router 1811 of the user's network 1810 using the network connection 2361. The visitor detection signal may be then sent from the router 1811 of the user's network 1810 to the backend devices 1830 (e.g., the APIs 1838) via the network 1820 using the network connection 2362. In the present example embodiments, the network connections 2361 and 2362 form a first communication link between the A/V device 1802 and the backend devices 1830, where the network connection 2361 bypasses the hub device 1812.

In response to receiving the visitor detection signal from the A/V device 1802 through the router 1811, the API 540 (FIG. 1) in the APIs 1838 of the backend devices 1830 may send a signal (e.g., a wireless speaker activation signal) to the wireless speaker service 542 (FIG. 1). The wireless speaker service 542 may comprise one or more wireless speaker data structures 546 (FIG. 1) storing information about a plurality of wireless speaker devices, such as the wireless speaker device 1898. For example, the information may include information about each wireless speaker device and at least one associated wireless A/V recording and communication device, such as the wireless A/V device 1802. The wireless speaker service 542 may access the information in the wireless speaker data structure(s) 546 when needed to determine which wireless speaker device(s) is/are associated with a wireless A/V recording and communication device that sends the visitor detection signal to the API 1838. The wireless speaker service 542 may also maintain the information in the wireless speaker data structure(s) 546 and update the information in the wireless speaker data structure(s) 546 when new wireless speaker devices are activated, when existing wireless speaker devices are deactivated, and/or when associations between existing wireless speaker devices and wireless A/V recording and communication devices are changed.

In response to receiving the visitor detection signal from the A/V device 1802, the backend devices 1830 (e.g., the APIs 1838) may identify the wireless speaker device 1898 associated with the A/V device 1802, and send a tone signal to the wireless speaker device 1898 through the network 1820 and the user's network 1810. For example, the backend devices 1830 may identify the wireless speaker device 1898 associated with the A/V device 1802, and send the tone signal from the APIs 1838 to the router 1811 of the user's network 1810 through the network 1820 using the network connection 2363. The router 1811 of the user's network 1810 may transmit the tone signal to the wireless speaker device 1898 via the user's network 1810 using a network connection 2364. The wireless speaker device 1898 may then emit a tone to alert any person(s) within earshot of the wireless speaker device 1898 that a visitor has been detected at the A/V device 1802.

In FIG. 23, under the normal operation mode 2360, the hub device 1812 may be communicatively coupled to the backend devices 1830 through the router 1811 of the user's network 1810 (e.g., a LAN) and the network 1820 (e.g., a WAN) using a network connection 2366. The hub device 1812 may connect other devices (e.g., the sensors 1814 and the automation devices 1816 in FIG. 18) in the user's network 1810 to the backend devices 1830.

In FIG. 23, a communication disruption 2370 may occur, where the A/V device 1802 is unable to communicate with the backend devices 1830 via the first communication link (e.g., the network connections 2361 and 2362). The communication disruption 2370 may be due to outages (e.g., failure) of the router 1811 and/or the network connection 2362 between the router 1811 and the backend devices 1830. As a result, the A/V device 1802 is unable to send user alerts or visitor detection signals to the backend devices 1830 via the network connections 2361 and 2362. Consequently, the client device 1804/1806 is unable to receive user alerts from the A/V device 1802. Also, the wireless speaker device 1898 is unable to receive the tone signal from the backend devices 1830. In addition, the hub device 1812 is unable to communicate with the backend devices 1830 via the network connection 2366. As such, the communication disruption 2370 may cause inconvenience to the user(s) of the client device 1804/1806 and the wireless speaker device 1898. Thus, the communication disruption 2370 due to outages on the router 1811 and/or the network connection 2366 between the router 1811 and the backend devices 1830 may greatly impact the utility of the A/V device 1802, and cause inconvenience to the users of the client devices 1804, 1806 and the wireless speaker device 1898.

According to embodiments of the present application, when the communication disruption 2370 occurs, the A/V device 1802 and the hub device 1812, among other devices, may enter a hub-as-substitute server operation mode 2380 (FIG. 23), in response to the detection of the communication disruption 2370 by at least one of the A/V device 1802 and the hub device 1812. Under the hub-as-substitute server operation mode 2380, the A/V device 1802 may reconfigure its firmware/software and/or hardware settings to communicate with the backend devices 1830 using a second communication link through the hub device 1812. For example, in response to detecting the communication disruption 2370, the A/V device 1802 may send the user alert/visitor detection signal, which would otherwise be sent to the router 1811 using the network connection 2361 during the normal operation mode 2360, to the hub device 1812 using a network connection 2381.

In response to receiving the user alert/visitor detection signal from the A/V device 1802, or in response to detecting the communication disruption 2370 by itself, the hub device 1812 also reconfigures its firmware/software and/or hardware settings to send the user alert/visitor detection signal to the client devices 1804, 1806 through the network 1820. In FIG. 23, the hub device 1812 sends the user alert/visitor detection signal to the backend devices 1830 using a network connection 2382, where the network connection 2382, unlike the network connection 2362, bypasses the router 1811 and the failed connection/link between the router 1811 and the backend devices 1830. In one example embodiment, the hub device 1812 may comprise cellular capabilities, where the communication module 467 (FIG. 20) of the hub device 1812 may send the user alert/visitor detection signal to the backend devices 1830 using one or more cellular networks (e.g., 4G LTE or 5G NR networks) of the network 1820. In another example embodiment, the hub device 1812 may comprise LPWAN capabilities, where the communication module 467 (FIG. 20) of the hub device 1812 may send the user alert/visitor detection signal to the backend devices 1830 using one or more LPWAN networks (e.g., chirp spread spectrum (CSS) modulation technology (e.g., LoRaWAN), or Ultra Narrow Band modulation technology (e.g., Sigfox, Telensa, NB-IoT, etc.), or RingNet, or the like).

In another example embodiment, under the normal operation mode 2360, the user alert/visitor detection signal from the A/V device 1802 may be sent to the router 1181 through the hub device 1802. In response to detecting the communication disruption 2370, the hub device 1812 may reconfigure its firmware/software and/or hardware settings to send the user alert/visitor detection signal to the client devices 1804, 1806 through the network 1820, bypassing the router 1811. In this case, the A/V device 1802 may keep communicating with the client devices 1804, 1806 and/or the wireless speaker device 1898 through the hub device 1802 during the communication disruption 2370 without being aware of the communication disruption 2370.

As shown in FIG. 23, the user alert/visitor detection signal may be transmitted from the hub device 1812 to the backend devices 1830 using the network connection 2382, which may comprise a wireless cellular communication link via the network 1820. The network 1820 may comprise a wireless wide area network (WWAN), such as a cellular network for communicating with the hub device 1812 through wireless cellular communication links, an LPWAN network for communicating with the hub device 1812 through LPWAN communication links, and/or another type of communication network. In other example embodiments, the network 1820 may be any wireless network or any wired network, or a combination thereof, configured to operatively couple the above-mentioned modules, devices, and systems as shown in FIG. 18. In the present example embodiments, the network connections 2381 and 2382 form at least a part of a second communication link between the A/V device 1802 and the client device 1804/1806, where the network connection 2382 bypasses the router 1811 and/or the failed connection/link between the router 1811 and the backend devices 1830.

In response to receiving the user alert from the A/V device 1802, the backend devices 1830 (e.g., the servers 1834) may identify the client device 1804/1806 associated with the A/V device 1802, and, when the client device 1804/1806 is connected to the hub device 1812 (e.g., when the user is home), the backend devices 1830 may connect the A/V device 1802 to the client device 1804/1806 through the network 1820 and the hub device 1812, for example, via a wireless cellular communication link, via an LPWAN communication link, and/or via another type of communication link. For example, the backend devices 1830 may identify the client device 1804/1806 associated with the A/V device 1802, and send the user alert from the A/V device 1802 to the hub device 1812 through the network 1820 using a network connection 2383, which may comprise a wireless cellular communication link, an LPWAN communication link, and/or another type of communication link. The hub device 1812 may transmit the user alert to the client device 1804/1806 via the user's network 1810 using a network connection 2385 bypassing the router 1811. If the user answers the alert, two-way audio communication may then occur between the visitor and the user through the A/V device 1802 and the client device 1804, 1806. The user may view the visitor throughout the duration of the call, but the visitor cannot see the user (unless the A/V device 1802 includes a display, which it may in some embodiments).

Alternatively, when the client device 1804/1806 is not connected to the hub device 1812 (e.g., when the user is away from home), the backend devices 1830 may send the user alert from the A/V device 1802 to the client device 1804/1806 through the network 1820 using a network connection 2383b.

In another example embodiment, during the communication disruption 2370, upon receiving the user alert from the A/V device 1802, the hub device 1812 may identify the client devices 1804, 1806 associated with the A/V device 1802, and when the client device 1804/1806 is connected to the hub device 1812 (e.g., when the user is home), the hub device 1812 may send the user alert to the client devices 1804, 1806 directly through the user's network 1810, without sending the user alert to the backend devices 1830.

The video images captured by the camera 314 of the A/V device 1802 (and the audio captured by the microphone 328) may be uploaded to the cloud and recorded on the remote storage device 1832 (FIG. 18) through the network connection 2382. In some embodiments, the video and/or audio may be recorded on the remote storage device 1832, through the network connections 2381 and 2382, even if the user chooses to ignore the alert sent to his or her client device 1804, 1806.

In FIG. 23, in response to receiving the visitor detection signal from the A/V device 1802 through the hub device 1812, the API 540 (FIG. 1) in the APIs 1838 of the backend devices 1830 may send a signal (e.g., a wireless speaker activation signal) to the wireless speaker service 542 (FIG. 1). The wireless speaker service 542 may comprise one or more wireless speaker data structures 546 (FIG. 1) storing information about a plurality of wireless speaker devices, such as the wireless speaker device 1898. For example, the information may include information about each wireless speaker device and at least one associated wireless A/V recording and communication device, such as the wireless A/V device 1802. The wireless speaker service 542 may access the information in the wireless speaker data structure(s) 546 when needed to determine which wireless speaker device(s) is/are associated with a wireless A/V recording and communication device that sends the visitor detection signal to the API 1838. The wireless speaker service 542 may also maintain the information in the wireless speaker data structure(s) 546 and update the information in the wireless speaker data structure(s) 546 when new wireless speaker devices are activated, when existing wireless speaker devices are deactivated, and/or when associations between existing wireless speaker devices and wireless A/V recording and communication devices are changed.

In response to receiving the visitor detection signal from the A/V device 1802, the backend devices 1830 (e.g., the APIs 1838) may identify the wireless speaker device 1898 associated with the A/V device 1802, and send a tone signal to the wireless speaker device 1898 through the network 1820 and the hub device 1812. For example, the backend devices 1830 may identify the wireless speaker device 1898 associated with the A/V device 1802, and send the tone signal from the APIs 1838 to the hub device 1812 through the network 1820 using the network connection 2383, which may comprise a wireless cellular communication link, an LPWAN communication link, and/or another type of communication link. The hub device 1812 may transmit the tone signal to the wireless speaker device 1898 via the user's network 1810 using a network connection 2384 bypassing the router 1811. The wireless speaker device 1898 may then emit a tone to alert any person(s) within earshot of the wireless speaker device 1898 that a visitor has been detected at the A/V device 1802.

In another example embodiment, during the communication disruption 2370, upon receiving the visitor detection signal from the A/V device 1802, the hub device 1812 may identify the wireless speaker device 1898 associated with the A/V device 1802 and generate the tone signal on-site, and send the tone signal to the wireless speaker device 1898 directly through the user's network 1810, without sending the visitor detection signal to the backend devices 1830.

In FIG. 23, under the hub-as-substitute server operation mode 2380, the hub device 1812 may be communicatively coupled to the backend devices 1830 through the network 1820 (e.g., a WWAN) using a network connection 2386 bypassing the router 1811 and/or the failed connection/link between the router 1811 and the backend devices 1830. The hub device 1812 may connect other devices (e.g., the sensors 1814 and the automation devices 1816 in FIG. 18) in the user's network 1810 to the backend devices 1830 using the network connection 2386, which may comprise a wireless cellular communication link, an LPWAN communication link, and/or another type of communication link.

The abilities of the A/V device 1802 to detect the communication disruption 2370 and reconfigure its settings to communicate with the hub device 1812 during the communication disruption 2370, and the abilities of hub device 1812 to reconfigure its settings to bypass the router 1811 during the communication disruption 2370 to communicate with the backend devices 1830 using wireless cellular communication links, LPWAN communication links, and/or other types of communication links, substantially eliminate service disruptions due to outages of the router and due to outages of the connections between the router and the backend devices 1830, thereby improving service reliability and user experience for the A/V devices.

Figure 24A:
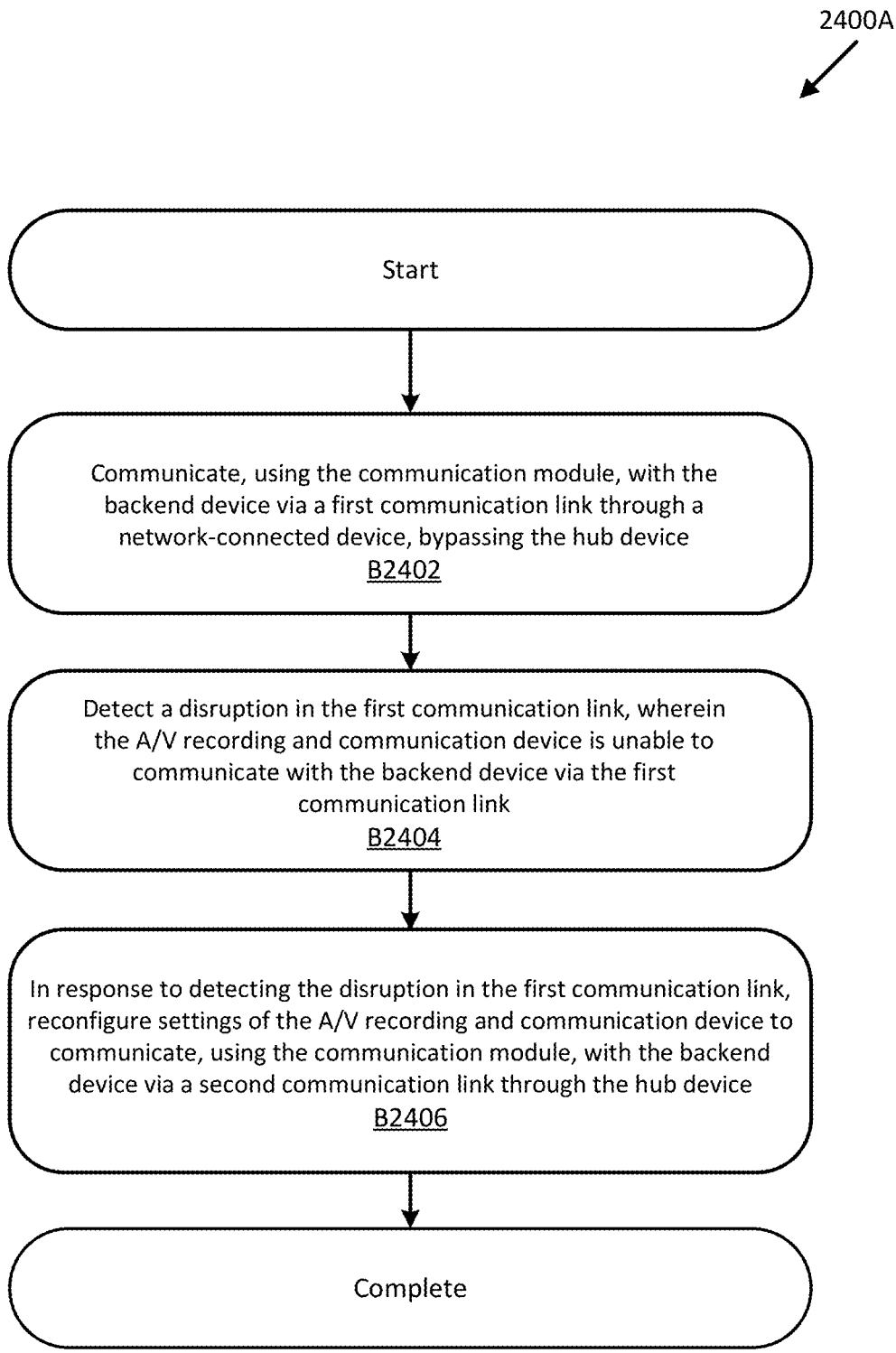
FIGS. 24A and 24B are flowcharts illustrating example processes for transmitting a user alert and/or a visitor detection signal, according to various aspects of the present disclosure.

FIG. 24A is a flowchart illustrating an example process 2400A for transmitting a user alert and/or a visitor detection signal using a hub device to one or more client devices and/or one or more wireless speaker devices associated with an A/V device, when a communication disruption occurs between a network-connected device coupled to the A/V device and one or more backend devices, according to various aspects of the present disclosure.

The process 2400A, at block B2402, communicates, using the communication module of the A/V device, with the server via a first communication link through the network-connected device, bypassing the hub device. For example, the communication module 438 of the A/V device 1802 communicates with the servers 1834 via a first communication link through the router 1811, where the first communication link may include the network connections 2361 and 2362 (FIG. 23). The first communication link bypasses the hub device 1812.

The process 2400A, at block B2404, detects, by the A/V device, a disruption in the first communication link, where the A/V recording and communication device is unable to communicate with the backend devices via the first communication link. For example, the processor 440 of the A/V device 1802 detects the communication disruption 2370 in the first communication link, where the A/V device 1802 is unable to communicate with the servers 1834 via the first communication link having the network connections 2361 and 2362. As discussed above, the communication disruption 2370 may be due to outages (e.g., failure) of the router 1811 and/or a connection/link between the router 1811 and the backend devices 1830.

The process 2400A, at block B2406, in response to detecting the disruption in the first communication link, reconfigures settings of the A/V device to communicate, using the communication module, with the backend device via a second communication link through the hub device. For example, in response to detecting the communication disruption 2370 in the first communication link having the network connections 2361 and 2362, the processor 440 of the A/V device 1802 reconfigures settings of the A/V device 1802 to communicate, using the communication module 438, with the servers 1834 via a second communication link having the network connections 2381 and 2382, where the network connection 2381 is between the A/V device 1802 and the hub device 1812, and the network connection 2382 is between the hub device 1812 and the backend devices 1830 (e.g., servers 1834) through the network 1820.

Figure 24B:
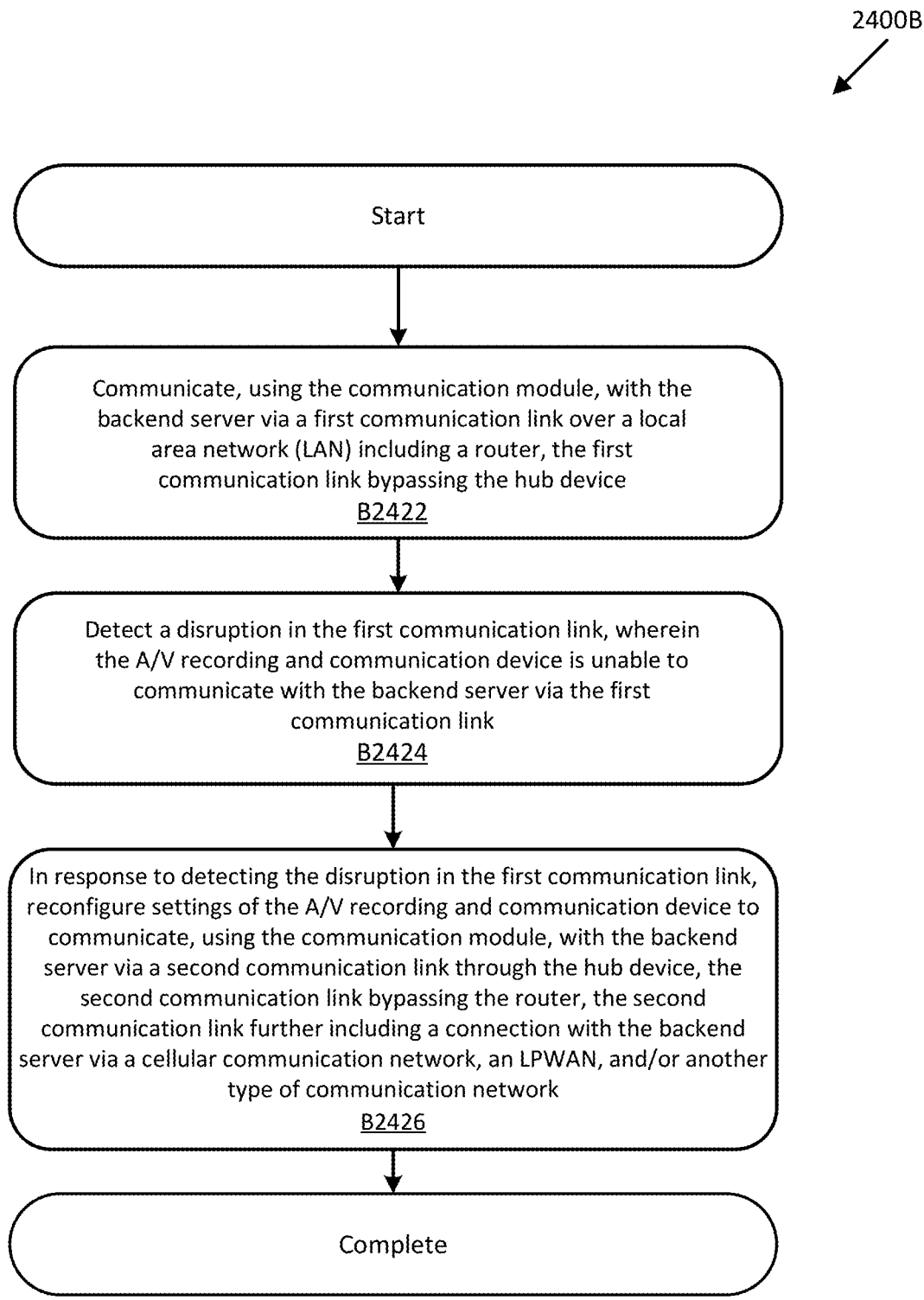

FIG. 24B is a flowchart illustrating an example process 2400B for transmitting a user alert and/or a visitor detection signal using a hub device to one or more client devices and/or one or more wireless speaker devices associated with an A/V device, when a communication disruption occurs between a router coupled to the A/V device and one or more backend devices, according to various aspects of the present disclosure.

The process 2400B, at block B2422, communicates, using the communication module of the A/V device, with the server via a first communication link over a LAN including the router, the first communication link bypassing the hub device. For example, the communication module 438 of the A/V device 1802 communicates with the servers 1834 via a first communication link having the network connections 2361 and 2362 (FIG. 23), where the network connection 2361 is between the A/V device 1802 and the router 1811 of the user's network 1810 (e.g., a LAN), and the network connection 2362 is between the router 1811 and the backend devices 1830 (e.g., servers 1834) through the network 1820. The first communication link bypasses the hub device 1812.

The process 2400B, at block B2424, detects, by the A/V device, a disruption in the first communication link, where the A/V recording and communication device is unable to communicate with the server via the first communication link. For example, the processor 440 of the A/V device 1802 detects the communication disruption 2370 in the first communication link, where the A/V device 1802 is unable to communicate with the servers 1834 via the first communication link having the network connections 2361 and 2362. As discussed above, the communication disruption 2370 may be due to outages (e.g., failure) of the router 1811 and/or a connection/link between the router 1811 and the backend devices 1830.

The process 2400B, at block B2426, in response to detecting the disruption in the first communication link, reconfigures settings of the A/V device to communicate, using the communication module, with the server via a second communication link through the hub device, the second communication link bypassing the router, the second communication link further including a connection with the server via a cellular communication network, an LPWAN communication network, and/or another type of communication network. For example, in response to detecting the communication disruption 2370 in the first communication link having the network connections 2361 and 2362, the processor 440 of the A/V device 1802 reconfigures settings of the A/V device 1802 to communicate, using the communication module 438, with the servers 1834 via a second communication link having the network connections 2381 and 2382, where the network connection 2381 is between the A/V device 1802 and the hub device 1812, and the network connection 2382 is between the hub device 1812 and the backend devices 1830 (e.g., servers 1834) through the network 1820. The second communication link having the network connections 2381 and 2382 bypasses the router 1811. The network connection 2382 of the second communication link further includes a wireless cellular connection/link with the servers 1834 via a cellular communication network (e.g., a 4G LTE network or a 5G new radio network), a wireless connection/link with the servers 1834 via an LPWAN network (e.g., chirp spread spectrum (CSS) modulation technology (e.g., LoRaWAN), or Ultra Narrow Band modulation technology (e.g., Sigfox, Telensa, NB-IoT, etc.), or RingNet, or the like), and/or a connection/link with the servers 1834 via another type of communication network.

Figure 25A:
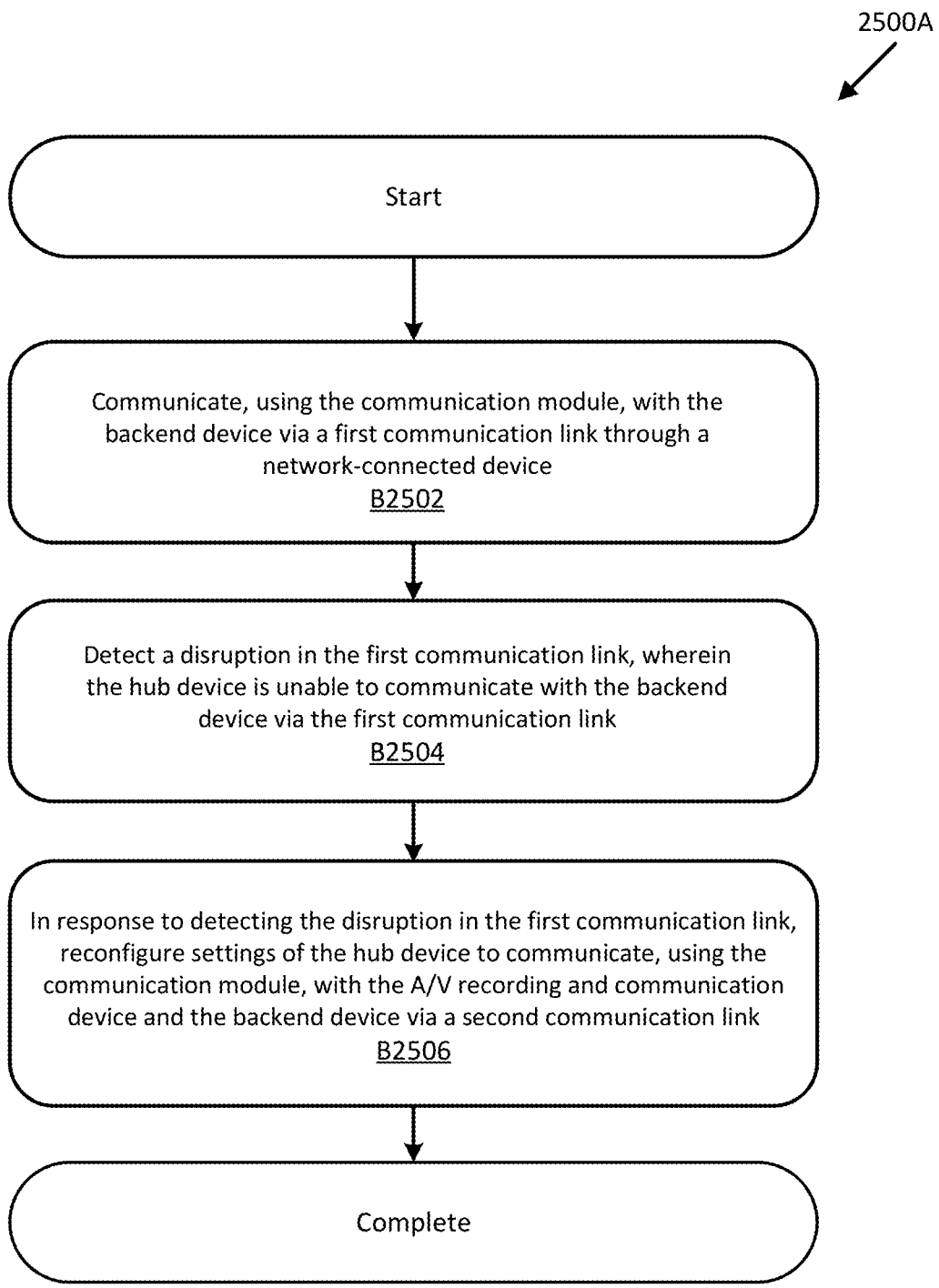
FIGS. 25A and 25B are flowcharts illustrating further example processes for transmitting a user alert and/or a visitor detection signal, according to various aspects of the present disclosure.

FIG. 25A is a flowchart illustrating an example process 2500A for transmitting a user alert and/or a visitor detection signal using a hub device to one or more client devices and/or one or more wireless speaker devices associated with an A/V device, when a communication disruption occurs between a network-connected device coupled to the A/V device and one or more backend devices, according to various aspects of the present disclosure.

The process 2500A, at block B2502, communicates, using the communication module of the hub device, with the backend device via a first communication link through a network-connected device. For example, the communication module 467 of the hub device 1812 communicates with the backend devices 1830 (e.g., servers 1834) via a first communication link having the network connection 2366. The network connection 2366 between the hub device 1812 and the backend devices 1830 is through the router 1811 and the network 1820.

The process 2500A, at block B2504, detects, by the hub device, a disruption in the first communication link, where the hub device is unable to communicate with the backend devices via the first communication link. For example, the processor 469 of the hub device 1812 detects the disruption 2370 in the first communication link, where the hub device 1812 is unable to communicate with the servers 1834 via the first communication link having the network connection 2366 (FIG. 23). As discussed above, the communication disruption 2370 may be due to outages (e.g., failure) of the router 1811 and/or a connection/link between the router 1811 and the backend devices 1830.

The process 2500A, at block B2506, in response to detecting the disruption in the first communication link, reconfigures settings of the hub device to communicate, using the communication module, with the A/V recording and communication device and the backend device via a second communication link. For example, in response to detecting the disruption 2370 in the first communication link having the network connection 2366, the processor 469 of the hub device 1812 reconfigures settings of the hub device 1812 to communicate, using the communication module 467, with the A/V device 1802 and the backend devices 1830 via a second communication link having the network connections 2381 and 2382, where the network connection 2381 is between the A/V device 1802 and the hub device 1812, and the network connection 2382 is between the hub device 1812 and the backend devices 1830 through the network 1820.

Figure 25B:
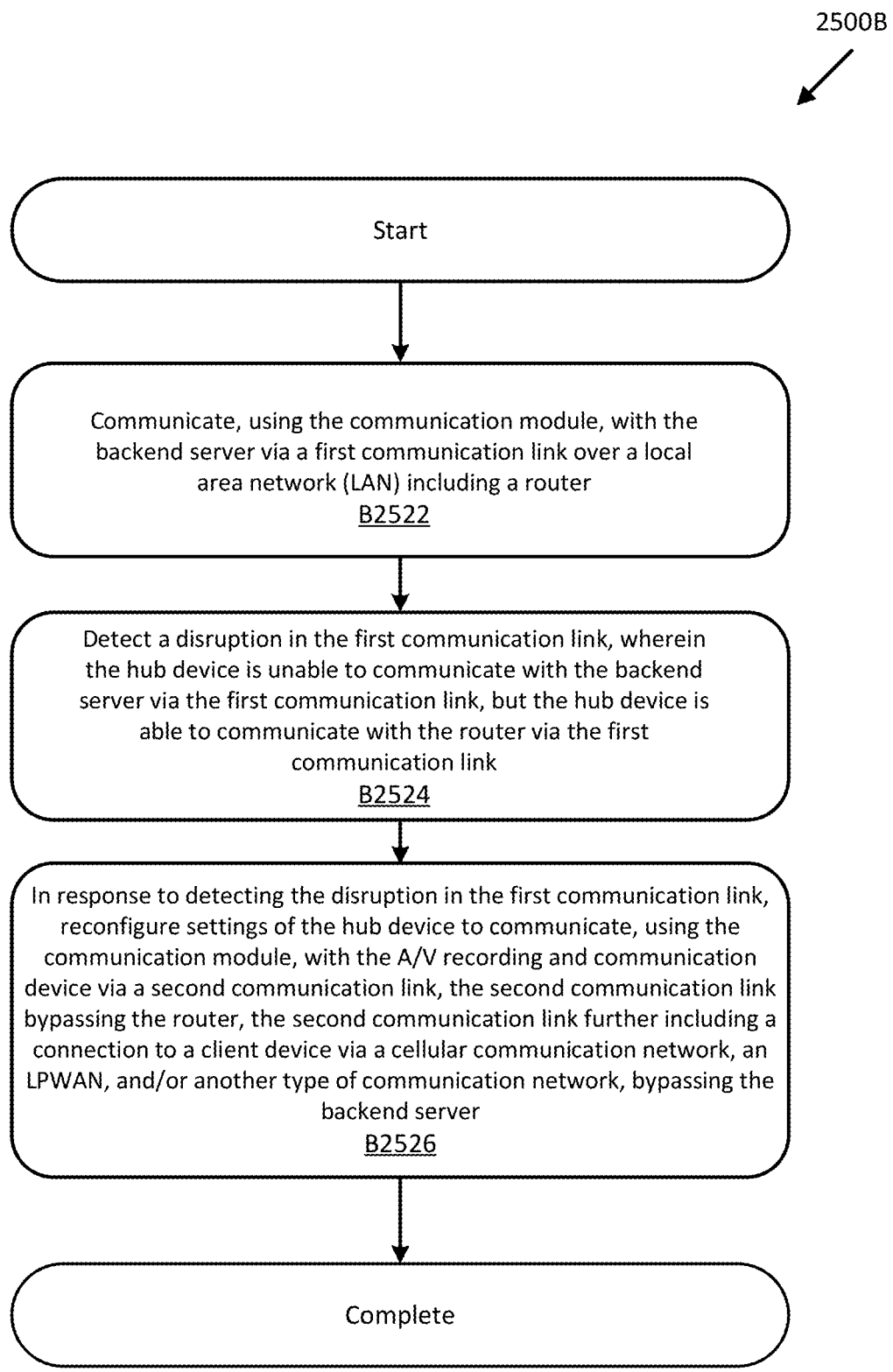

FIG. 25B is a flowchart illustrating an example process 2500B for transmitting a user alert and/or a visitor detection signal using a hub device to one or more client devices and/or one or more wireless speaker devices associated with an A/V device, when a communication disruption occurs between a router coupled to the A/V device and one or more backend devices, according to various aspects of the present disclosure.

The process 2500B, at block B2522, communicates, using the communication module of the hub device, with the server via a first communication link over a LAN including a router. For example, the communication module 467 of the hub device 1812 communicates with the servers 1834 via a first communication link having the network connection 2366 (FIG. 23), where the network connection 2366 is between the hub device 1812 and the backend devices 1830 (e.g., servers 1834) through the router 1811 of the user's network 1810 (e.g., a LAN) and the network 1820 (e.g., a WAN).

The process 2500B, at block B2524, detects, by the hub device, a disruption in the first communication link, where the hub device is unable to communicate with the server via the first communication link. For example, the processor 469 of the hub device 1812 detects the disruption 2370 in the first communication link, where the hub device 1812 is unable to communicate with the servers 1834 via the first communication link having the network connection 2366. As discussed above, the communication disruption 2370 may be due to outages (e.g., failure) of the router 1811 and/or a connection/link between the router 1811 and the backend devices 1830.

The process 2500B, at block B2526, in response to detecting the disruption in the first communication link, reconfigures settings of the hub device to communicate, using the communication module, with the A/V recording and communication device and the server via a second communication link, the second communication link bypassing the router, the second communication link further including a connection with the server via a cellular communication network, an LPWAN communication network, and/or another type of communication network. For example, in response to detecting the disruption 2370 in the first communication link having the network connection 2366, the processor 469 of the hub device 1812 reconfigures settings of the hub device 1812 to communicate, using the communication module 467, with the A/V device 1802 and the servers 1834 via a second communication link having the network connections 2381 and 2382, where the network connection 2381 is between the A/V device 1802 and the hub device 1812, and the network connection 2382 is between the hub device 1812 and the backend devices 1830 (e.g., servers 1834) through the network 1820. The second communication link having the network connections 2381 and 2382 bypasses the router 1811. The network connection 2382 of the second communication link further includes a wireless cellular connection/link with the backend devices 1830 via a cellular communication network (e.g., a 4G LTE network or a 5G new radio network), a wireless connection/link with the servers 1834 via an LPWAN network (e.g., chirp spread spectrum (CSS) modulation technology (e.g., LoRaWAN), or Ultra Narrow Band modulation technology (e.g., Sigfox, Telensa, NB-IoT, etc.), or RingNet, or the like), and/or a connection/link with the servers 1834 via another type of communication network.

Figure 26:
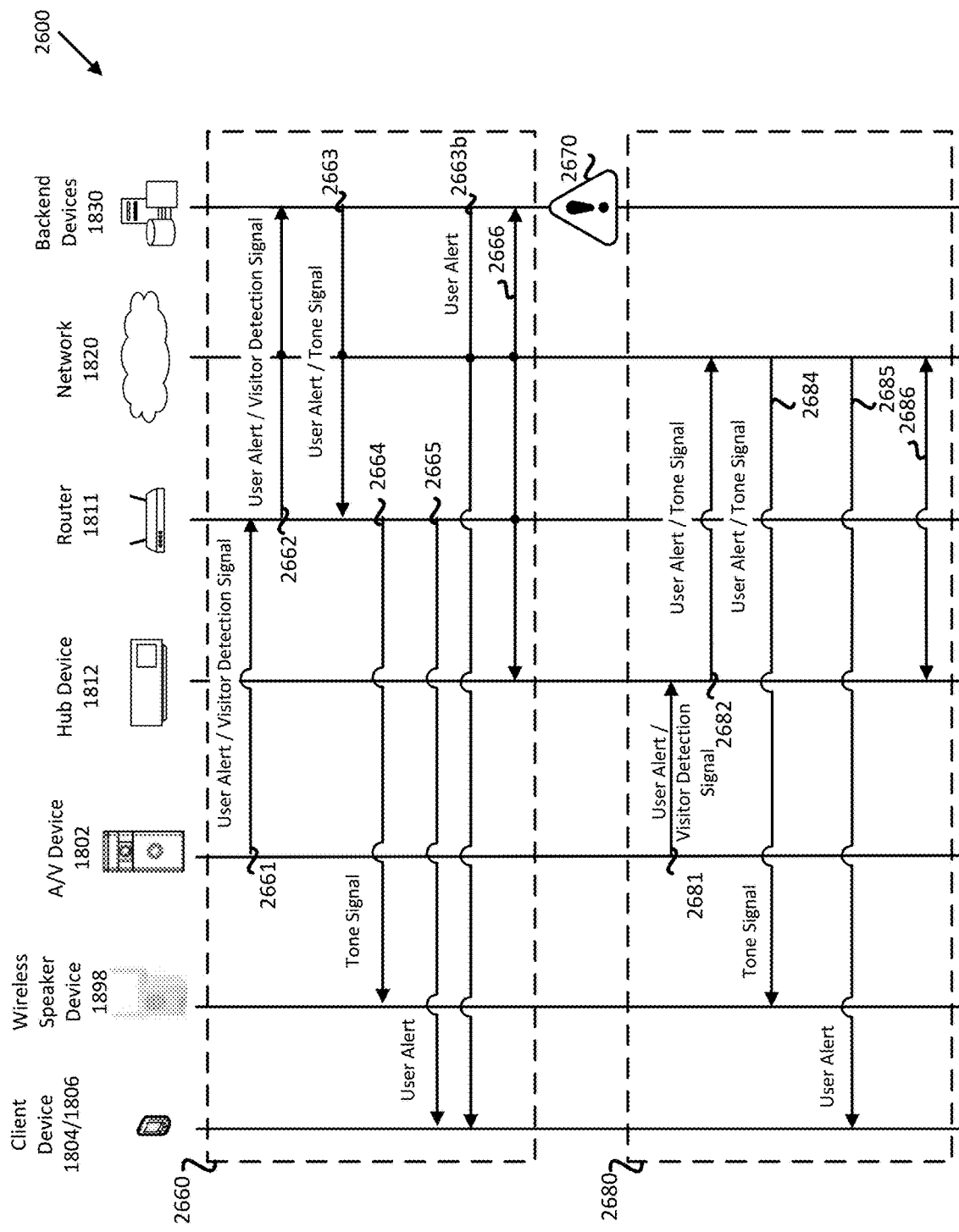
FIG. 26 is a functional block diagram illustrating another system for communicating in a network using different operation modes, according to various aspects of the present disclosure.

FIG. 26 illustrates a system 2600 for communicating in a network under different operation modes according to various aspects of the present disclosure. In FIG. 26, a normal operational mode 2660 is substantially similar to the normal operational mode 2360 described with respect to FIG. 23. Thus, the details of the normal operation mode 2660 are omitted for brevity.

In FIG. 26, a communication disruption 2670 may occur, for example, due to outages (e.g., failures) on one or more of the backend devices 1830 (e.g., the remote storage devices 1832, the servers 1834, and/or the APIs 1838). As a result, the A/V device 1802 is unable to communicate with the backend devices 1830 via a first communication link having network connections 2661 and 2662. For example, due to outages of one or more of the backend devices 1830, the A/V device 1802 is unable to send user alerts or visitor detection signals to the backend devices 1830, although the A/V device 1802 is able to communicate with the router 1811 of the user's network 1810 using the network connection 2661. The client devices 1804, 1806 are therefore unable to receive user alerts from the A/V device 1802. The wireless speaker device 1898 is also unable to receive the tone signal from the backend devices 1830. In addition, the hub device 1812 is unable to communicate with the backend devices 1830 via the network connection 2666 due to outages on one or more of the backend devices 1830. Thus, the communication disruption 2670 due to outages on one or more of the backend devices 1830 may greatly impact the utility of the A/V device 1802 and cause inconvenience to the users of the client devices 1804, 1806 and the wireless speaker device 1898.

According to embodiments of the present application, when the communication disruption 2670 occurs, the A/V device 1802 and the hub device 1812, among other devices, enter a hub-as-substitute server/backend operation mode 2680, in response to the detection of the communication disruption 2670 by at least one of the A/V device 1802 and the hub device 1812. Under the hub-as-substitute server/backend operation mode 2680, the A/V device 1802 may reconfigure its firmware/software and/or hardware settings to communicate with the hub device 1812 through a second communication link. For example, in response to detecting the communication disruption 2670, the A/V device 1802 may send the user alert/visitor detection signal, which would otherwise be sent to the router 1811 using the network connection 2661 during the normal operation mode 2660, to the hub device 1812 using a network connection 2681. In response to receiving the user alert/visitor detection signal from the A/V device 1802, or in response to detecting the communication disruption 2670 by itself, the hub device 1812 also reconfigures its firmware/software and/or hardware settings to send the user alert/visitor detection signal to the client devices 1804, 1806 through the network 1820. In one example embodiment, the hub device 1812 may comprise cellular capabilities, where the communication module 467 (FIG. 20) of the hub device 1812 may send the user alert/visitor detection signal to the client device 1804, 1806 using one or more cellular networks (e.g., 4G LTE or 5G NR networks) of the network 1820. In another example embodiment, the hub device 1812 may comprise LPWAN capabilities, where the communication module 467 (FIG. 20) of the hub device 1812 may send the user alert/visitor detection signal to the client device 1804, 1806 using one or more LPWAN networks (e.g., chirp spread spectrum (CSS) modulation technology (e.g., LoRaWAN), or Ultra Narrow Band modulation technology (e.g., Sigfox, Telensa, NB-IoT, etc.), or RingNet, or the like).

As shown in FIG. 26, the user alert/visitor detection signal may be transmitted from the hub device 1812 to the network 1820 using a network connection 2682, which may comprise a wireless cellular communication link, an LPWAN communication link, and/or another type of communication link. The network 1820 may comprise a wireless wide area network (WWAN), such as a cellular network for communicating with the hub device 1812 through wireless cellular communication links, an LPWAN network for communicating with the hub device 1812 through LPWAN communication links, and/or another type of communication network. In other example embodiments, the network 1820 may be any wireless network or any wired network, or a combination thereof, configured to operatively couple the above-mentioned modules, devices, and systems as shown in FIG. 18. In the present example embodiments, the network connections 2681 and 2682 form at least a part of a second communication link between the A/V device 1802 and the client device 1804/1806, where the network connection 2682 bypasses the router 1811 and the backend devices 1830.

Under the hub-as-substitute server/backend operation mode 2680, the hub device 1812 may reconfigure its firmware/software and/or hardware settings to perform functions that would otherwise be performed by the backend devices 1830 during the normal operation mode 2660. For example, the hub device 1812 may identify one or more client devices 1804, 1806 associated with the A/V device 1802. Also, the hub device 1812 may reconfigure settings of its communication module 467 to connect with the client devices 1804, 1806, through one or more wireless cellular networks of the network 1820 using wireless cellular communication links, through one or more LPWANs of the network 1820 using LPWAN communication links, and/or through one or more other types of communication links of the network 1820, to transmit user alerts from the A/V device 1802 to the client devices 1804, 1806.

In another example embodiment, under the normal operation mode 2660, the user alert/visitor detection signal from the A/V device 1802 may be sent to the router 1181 through the hub device 1802. In response to detecting the communication disruption 2670, the hub device 1812 may reconfigure its firmware/software and/or hardware settings to send the user alert/visitor detection signal to the client devices 1804, 1806 through the network 1820, bypassing the router 1811 and the backend devices 1830. In this case, the A/V device 1802 may keep communicating with the client devices 1804, 1806 and/or the wireless speaker device 1898 through the hub device 1802 during the communication disruption 2370 without being aware of the communication disruption 2370.

In FIG. 26, the hub device 1812 may send the user alert to the client devices 1804, 1806 using network connections 2682 and 2685 through the network 1820 (e.g., having a WWAN), where the network connections 2682 and 2685 bypass the router 1811 and the backend devices 1830. If the user answers the alert, two-way audio communication may then occur between the visitor and the user through the A/V device 1802 and the client device 1804, 1806. The user may view the visitor throughout the duration of the call, but the visitor cannot see the user (unless the A/V device 1802 includes a display, which it may in some embodiments). In FIG. 26, the network connection 2685 is illustrated as bypassing the hub device 1812, which may occur when the client device 1804/1806 is not connected to the hub device 1812 (e.g., when the user is not home). In some embodiments, however, the network connection 2685 may pass through the hub device 1812 when the client device 1804/1806 is connected to the hub device 1812 (e.g., when the user is home).

In one example embodiment, the A/V device 1802 may also send streaming video and streaming audio to the client device 1804/1806 via the hub device 1812, where the hub device 1812 may communicate with client device 1804/1806 using wireless cellular connections, LPWAN connections, and/or other types of connections. In another example embodiment, during the communication disruption 2670, upon receiving the user alert from the A/V device 1802, the hub device 1812 may identify the client devices 1804, 1806 associated with the A/V device 1802 on-site, and send the user alert to the client devices 1804, 1806 directly through the user's network 1810, without sending the user alert to the network 1820.

Under the hub-as-substitute server/backend operation mode 2680, the hub device 1812 may save the video images captured by the camera 314 of the A/V device 1802 (and the audio captured by the microphone 328). When the communication disruption 2670 is resolved (e.g., the backend devices 1830 become available again), the hub device 1812 may upload the saved video images and/or audio to the cloud and record on the remote storage device 1832, for example. In some embodiments, the video images and/or audio may be recorded on the hub device 1812 even if the user chooses to ignore the alert sent to the client devices 1804, 1806.

According to one or more aspects of the present embodiments, the hub device 1812 may perform the functions that would otherwise be performed by the API 540 and the wireless speaker service 542 of the APIs 1838 during the normal operational mode 2660. Under the hub-as-substitute server/backend operation mode 2680, the hub device 1812 may identify the wireless speaker device 1898 associated with the A/V device 1802. Also, the hub device 1812 may reconfigure hardware and/or software settings of its communication module 467 to connect with the wireless speaker device 1898, through one or more wireless cellular networks of the network 1820 using one or more wireless cellular communication links, one or more LPWAN communication links, or one or more other type(s) of communication links, to send a tone signal from the A/V device 1802 to the wireless speaker device 1898.

In FIG. 26, the hub device 1812 may send the tone signal to the wireless speaker device 1898 using network connections 2682 and 2684 through the network 1820 (e.g., having a WWAN), where the network connections 2682 and 2684 bypass the router 1811 and the backend devices 1830. Upon receiving the tone signal, the wireless speaker device 1898 may emit a tone to alert any person(s) within earshot of the wireless speaker device 1898 that a visitor has been detected at the A/V device 1802.

In another example embodiment, during the communication disruption 2670, upon receiving the visitor detection signal from the A/V device 1802, the hub device 1812 may identify the wireless speaker device 1898 associated with the A/V device 1802 and generate the tone signal on-site, and send the tone signal to the wireless speaker device 1898 directly through the user's network 1810, without sending the tone signal through the network 1820.

In FIG. 26, under the hub-as-substitute server operation mode 2380, the hub device 1812 may be communicatively coupled to the network 1820 (e.g., having a WWAN) using a network connection 2686 bypassing the router 1811 and/or the failed backend devices 1830. The hub device 1812 may connect other devices (e.g., the sensors 1814 and the automation devices 1816 in FIG. 18) in the user's network 1810 to the client devices 1804, 1806 using the network connection 2686, which may comprise a wireless cellular communication link, an LPWAN communication link, and/or another type of communication link.

The abilities of the A/V device 1802 to detect the communication disruption 2670 and reconfigure its settings to communicate with the hub device 1812 during the communication disruption 2670, and the abilities of hub device 1812 to reconfigure its settings to bypass the router 1811 and the failed backend devices 1830 during the communication disruption 2670 to communicate with the client devices 1804, 1806 and the wireless speaker devices 1898 using wireless cellular communication links, LPWAN communication links, and/or other types of communication links, substantially eliminate service disruptions due to outages of the backend devices 1830, thereby improving service reliability and user experience of the A/V devices.

Figure 27A:
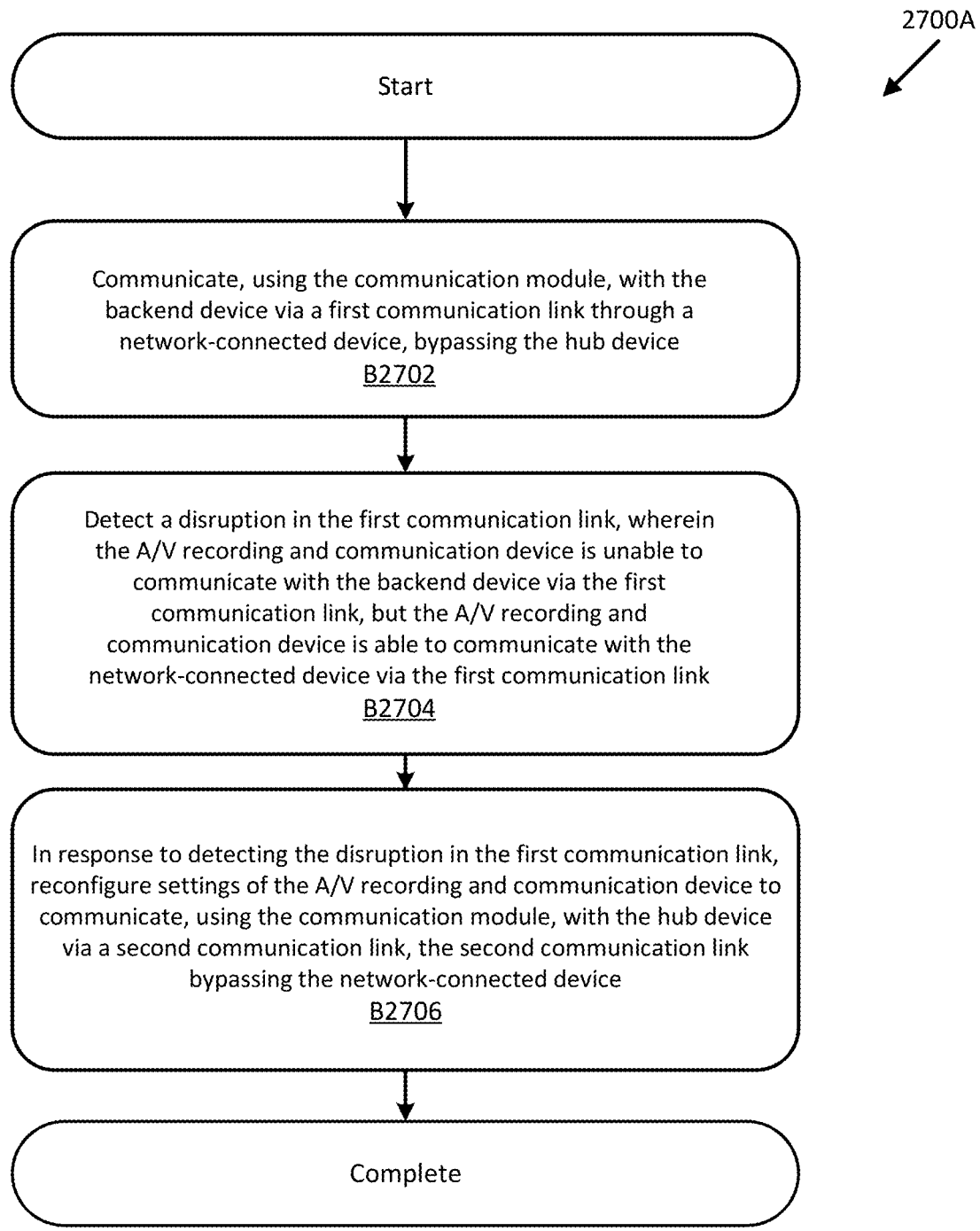
FIGS. 27A and 27B are flowcharts illustrating further example processes for transmitting a user alert and/or a visitor detection signal, according to various aspects of the present disclosure.

FIG. 27A is a flowchart illustrating an example process 2700A for transmitting a user alert and/or a visitor detection signal using a hub device to one or more client devices and/or one or more wireless speaker devices associated with an A/V device, when a communication disruption occurs due to outages of one or more backend devices, according to various aspects of the present disclosure.

The process 2700A, at block B2702, communicates, using the communication module, with the backend device via a first communication link through a network-connected device, bypassing the hub device. For example, the communication module 438 of the A/V device 1802 communicates with the backend devices 1830 (e.g., the servers 1834) via a first communication link through a network-connected device (e.g., the router 1811), where the first communication link may include the network connections 2661 and 2662 (FIG. 26), and bypass the hub device 1812.

The process 2700A, at block B2704, detects a disruption in the first communication link, where the A/V recording and communication device is unable to communicate with the backend device via the first communication link, but the A/V recording and communication device is able to communicate with the network-connected device via the first communication link. For example, the processor 440 of the A/V device 1802 detects the communication disruption 2670 in the first communication link, where the A/V device 1802 is unable to communicate with the backend devices 1830 via the first communication link, but the A/V device 1802 is able to communicate with the network-connected device (e.g., the router 1811) via the network connection 2661. As discussed above, the communication disruption 2670 may be due to outages of one or more of the backend devices 1830.

The process 2700A, at block B2706, in response to detecting the disruption in the first communication link, reconfigures settings of the A/V recording and communication device to communicate, using the communication module, with the hub device via a second communication link, the second communication link bypassing the network-connected device. For example, in response to detecting the disruption 2670 in the first communication link, the processor 440 of the A/V device 1802 reconfigures settings of the A/V device 1802 to communicate, using the communication module 438, with the hub device 1812 via a second communication link having the network connections 2681 and 2682, bypassing the network-connected device (e.g., the router 1811).

Figure 27B:
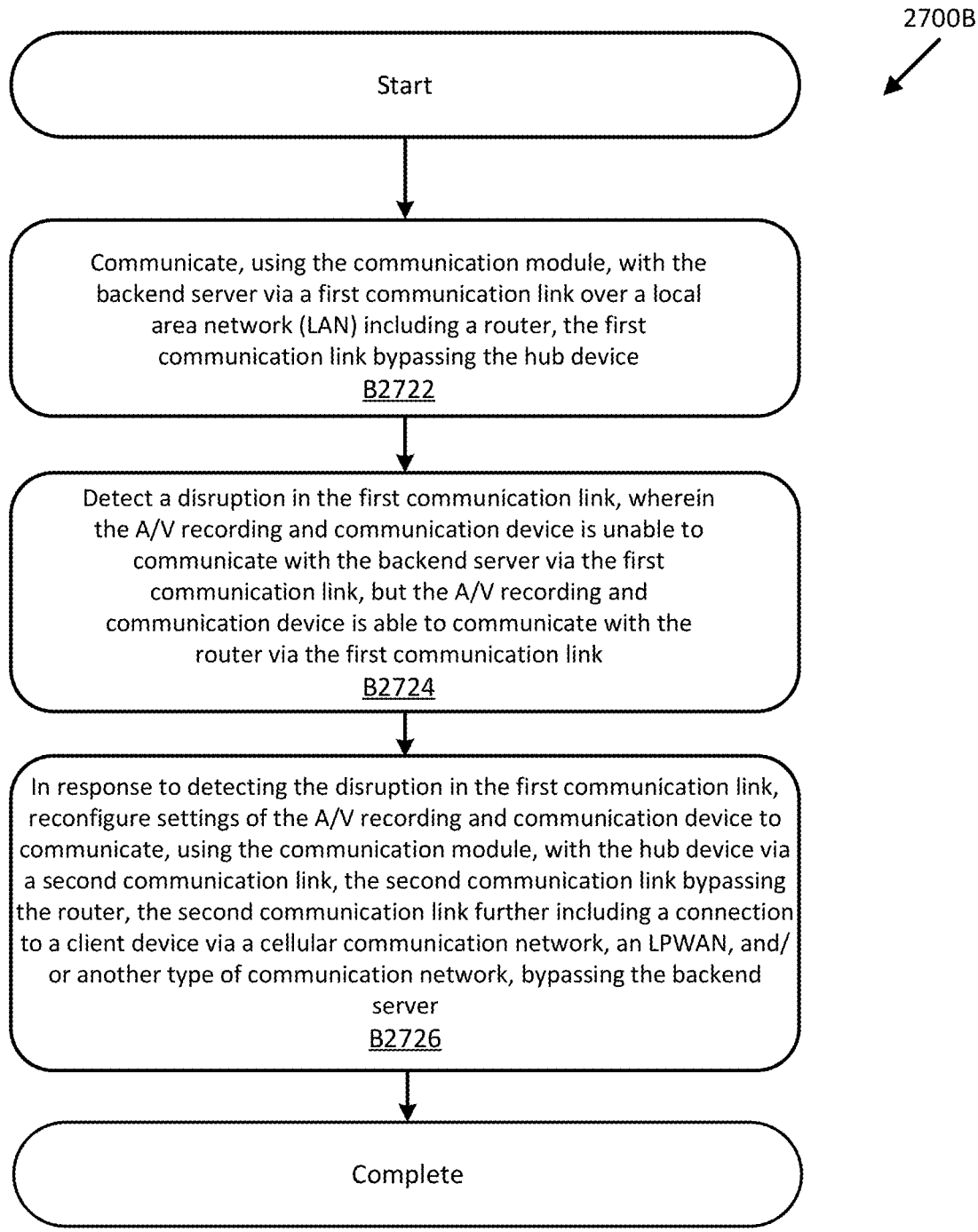

FIG. 27B is a flowchart illustrating an example process 2700B for transmitting a user alert and/or a visitor detection signal using a hub device to one or more client devices and/or one or more wireless speaker devices associated with an A/V device, when a communication disruption occurs due to outages of one or more backend devices, according to various aspects of the present disclosure.

The process 2700B, at block B2722, communicates, using the communication module, with the server via a first communication link over a LAN including a router, the first communication link bypassing the hub device. For example, the communication module 438 of the A/V device 1802 communicates with the servers 1834 via a first communication link having the network connections 2661 and 2662 (FIG. 26), where the network connection 2661 is between the A/V device 1802 and the router 1811 of the user's network 1810 (e.g., a LAN), and the network connection 2662 is between the router 1811 and the backend devices 1830 (e.g., the servers 1834) through the network 1820. The first communication link bypasses the hub device 1812.

The process 2700B, at block B2724, detects, by the A/V device, a disruption in the first communication link, where the A/V recording and communication device is unable to communicate with the server via the first communication link, but the A/V recording and communication device is able to communicate with the router via the first communication link. For example, the processor 440 of the A/V device 1802 detects the disruption 2670 in the first communication link, where the A/V device 1802 is unable to communicate with the servers 1834 via the first communication link, but is able to communicate with the router 1811 via the network connection 2661 of the first communication link. As discussed above, the communication disruption 2670 may be due to outages of one or more of the backend devices 1830.

The process 2700B, at block B2726, in response to detecting the disruption in the first communication link, reconfigures settings of the A/V recording and communication device to communicate, using the communication module, with the hub device via a second communication link, the second communication link bypassing the router, the second communication link further including a connection to a client device via a cellular communication network, an LPWAN, and/or another type of network, bypassing the server. For example, in response to detecting the disruption 2670 in the first communication link, the processor 440 of the A/V device 1802 reconfigures settings of the A/V device 1802 to communicate, using the communication module 438, with the hub device 1812 via a second communication link having the network connections 2681 and 2682, where the network connection 2681 is between the A/V device 1802 and the hub device 1812, and the network connection 2682 is between the hub device 1812 and the network 1820. The second communication link having the network connections 2681 and 2682 bypasses the router 1811. The second communication link includes a connection from the hub device 1812 to the client devices 1804, 1806 via a cellular communication network, an LPWAN, and/or another type of network, of the network 1820, through the network connections 2682 and 2685, bypassing the backend devices 1830 (e.g., servers 1834).

Figure 28A:
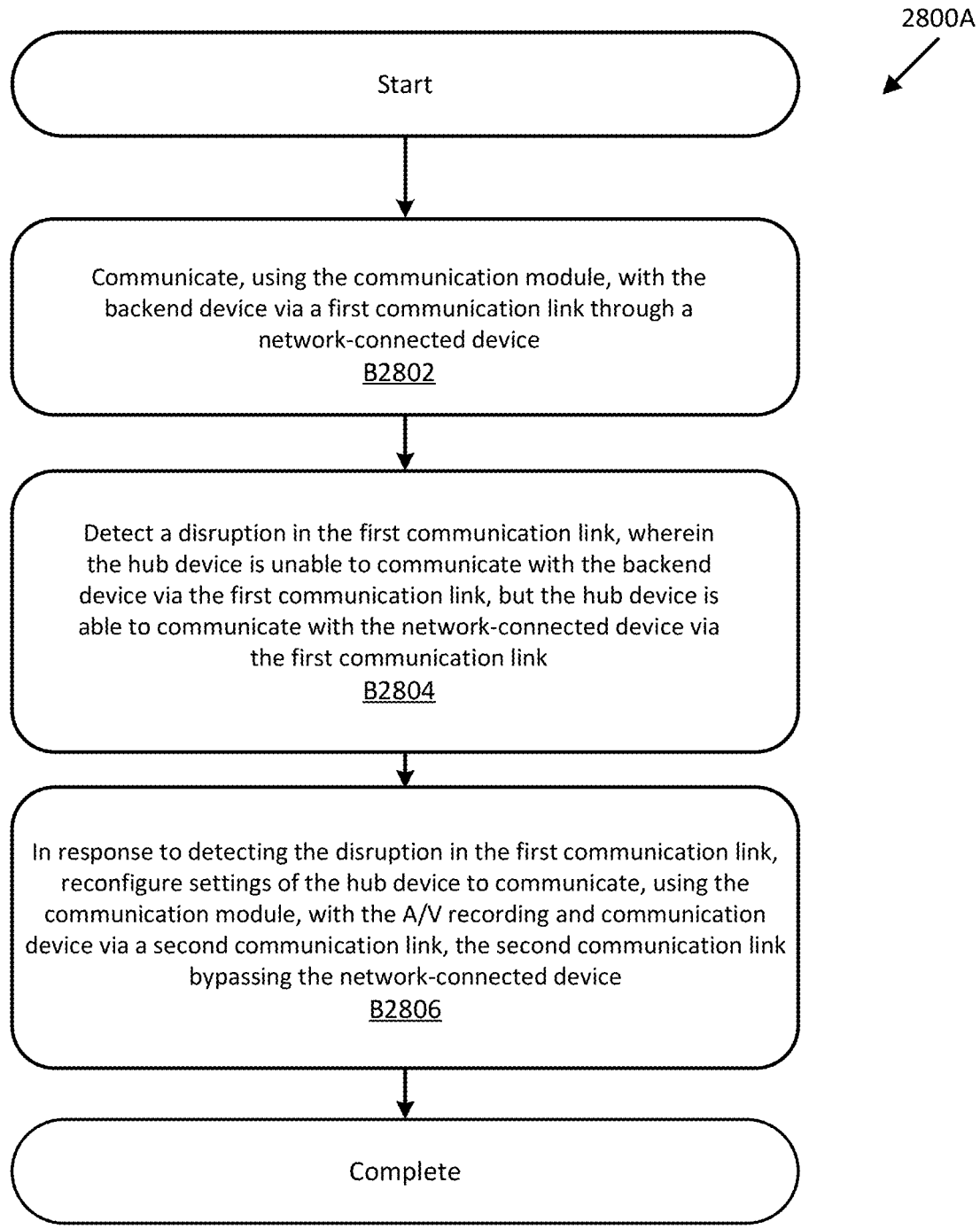
FIGS. 28A and 28B are flowcharts illustrating further example processes for transmitting a user alert and/or a visitor detection signal, according to various aspects of the present disclosure.

FIG. 28A is a flowchart illustrating an example process 2800A for transmitting a user alert and/or a visitor detection signal using a hub device to one or more client devices and/or one or more wireless speaker devices associated with an A/V device, when a communication disruption occurs due to outages of one or more backend devices, according to various aspects of the present disclosure.

The process 2800A, at block B2802, communicates, using the communication module of the hub device, with the backend device via a first communication link through a network-connected device. For example, the communication module 467 of the hub device 1812 communicates with the backend devices 1830 (e.g., the servers 1834) via a first communication link having the network connection 2666 (FIG. 26). The network connection 2666 between the hub device 1812 and the backend devices 1830 is through a network-connected device (e.g., the router 1811) and the network 1820.

The process 2800A, at block B2804, detects, by the hub device, a disruption in the first communication link, where the hub device is unable to communicate with the backend device via the first communication link, but the hub device is able to communicate with the network-connected device via the first communication link. For example, the processor 469 of the hub device 1812 detects the disruption 2670 in the first communication link, where the hub device 1812 is unable to communicate with the backend devices 1830 via the first communication link, but is able to communicate with the network-connected device (e.g., the router 1811) via the first communication link having the network connection 2666. As discussed above, the communication disruption 2670 may be due to outages of one or more of the backend devices 1830.

The process 2800A, at block B2806, in response to detecting the disruption in the first communication link, reconfigures settings of the hub device to communicate, using the communication module, with the A/V recording and communication device via a second communication link, the second communication link bypassing the network-connected device. For example, in response to detecting the disruption 2670 in the first communication link having the network connection 2666, the processor 469 of the hub device 1812 reconfigures settings of the hub device 1812 to communicate, using the communication module 467, with the A/V device 1802 via a second communication link having the network connections 2681 and 2682, where the network connection 2681 is between the A/V device 1802 and the hub device 1812, and the network connection 2682 is between the hub device 1812 and the network 1820 bypassing the network-connected device (e.g., router 1811).

Figure 28B:
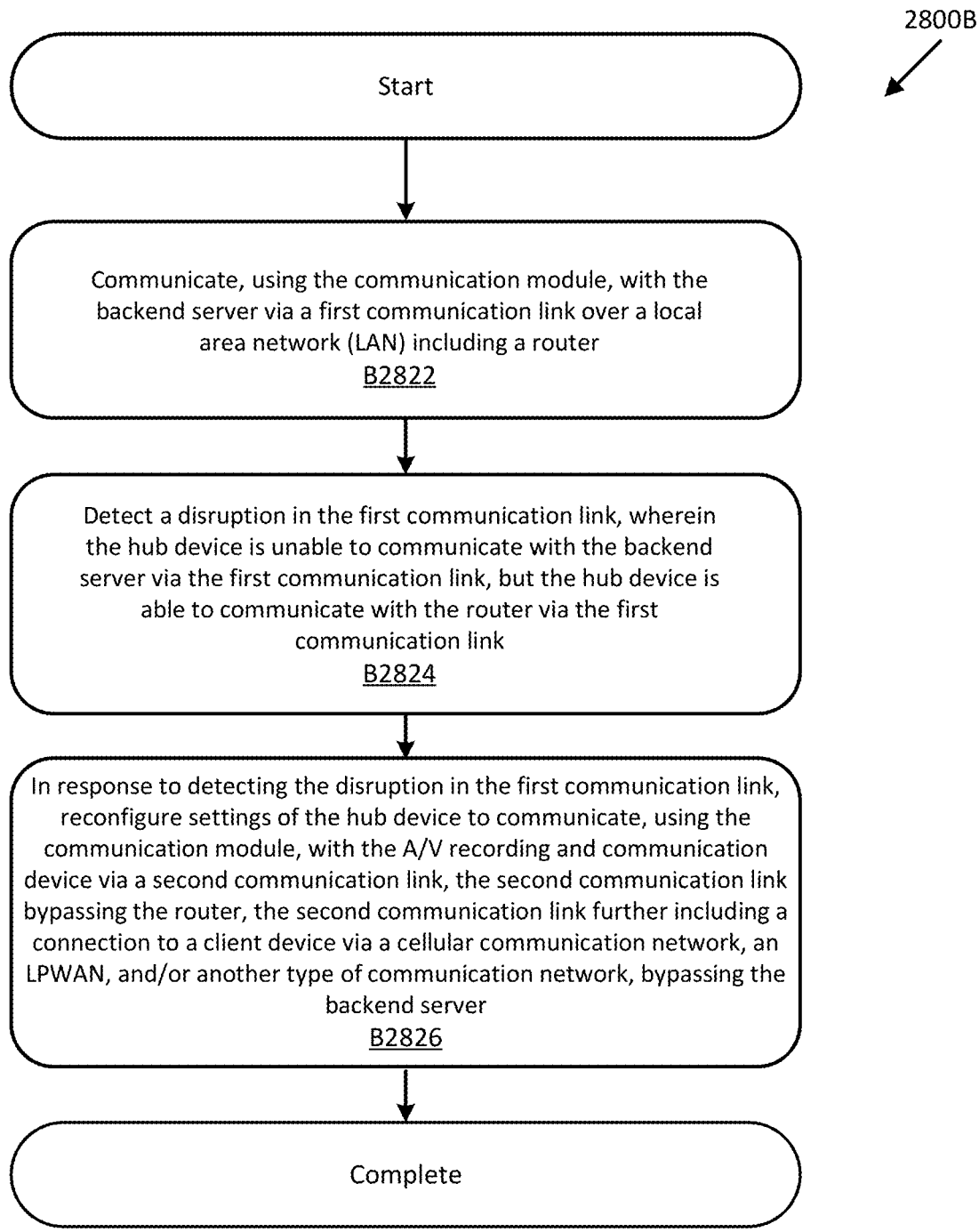

FIG. 28B is a flowchart illustrating an example process 2800B for transmitting a user alert and/or a visitor detection signal using a hub device to one or more client devices and/or one or more wireless speaker devices associated with an A/V device, when a communication disruption occurs due to outages of one or more backend devices, according to various aspects of the present disclosure.

The process 2800B, at block B2822, communicates, using the communication module, with the server via a first communication link over a LAN including a router. For example, the communication module 467 of the hub device 1812 communicates with the servers 1834 via a first communication link having the network connection 2666 (FIG. 26), where the network connection 2666 is between the hub device 1812 and the backend devices 1830 (e.g., the servers 1834) through the router 1811 of the user's network 1810 (e.g., a LAN) and the network 1820 (e.g., a WAN).

The process 2800B, at block B2824, detects a disruption in the first communication link, where the hub device is unable to communicate with the server via the first communication link, but the hub device is able to communicate with the router via the first communication link. For example, the processor 469 of the hub device 1812 detects the disruption 2670 in the first communication link, where the hub device 1812 is unable to communicate with the servers 1834 via the first communication link, but is able to communicate with the router 1811 via the network connection 2666 of the first communication link. As discussed above, the communication disruption 2670 may be due to outages of one or more of the backend devices 1830.

The process 2800B, at block B2826, in response to detecting the disruption in the first communication link, reconfigures settings of the hub device to communicate, using the communication module, with the A/V recording and communication device via a second communication link, the second communication link bypassing the router, the second communication link further including a connection to a client device via a cellular communication network, an LPWAN, or another type of communication network, bypassing the server. For example, in response to detecting the disruption 2670 in the first communication link having the network connection 2666, the processor 469 of the hub device 1812 reconfigures settings of the hub device 1812 to communicate, using the communication module 467, with the A/V device 1802 via a second communication link having the network connections 2681 and 2682, where the network connection 2681 is between the A/V device 1802 and the hub device 1812, and the network connection 2682 is between the hub device 1812 and the network 1820. The second communication link having the network connections 2681 and 2682 bypasses the router 1811. The second communication link includes a connection from the hub device 1812 to the client devices 1804, 1806 via a cellular communication network, an LPWAN, and/or another type of communication network, of the network 1820, through the network connections 2682 and 2685, bypassing the backend devices 1830.

Figure 29:
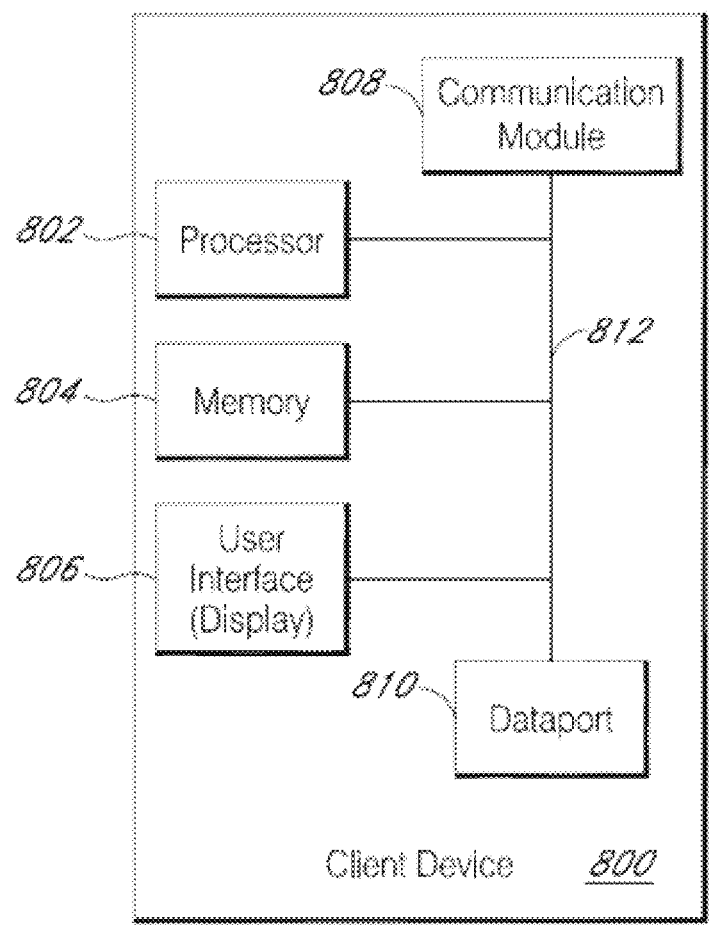
FIG. 29 is a functional block diagram of a client device on which the present embodiments may be implemented, according to various aspects of the present disclosure.

FIG. 29 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 29, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/POD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 30:
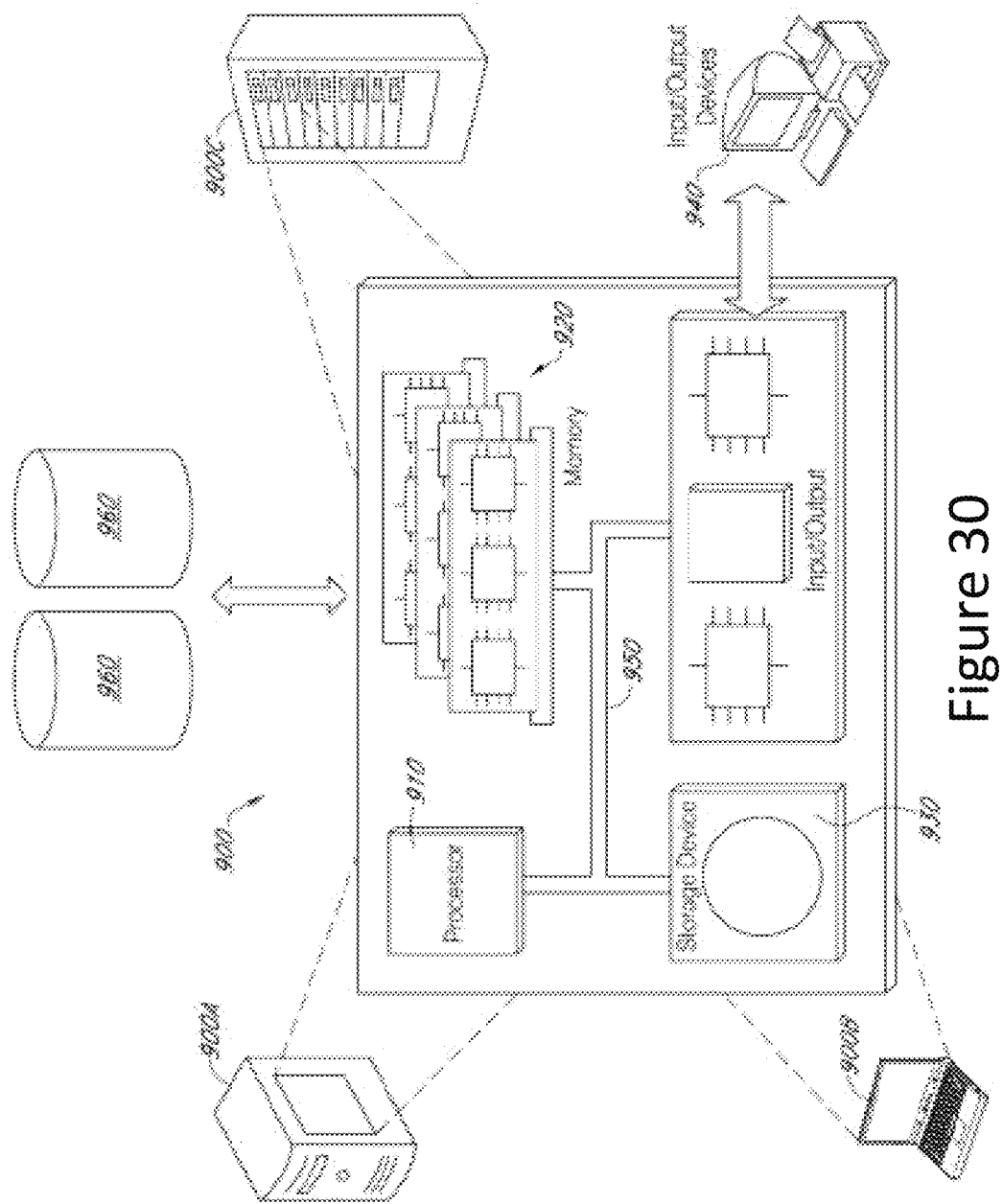
FIG. 30 is a functional block diagram of a general-purpose computing system on which the present embodiments may be implemented, according to various aspects of the present disclosure.

FIG. 30 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

EXAMPLE CLAUSES

In a first aspect, an audio/video (A/V) recording and communication device configured for communication with a hub device and a server is provided, the A/V recording and communication device comprising: a communication module; one or more processors; a non-transitory machine-readable memory storing a program, the program executable by at least one of the one or more processors, the program comprising sets of instructions for: communicating, using the communication module, with the server via a first communication link over a local area network (LAN) including a router, the first communication link bypassing the hub device; detecting a disruption in the first communication link, wherein the A/V recording and communication device is unable to communicate with the server via the first communication link; and in response to detecting the disruption in the first communication link, reconfiguring settings of the A/V recording and communication device to communicate, using the communication module, with the server via a second communication link through the hub device, the second communication link bypassing the router, the second communication link further including a connection with the server via one of a cellular communication network and a low-power wide-area network (LPWAN).

In an embodiment of the first aspect, the hub device is a component of a security system.

In another embodiment of the first aspect, the hub device is a home automation hub device.

In another embodiment of the first aspect, the hub device is a home automation hub device of a security system.

In another embodiment of the first aspect, the cellular communication network is a long-term evolution (LTE) network or a new radio (NR) network.

In another embodiment of the first aspect, the LPWAN comprises a chirp spread spectrum (CSS) modulation technology or an Ultra Narrow Band modulation technology.

In another embodiment of the first aspect, the A/V recording and communication device includes at least one of a video doorbell, an outdoor security camera, an indoor security camera, a floodlight security camera, and a spotlight security camera.

In another embodiment of the first aspect, the server is configured to transmit to a client device a user alert generated by the A/V recording and communication device.

In another embodiment of the first aspect, the user alert includes at least one of: image data captured by a camera of the A/V recording and communication device; audio data captured by a microphone of the A/V recording and communication device; and motion data generated by a motion sensor of the A/V recording and communication device.

In another embodiment of the first aspect, the backend device is at least one of a server, an application programming interface, and a storage device.

In a second aspect, a method for an audio/video (A/V) recording and communication device configured for communication with a hub device and a server is provided, the A/V recording and communication device including a processor, and a communication module, the method comprising: communicating, using the communication module, with the server via a first communication link over a local area network (LAN) including a router, the first communication link bypassing the hub device; detecting a disruption in the first communication link, wherein the A/V recording and communication device is unable to communicate with the server via the first communication link; and in response to detecting the disruption in the first communication link, reconfiguring settings of the A/V recording and communication device to communicate, using the communication module, with the server via a second communication link through the hub device, the second communication link bypassing the router.

In an embodiment of the second aspect, the hub device is a component of a security system.

In another embodiment of the second aspect, the hub device is a home automation hub device.

In another embodiment of the second aspect, the hub device is a home automation hub device of a security system.

In another embodiment of the second aspect, the second communication link further includes a connection with the server via a cellular communication network.

In another embodiment of the second aspect, the cellular communication network is a long-term evolution (LTE) network or a new radio (NR) network.

In another embodiment of the second aspect, the A/V recording and communication device includes at least one of a video doorbell, an outdoor security camera, an indoor security camera, a floodlight security camera, and a spotlight security camera.

In another embodiment of the second aspect, the server is configured to transmit to a client device a user alert generated by the A/V recording and communication device.

In another embodiment of the second aspect, the user alert includes at least one of: image data captured by a camera of the A/V recording and communication device; audio data captured by a microphone of the A/V recording and communication device; and motion data generated by a motion sensor of the A/V recording and communication device.

In another embodiment of the second aspect, the backend device is at least one of a server, an application programming interface, and a storage device.

In a third aspect, an audio/video (A/V) recording and communication device configured for communication with a hub device and a backend device is provided, the A/V recording and communication device comprising: a communication module; one or more processors; a non-transitory machine-readable memory storing a program, the program executable by at least one of the one or more processors, the program comprising sets of instructions for: communicating, using the communication module, with the backend device via a first communication link through a network-connected device, bypassing the hub device; detecting a disruption in the first communication link, wherein the A/V recording and communication device is unable to communicate with the backend device via the first communication link; and in response to detecting the disruption in the first communication link, reconfiguring settings of the A/V recording and communication device to communicate, using the communication module, with the backend device via a second communication link through the hub device.

In an embodiment of the third aspect, the second communication link bypasses the network-connected device.

In another embodiment of the third aspect, the second communication link further comprises a connection with the backend device via a cellular communication network.

In another embodiment of the third aspect, the cellular communication network is a long-term evolution (LTE) network or a new radio (NR) network.

In another embodiment of the third aspect, the backend device is a server.

In another embodiment of the third aspect, the hub device is a component of a security system.

In another embodiment of the third aspect, the hub device is a home automation hub device.

In another embodiment of the third aspect, the hub device is a home automation hub device of a security system.

In another embodiment of the third aspect, the A/V recording and communication device includes at least one of a video doorbell, an outdoor security camera, an indoor security camera, a floodlight security camera, and a spotlight security camera.

In another embodiment of the third aspect, the server is configured to transmit to a client device a user alert generated by the A/V recording and communication device.

In another embodiment of the third aspect, the user alert includes at least one of: image data captured by a camera of the A/V recording and communication device; audio data captured by a microphone of the A/V recording and communication device; and motion data generated by a motion sensor of the A/V recording and communication device.

In another embodiment of the third aspect, the backend device is at least one of a server, an application programming interface, and a storage device.

In a fourth aspect, a method for an audio/video (A/V) recording and communication device configured for communication with a hub device and a server is provided, the A/V recording and communication device including a processor, and a communication module, the method comprising: communicating with the backend device via a first communication link through a network-connected device, bypassing the hub device; detecting a disruption in the first communication link, wherein the A/V recording and communication device is unable to communicate with the backend device via the first communication link; and in response to detecting the disruption in the first communication link, reconfiguring settings of the A/V recording and communication device to communicate with the backend device via a second communication link through the hub device.

In an embodiment of the fourth aspect, the second communication link bypasses the network-connected device.

In another embodiment of the fourth aspect, the second communication link further comprises a connection with the backend device via a cellular communication network.

In another embodiment of the fourth aspect, the cellular communication network is a long-term evolution (LTE) network or a new radio (NR) network.

In another embodiment of the fourth aspect, the backend device is a server.

In another embodiment of the fourth aspect, the hub device is a component of a security system.

In another embodiment of the fourth aspect, the hub device is a home automation hub device.

In another embodiment of the fourth aspect, the hub device is a home automation hub device of a security system.

In another embodiment of the fourth aspect, the A/V recording and communication device includes at least one of a video doorbell, an outdoor security camera, an indoor security camera, a floodlight security camera, and a spotlight security camera.

In another embodiment of the fourth aspect, the server is configured to transmit to a client device a user alert generated by the A/V recording and communication device.

In another embodiment of the fourth aspect, the user alert includes at least one of: image data captured by a camera of the A/V recording and communication device; audio data captured by a microphone of the A/V recording and communication device; and motion data generated by a motion sensor of the A/V recording and communication device.

In another embodiment of the fourth aspect, the backend device is at least one of a server, an application programming interface, and a storage device.

In a fifth aspect, an audio/video (A/V) recording and communication device configured for communication with a hub device and a server is provided, the A/V recording and communication device comprising: a communication module; one or more processors; a non-transitory machine-readable memory storing a program, the program executable by at least one of the one or more processors, the program comprising sets of instructions for: communicating, using the communication module, with the server via a first communication link over a local area network (LAN) including a router, the first communication link bypassing the hub device; detecting a disruption in the first communication link, wherein the A/V recording and communication device is unable to communicate with the server via the first communication link, but the A/V recording and communication device is able to communicate with the router via the first communication link; and in response to detecting the disruption in the first communication link, reconfiguring settings of the A/V recording and communication device to communicate, using the communication module, with the hub device via a second communication link, the second communication link bypassing the router, the second communication link further including a connection to a client device via a cellular communication network, bypassing the server.

In an embodiment of the fifth aspect, the cellular communication network is a long-term evolution (LTE) network or a new radio (NR) network.

In another embodiment of the fifth aspect, the hub device is a component of a security system.

In another embodiment of the fifth aspect, the hub device is a home automation hub device.

In another embodiment of the fifth aspect, the hub device is a home automation hub device of a security system.

In another embodiment of the fifth aspect, the A/V recording and communication device includes at least one of a video doorbell, an outdoor security camera, an indoor security camera, a floodlight security camera, and a spotlight security camera.

In another embodiment of the fifth aspect, the server is configured to transmit to a client device a user alert generated by the A/V recording and communication device.

In another embodiment of the fifth aspect, the user alert includes at least one of: image data captured by a camera of the A/V recording and communication device; audio data captured by a microphone of the A/V recording and communication device; and motion data generated by a motion sensor of the A/V recording and communication device.

In another embodiment of the fifth aspect, the backend device is at least one of a server, an application programming interface, and a storage device.

In a sixth aspect, a method for an audio/video (A/V) recording and communication device configured for communication with a hub device and a server is provided, the A/V recording and communication device including a processor, and a communication module, the method comprising: communicating, using the communication module, with the server via a first communication link including a router, the first communication link bypassing the hub device; detecting a disruption in the first communication link, wherein the A/V recording and communication device is unable to communicate with the server via the first communication link, but the A/V recording and communication device is able to communicate with the router via the first communication link; and in response to detecting the disruption in the first communication link, reconfiguring settings of the A/V recording and communication device to communicate, using the communication module, with the hub device via a second communication link, the second communication link bypassing the router, the second communication link further including a connection to a client device via a cellular communication network, bypassing the server.

In an embodiment of the sixth aspect, the cellular communication network is a long-term evolution (LTE) network or a new radio (NR) network.

In another embodiment of the sixth aspect, the hub device is a component of a security system.

In another embodiment of the sixth aspect, the hub device is a home automation hub device.

In another embodiment of the sixth aspect, the hub device is a home automation hub device of a security system.

In another embodiment of the sixth aspect, the A/V recording and communication device includes at least one of a video doorbell, an outdoor security camera, an indoor security camera, a floodlight security camera, and a spotlight security camera.

In another embodiment of the sixth aspect, the server is configured to transmit to a client device a user alert generated by the A/V recording and communication device.

In another embodiment of the sixth aspect, the user alert includes at least one of: image data captured by a camera of the A/V recording and communication device; audio data captured by a microphone of the A/V recording and communication device; and motion data generated by a motion sensor of the A/V recording and communication device.

In another embodiment of the sixth aspect, the backend device is at least one of a server, an application programming interface, and a storage device.

In a seventh aspect, an audio/video (A/V) recording and communication device configured for communication with a hub device and a backend device is provided, the A/V recording and communication device comprising: a communication module; one or more processors; a non-transitory machine-readable memory storing a program, the program executable by at least one of the one or more processors, the program comprising sets of instructions for: communicating, using the communication module, with the backend device via a first communication link through a network-connected device, bypassing the hub device; detecting a disruption in the first communication link, wherein the A/V recording and communication device is unable to communicate with the backend device via the first communication link, but the A/V recording and communication device is able to communicate with the network-connected device via the first communication link; and in response to detecting the disruption in the first communication link, reconfiguring settings of the A/V recording and communication device to communicate, using the communication module, with the hub device via a second communication link, the second communication link bypassing the network-connected device.

In an embodiment of the seventh aspect, the second communication link further comprises a connection to a client device via a cellular communication network, bypassing the backend device.

In another embodiment of the seventh aspect, the cellular communication network is a long-term evolution (LTE) network or a new radio (NR) network.

In another embodiment of the seventh aspect, the backend device is a server.

In another embodiment of the seventh aspect, the hub device is a component of a security system.

In another embodiment of the seventh aspect, the hub device is a home automation hub device.

In another embodiment of the seventh aspect, the hub device is a home automation hub device of a security system.

In another embodiment of the seventh aspect, the A/V recording and communication device includes at least one of a video doorbell, an outdoor security camera, an indoor security camera, a floodlight security camera, and a spotlight security camera.

In another embodiment of the seventh aspect, the server is configured to transmit to a client device a user alert generated by the A/V recording and communication device.

In another embodiment of the seventh aspect, the user alert includes at least one of: image data captured by a camera of the A/V recording and communication device;

audio data captured by a microphone of the A/V recording and communication device; and motion data generated by a motion sensor of the A/V recording and communication device.

In another embodiment of the seventh aspect, the backend device is at least one of a server, an application programming interface, and a storage device.

In an eighth aspect, a method for an audio/video (A/V) recording and communication device configured for communication with a hub device and a server is provided, the A/V recording and communication device including a processor, and a communication module, the method comprising: communicating, using the communication module, with the backend device via a first communication link through a network-connected device, bypassing the hub device; detecting a disruption in the first communication link, wherein the A/V recording and communication device is unable to communicate with the backend device via the first communication link; and in response to detecting the disruption in the first communication link, reconfiguring settings of the A/V recording and communication device to communicate, using the communication module, with the hub device via a second communication link, the second communication link bypassing the network-connected device.

In an embodiment of the eighth aspect, the second communication link further comprises a connection to a client device via a cellular communication network, bypassing the backend device.

In another embodiment of the eighth aspect, the cellular communication network is a long-term evolution (LTE) network or a new radio (NR) network.

In another embodiment of the eighth aspect, the backend device is a server.

In another embodiment of the eighth aspect, the hub device is a component of a security system.

In another embodiment of the eighth aspect, the hub device is a home automation hub device.

In another embodiment of the eighth aspect, the hub device is a home automation hub device of a security system.

In another embodiment of the eighth aspect, the A/V recording and communication device includes at least one of a video doorbell, an outdoor security camera, an indoor security camera, a floodlight security camera, and a spotlight security camera.

In another embodiment of the eighth aspect, the server is configured to transmit to a client device a user alert generated by the A/V recording and communication device.

In another embodiment of the eighth aspect, the user alert includes at least one of: image data captured by a camera of the A/V recording and communication device; audio data captured by a microphone of the A/V recording and communication device; and motion data generated by a motion sensor of the A/V recording and communication device.

In another embodiment of the eighth aspect, the backend device is at least one of a server, an application programming interface, and a storage device.

In a ninth aspect, a hub device configured for communication with an audio/video (A/V) recording and communication device and a server is provided, the hub device comprising: a communication module; one or more processors; a non-transitory machine-readable memory storing a program, the program executable by at least one of the one or more processors, the program comprising sets of instructions for: communicating, using the communication module, with the server via a first communication link over a local area network (LAN) including a router; detecting a disruption in the first communication link, wherein the hub device is unable to communicate with the server via the first communication link; and in response to detecting the disruption in the first communication link, reconfiguring settings of the hub device to communicate, using the communication module, with the A/V recording and communication device and the server via a second communication link, the second communication link bypassing the router, the second communication link further including a connection with the server via one of a cellular communication network and a low-power wide-area network (LPWAN).

In an embodiment of the ninth aspect, the disruption in the first communication link is due to a failure of the router.

In another embodiment of the ninth aspect, the disruption in the first communication link is due to a service failure of an internet service provider (ISP).

In another embodiment of the ninth aspect, when there is no disruption in the first communication link, the A/V recording and communication device communicates with the server via a third communication link over the LAN including the router, the third communication link bypassing the hub device.

In another embodiment of the ninth aspect, the cellular communication network is a long-term evolution (LTE) network or a new radio (NR) network.

In another embodiment of the ninth aspect, the LPWAN comprises a chirp spread spectrum (CSS) modulation technology or an Ultra Narrow Band modulation technology.

In another embodiment of the ninth aspect, the hub device is a component of a security system.

In another embodiment of the ninth aspect, the hub device is a home automation hub device.

In another embodiment of the ninth aspect, the hub device is a home automation hub device of a security system.

In a tenth aspect, a method for a hub device configured for communication with an audio/video (A/V) recording and communication device and a server is provided, the hub device including a processor, and a communication module, the method comprising: communicating, using the communication module, with the server via a first communication link over a local area network (LAN) including a router; detecting a disruption in the first communication link, wherein the hub device is unable to communicate with the server via the first communication link; and in response to detecting the disruption in the first communication link, reconfiguring settings of the hub device to communicate, using the communication module, with the A/V recording and communication device and the server via a second communication link including a connection with the server via a cellular communication network.

In an embodiment of the tenth aspect, the disruption in the first communication link is due to a failure of the router.

In another embodiment of the tenth aspect, the disruption in the first communication link is due to a service failure of an internet service provider (ISP).

In another embodiment of the tenth aspect, when there is no disruption in the first communication link, the A/V recording and communication device communicates with the server via a third communication link over the LAN including the router, the third communication link bypassing the hub device.

In another embodiment of the tenth aspect, the cellular communication network is a long-term evolution (LTE) network or a new radio (NR) network.

In another embodiment of the tenth aspect, the hub device is a component of a security system.

In another embodiment of the tenth aspect, the hub device is a home automation hub device.

In another embodiment of the tenth aspect, the hub device is a home automation hub device of a security system.

In an eleventh aspect, a hub device configured for communication with an audio/video (A/V) recording and communication device and a backend device is provided, the hub device comprising: a communication module; one or more processors; a non-transitory machine-readable memory storing a program, the program executable by at least one of the one or more processors, the program comprising sets of instructions for: communicating, using the communication module, with the backend device via a first communication link through a network-connected device; detecting a disruption in the first communication link, wherein the hub device is unable to communicate with the backend device via the first communication link; and in response to detecting the disruption in the first communication link, reconfiguring settings of the hub device to communicate, using the communication module, with the A/V recording and communication device and the backend device via a second communication link.

In an embodiment of the eleventh aspect, the A/V recording and communication device communicates with the backend device via the second communication link through the hub device, bypassing the network-connection device.

In another embodiment of the eleventh aspect, the disruption in the first communication link is due to a failure of the network-connected device.

In another embodiment of the eleventh aspect, the disruption in the first communication link is due to a service failure of an internet service provider (ISP).

In another embodiment of the eleventh aspect, the network-connected device is a router in a local area network (LAN).

In another embodiment of the eleventh aspect, the second communication link comprises a connection with the backend device via a cellular communication network.

In another embodiment of the eleventh aspect, the cellular communication network is a long-term evolution (LTE) network or a new radio (NR) network.

In another embodiment of the eleventh aspect, when there is no disruption in the first communication link, the A/V recording and communication device communicates with the backend device via a third communication link over a local area network (LAN) including the network-connected device, the third communication link bypassing the hub device.

In another embodiment of the eleventh aspect, the backend device is a server.

In another embodiment of the eleventh aspect, the hub device is a component of a security system.

In another embodiment of the eleventh aspect, the hub device is a home automation hub device.

In another embodiment of the eleventh aspect, the hub device is a home automation hub device of a security system.

In a twelfth aspect, a method for a hub device configured for communication with an audio/video (A/V) recording and communication device and a server is provided, the hub device including a processor, and a communication module, the method comprising: communicating, using the communication module, with the backend device via a first communication link through a network-connected device; detecting a disruption in the first communication link, wherein the hub device is unable to communicate with the backend device via the first communication link; and reconfiguring settings of the hub device to communicate, using the communication module, with the A/V recording and communication device and the backend device via a second communication link.

In an embodiment of the twelfth aspect, the A/V recording and communication device communicates with the backend device via the second communication link through the hub device, bypassing the network-connection device.

In another embodiment of the twelfth aspect, the disruption in the first communication link is due to a failure of the network-connected device.

In another embodiment of the twelfth aspect, the disruption in the first communication link is due to a service failure of an internet service provider (ISP).

In another embodiment of the twelfth aspect, the network-connected device is a router in a local area network (LAN).

In another embodiment of the twelfth aspect, the second communication link comprises a connection with the backend device via a cellular communication network.

In another embodiment of the twelfth aspect, the cellular communication network is a long-term evolution (LTE) network or a new radio (NR) network.

In another embodiment of the twelfth aspect, when there is no disruption in the first communication link, the A/V recording and communication device communicates with the backend device via a third communication link over a local area network (LAN) including the network-connected device, the third communication link bypassing the hub device.

In another embodiment of the twelfth aspect, the backend device is a server.

In another embodiment of the twelfth aspect, the hub device is a component of a security system.

In another embodiment of the twelfth aspect, the hub device is a home automation hub device.

In another embodiment of the twelfth aspect, the hub device is a home automation hub device of a security system.

In a thirteenth aspect, a hub device configured for communication with an audio/video (A/V) recording and communication device and a server is provided, the hub device comprising: a communication module; one or more processors; a non-transitory machine-readable memory storing a program, the program executable by at least one of the one or more processors, the program comprising sets of instructions for: communicating, using the communication module, with the server via a first communication link over a local area network (LAN) including a router; detecting a disruption in the first communication link, wherein the hub device is unable to communicate with the server via the first communication link, but the hub device is able to communicate with the router via the first communication link; and in response to detecting the disruption in the first communication link, reconfiguring settings of the hub device to communicate, using the communication module, with the A/V recording and communication device via a second communication link, the second communication link bypassing the router, the second communication link further including a connection to a client device via a cellular communication network, bypassing the server.

In an embodiment of the thirteenth aspect, the disruption in the first communication link is due to a failure of the server.

In another embodiment of the thirteenth aspect, when the server is restored, the hub device transmits A/V data from calls for which the hub device served as a substitute for the server while the server was unavailable.

In another embodiment of the thirteenth aspect, when there is no disruption in the first communication link, the A/V recording and communication device communicates with the server via a third communication link over the LAN including the router, the third communication link bypassing the hub device.

In another embodiment of the thirteenth aspect, the cellular communication network is a long-term evolution (LTE) network or a new radio (NR) network.

In another embodiment of the thirteenth aspect, the hub device is a component of a security system.

In another embodiment of the thirteenth aspect, the hub device is a home automation hub device.

In another embodiment of the thirteenth aspect, the hub device is a home automation hub device of a security system.

In a fourteenth aspect, a method for a hub device configured for communication with an audio/video (A/V) recording and communication device and a server is provided, the hub device including a processor, and a communication module, the method comprising: communicating, using the communication module, with the server via a first communication link over a local area network (LAN) including a router; detecting a disruption in the first communication link, wherein the hub device is unable to communicate with the server via the first communication link, but the hub device is able to communicate with the router via the first communication link; and in response to detecting the disruption in the first communication link, reconfiguring settings of the hub device to communicate, using the communication module, with the A/V recording and communication device via a second communication link, the second communication link bypassing the router, the second communication link further including a cellular communication network, bypassing the server.

In an embodiment of the fourteenth aspect, the disruption in the first communication link is due to a failure of the server In another embodiment of the fourteenth aspect, when the server is restored, the hub device transmits A/V data from calls for which the hub device served as a substitute for the server while the server was unavailable.

In another embodiment of the fourteenth aspect, when there is no disruption in the first communication link, the A/V recording and communication device communicates with the server via a third communication link over the LAN including the router, the third communication link bypassing the hub device.

In another embodiment of the fourteenth aspect, the cellular communication network is a long-term evolution (LTE) network or a new radio (NR) network.

In another embodiment of the fourteenth aspect, the hub device is a component of a security system.

In another embodiment of the fourteenth aspect, the hub device is a home automation hub device.

In another embodiment of the fourteenth aspect, the hub device is a home automation hub device of a security system.

In a fifteenth aspect, a hub device configured for communication with an audio/video (A/V) recording and communication device and a backend device is provided, the hub device comprising: a communication module; one or more processors; a non-transitory machine-readable memory storing a program, the program executable by at least one of the one or more processors, the program comprising sets of instructions for: communicating, using the communication module, with the backend device via a first communication link through a network-connected device; detecting a disruption in the first communication link, wherein the hub device is unable to communicate with the backend device via the first communication link, but the hub device is able to communicate with the network-connected device via the first communication link; and in response to detecting the disruption in the first communication link, reconfiguring settings of the hub device to communicate, using the communication module, with the A/V recording and communication device via a second communication link, the second communication link bypassing the network-connected device.

In an embodiment of the fifteenth aspect, the second communication link further includes a connection to a client device via a cellular communication network, bypassing the server.

In another embodiment of the fifteenth aspect, the cellular communication network is a long-term evolution (LTE) network or a new radio (NR) network.

In another embodiment of the fifteenth aspect, the disruption in the first communication link is due to a failure of the backend device.

In another embodiment of the fifteenth aspect, when the backend device is restored, the hub device transmits A/V data from calls for which the hub device served as a substitute for the backend device while the backend device was unavailable.

In another embodiment of the fifteenth aspect, when there is no disruption in the first communication link, the A/V recording and communication device communicates with the backend device via a third communication link over the LAN including the router, the third communication link bypassing the hub device.

In another embodiment of the fifteenth aspect, the hub device is a component of a security system.

In another embodiment of the fifteenth aspect, the hub device is a home automation hub device.

In another embodiment of the fifteenth aspect, the hub device is a home automation hub device of a security system.

In a sixteenth aspect, a method for a hub device configured for communication with an audio/video (A/V) recording and communication device and a server is provided, the hub device including a processor, and a communication module, the method comprising: communicating, using the communication module, with the backend device via a first communication link through a network-connected device; detecting a disruption in the first communication link, wherein the hub device is unable to communicate with the backend device via the first communication link, but the hub device is able to communicate with the network-connected device via the first communication link; and reconfiguring settings of the hub device to communicate, using the communication module, with the A/V recording and communication device via a second communication link, the second communication link bypassing the network-connected device.

In an embodiment of the sixteenth aspect, the second communication link further includes a connection to a client device via a cellular communication network, bypassing the server.

In another embodiment of the sixteenth aspect, the cellular communication network is a long-term evolution (LTE) network or a new radio (NR) network.

In another embodiment of the sixteenth aspect, the disruption in the first communication link is due to a failure of the backend device.

In another embodiment of the sixteenth aspect, when the backend device is restored, the hub device transmits A/V data from calls for which the hub device served as a substitute for the backend device while the backend device was unavailable.

In another embodiment of the sixteenth aspect, when there is no disruption in the first communication link, the A/V recording and communication device communicates with the backend device via a third communication link over the LAN including the router, the third communication link bypassing the hub device.

In another embodiment of the sixteenth aspect, the hub device is a component of a security system.

In another embodiment of the sixteenth aspect, the hub device is a home automation hub device.

In another embodiment of the sixteenth aspect, the hub device is a home automation hub device of a security system.

What is claimed is:

1. A method, comprising:
   receiving, by an audio/video recording and communication device (A/V device) and from one or more devices, first setting data associated with a network device;
   receiving, by the A/V device and from the one or more devices, second setting data associated with a hub device;
   establishing, by the A/V device and using the first settings data, a first network connection with the network device;
   generating, by the A/V device, first image data;
   sending, by the A/V device, the first image data to a backend device using the first communication link;
   detecting, by the A/V device, a disruption in the first communication link, the disruption causing the A/V device to be unable to communicate using the first communication link;
   based at least in part on detecting the disruption, establishing, by the A/V device and using the second settings data, a second communication link with the hub device;
   generating, by the A/V device, second image data;
   sending, by the A/V device, the second image data to the hub device using the second communication link.

2. The method of claim 1, wherein detecting the disruption in the first communication link comprises at least one of:
   detecting that the A/V device is unable to send first sensor data to the network device; or
   detecting that the network device is unable to send second sensor data to the backend device.

3. The method of claim 1, further comprising:
   configuring settings of the A/V device to include first configuration settings represented by the first settings data; and
   based at least in part on detecting the disruption, updating the settings of the A/V device to include second configuration settings represented by the second settings data.

4. An electronic device comprising:
   a camera;
   one or more communication components;
   one or more processors; and
   one or more non-transitory computer-readable media storing instructions that, when executed by the one or more processors, cause the one or more processors to perform operations comprising:
   storing first setting data associated with a network device;
   storing second setting data associated with a hub device;
   establishing, using the one or more communication components and the first settings data, a first communication link with the network device;
   generating first image data using the camera;
   sending, using the one or more communication components, the first image data to a backend device using the first communication link;
   detecting a disruption in the first communication link;
   based at least in part on detecting the disruption, determining to communicate, using the one or more communication components and the second settings data, with the hub device using a second communication link;
   generating second image data using the camera; and
   sending, using the one or more communication components, the second image data to the hub device using the second communication link.

5. The electronic device of claim 4, wherein:
   communicating with the backend device using the first communication link bypasses the hub device; and
   communicating with the hub device using the second communication link bypasses the network device.

6. The electronic device of claim 4, wherein detecting the disruption in the first communication link comprises at least one of:
   detecting that the electronic device is unable to send, using the one or more communication components, first sensor data to the network device; or
   detecting that the network device is unable to send second sensor data to the backend device.

7. The electronic device of claim 4, wherein:
   detecting the disruption in the first communication link comprises detecting that the electronic device is unable to send, using the one or more communication components, third image data to the network device; and
   the one or more non-transitory computer-readable media store further instructions that, when executed by the one or more processors, cause the one or more processors to perform further operations comprising, sending, using the one or more communication components, the third image data to the backend device via the hub device.

8. The electronic device of claim 4, the one or more non-transitory computer-readable media storing further instructions that, when executed by the one or more processors, cause the one or more processors to perform further operations comprising:
   configuring settings of the electronic device to indicate that the electronic device is to communicate with the backend device using the first communication link; and
   based at least in part on detecting the disruption, changing the settings of the electronic device to indicate that the electronic device is to communicate with the hub device using the second communication link.

9. The electronic device of claim 4, the one or more non-transitory computer-readable media storing further instructions that, when executed by the one or more processors, cause the one or more processors to perform further operations comprising:

generating an alert; and sending, using the one or more communication components, the alert to the hub device using the second communication link.

10. The electronic device of claim 4, the one or more non-transitory computer-readable media storing further instructions that, when executed by the one or more processors, cause the one or more processors to perform further operations comprising:

determining that the electronic device is able to communicate with the backend device; and establishing, using the one or more communication components and the first settings data, a third communication link with the backend device.

11. The electronic device of claim 4, the one or more non-transitory computer-readable media storing further instructions that, when executed by the one or more processors, cause the one or more processors to perform further operations comprising storing third settings data indicating that the electronic device is to communicate with the hub device based at least in part on detecting the disruption.

12. The electronic device of claim 4, wherein the second communication link is associated with a local area network connection between the electronic device and the hub device.

13. The electronic device of claim 4, wherein:

the first communication link is associated with a type of network connection; and the second communication link is also associated with the type of network connection.

14. The electronic device of claim 4, wherein:

the first settings data represents configuration settings for communicating with the network device; and the second settings data represents configuration settings for communicating with the hub device.

15. A hub device comprising:

one or more communication components;

one or more processors; and one or more non-transitory computer-readable media storing instructions that, when executed by the one or more processors, cause the one or more processors to perform operations comprising:

storing first settings data associated with a network device;

storing second settings data associated with an electronic device;

establishing, using the one or more communication components and the first settings data, a first communication link with the network device;

detecting a disruption in the first communication link;

based at least in part on detecting the disruption, determining to communicate, using the one or more communication components and the second settings data, with the electronic device using a second communication link;

receiving, using the one or more communication components, image data from the electronic device; and storing the image data.

16. The hub device of claim 15, wherein detecting the disruption in the first communication link comprises at least one of:

detecting that the hub device is unable to send, using the one or more communication components, first sensor data to the network device; or detecting that the network device is unable to send second sensor data to the backend device.

17. The hub device of claim 15, the one or more non-transitory computer-readable media storing further instructions that, when executed by the one or more processors, cause the one or more processors to perform further operations comprising sending, using the one or more communication components, the image data to a client device.

18. The hub device of claim 15, the one or more non-transitory computer-readable media storing further instructions that, when executed by the one or more processors, cause the one or more processors to perform further operations comprising:

configuring settings of the hub device to indicate that the hub device is to communicate with the backend device using the first communication link; and based at least in part on detecting the disruption, changing the settings of the hub device to indicate that the hub device is to communicate with the electronic device using the second communication link.

19. The hub device of claim 15, of wherein the second communication link is associated with a local area network connection between the hub device and the electronic device.

20. The hub device of claim 15, the one or more non-transitory computer-readable media storing further instructions that, when executed by the one or more processors, cause the one or more processors to perform further operations comprising:

determining that the hub device is able to communicate with the backend device; and sending, using the one or more communication components, the image data to the backend device.

* * * * *